United States Patent
Brayman et al.

(10) Patent No.: US 9,460,135 B2
(45) Date of Patent: Oct. 4, 2016

(54) METHODS AND AUTOMATED SYSTEMS FOR TESTING, OPTIMIZATION, AND ANALYSIS THAT USE ROBUST STATISTICAL PROCESSING OF NON-BINOMIAL EXPERIMENTAL RESULTS

(71) Applicant: WEBTRENDS INC., Portland, OR (US)

(72) Inventors: Vladimir Brayman, Mercer Island, WA (US); Lihui Shi, Seattle, WA (US); Spencer Wood, Portland, OR (US)

(73) Assignee: Webtrends Inc., Portland, OR (US)

( * ) Notice: Subject to any disclaimer, the term of this patent is extended or adjusted under 35 U.S.C. 154(b) by 322 days.

(21) Appl. No.: 14/023,198

(22) Filed: Sep. 10, 2013

(65) Prior Publication Data

US 2014/0172871 A1 Jun. 19, 2014

Related U.S. Application Data

(60) Provisional application No. 61/709,074, filed on Dec. 18, 2012.

(51) Int. Cl.
  *G06F 7/00* (2006.01)
  *G06F 17/30* (2006.01)
  *G06F 11/36* (2006.01)

(52) U.S. Cl.
  CPC ..... *G06F 17/30336* (2013.01); *G06F 11/3664* (2013.01)

(58) Field of Classification Search
  CPC .............. G06F 17/30336; G06F 11/3664
  USPC ........ 707/688, 689, 711, 723, 741; 709/228, 709/229
  See application file for complete search history.

(56) References Cited

U.S. PATENT DOCUMENTS

| | | | |
|---|---|---|---|
| 6,317,700 B1 * | 11/2001 | Bagne | G06N 5/025 604/890.1 |
| 6,721,751 B1 * | 4/2004 | Furusho | G06F 17/30595 707/752 |
| 6,915,344 B1 * | 7/2005 | Rowe | H04L 12/2697 709/219 |
| 7,149,736 B2 * | 12/2006 | Chkodrov | G06F 17/30489 |
| 7,778,993 B2 * | 8/2010 | Sacco | G06F 17/30643 707/705 |
| 7,818,303 B2 * | 10/2010 | Buehrer | G06F 17/30861 707/693 |
| 8,041,362 B2 * | 10/2011 | Li | H04L 5/0007 455/450 |
| 2003/0018501 A1 * | 1/2003 | Shan | G06Q 30/0201 705/7.29 |
| 2004/0162817 A1 * | 8/2004 | Boskovic | G06F 7/22 |
| 2009/0018996 A1 * | 1/2009 | Hunt | G06Q 30/02 |
| 2009/0319451 A1 * | 12/2009 | Mirbach | G06K 9/6273 706/12 |
| 2010/0064281 A1 * | 3/2010 | Kimball | H04L 41/0853 717/124 |
| 2010/0185827 A1 * | 7/2010 | Lowery | G06F 3/0608 711/165 |
| 2010/0251217 A1 * | 9/2010 | Miller | H04L 12/2697 717/126 |
| 2011/0224946 A1 * | 9/2011 | Brayman | G06F 11/3419 702/176 |
| 2012/0053986 A1 * | 3/2012 | Cardno | G06Q 30/0201 705/7.29 |
| 2013/0073479 A1 * | 3/2013 | Koblas | G06Q 40/00 705/36 R |
| 2013/0085893 A1 * | 4/2013 | Bhardwaj | G06Q 30/0643 705/26.62 |

* cited by examiner

*Primary Examiner* — Daniel Kuddus
(74) *Attorney, Agent, or Firm* — Olympic Patent Works PLLC

(57) ABSTRACT

The current document is directed to automated electronic testing, optimization, and/or analysis systems that perform testing that results in non-binomial experimental results that are processed by using efficient and robust processing methods. In one implementation, efficient and robust processing methods are employed to process non-binomial results produced from single-factor tests. In a second implementation, robust and computationally efficient processing methods are employed to analyze non-binomial results from multi-factor/multi-level tests.

14 Claims, 71 Drawing Sheets

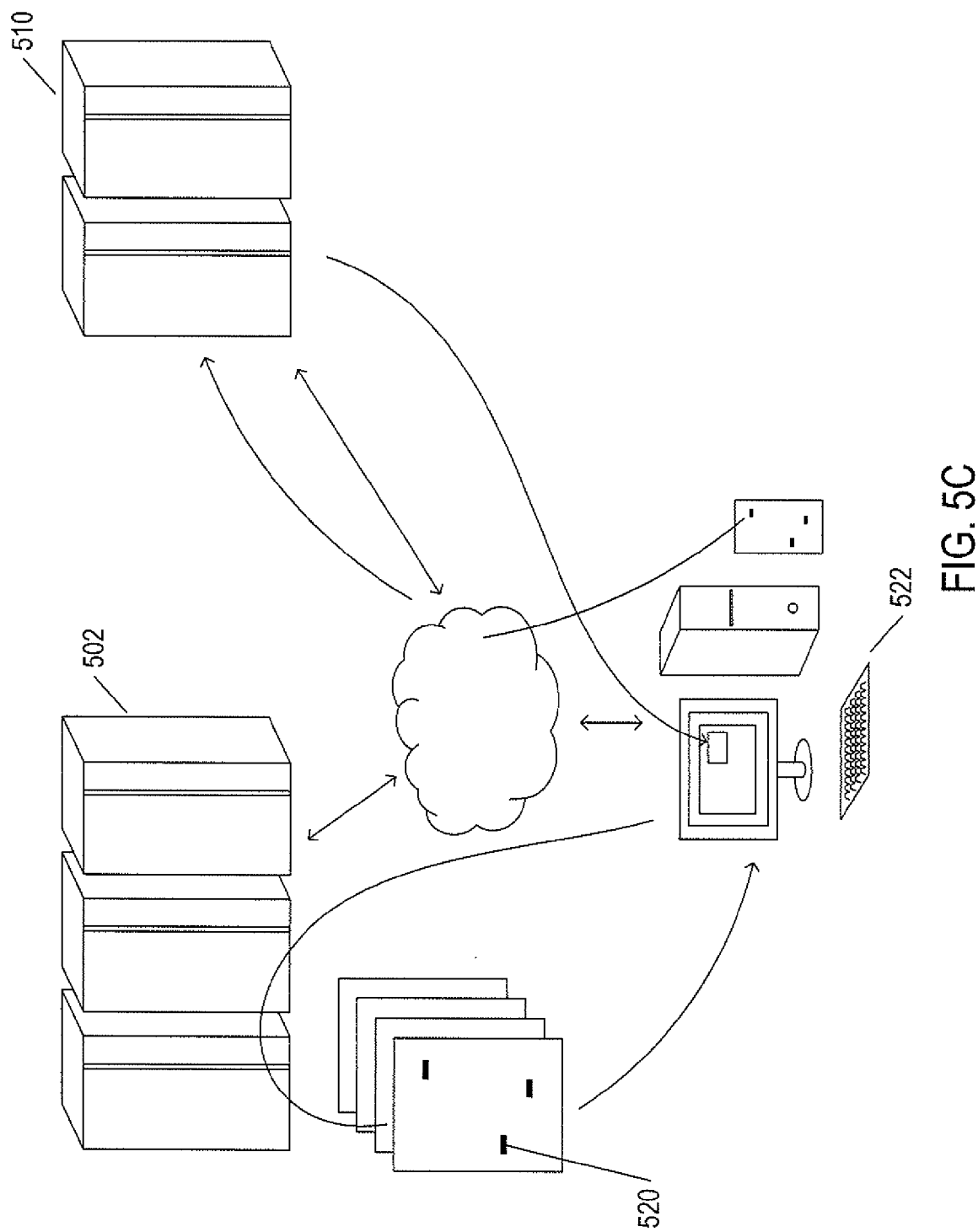

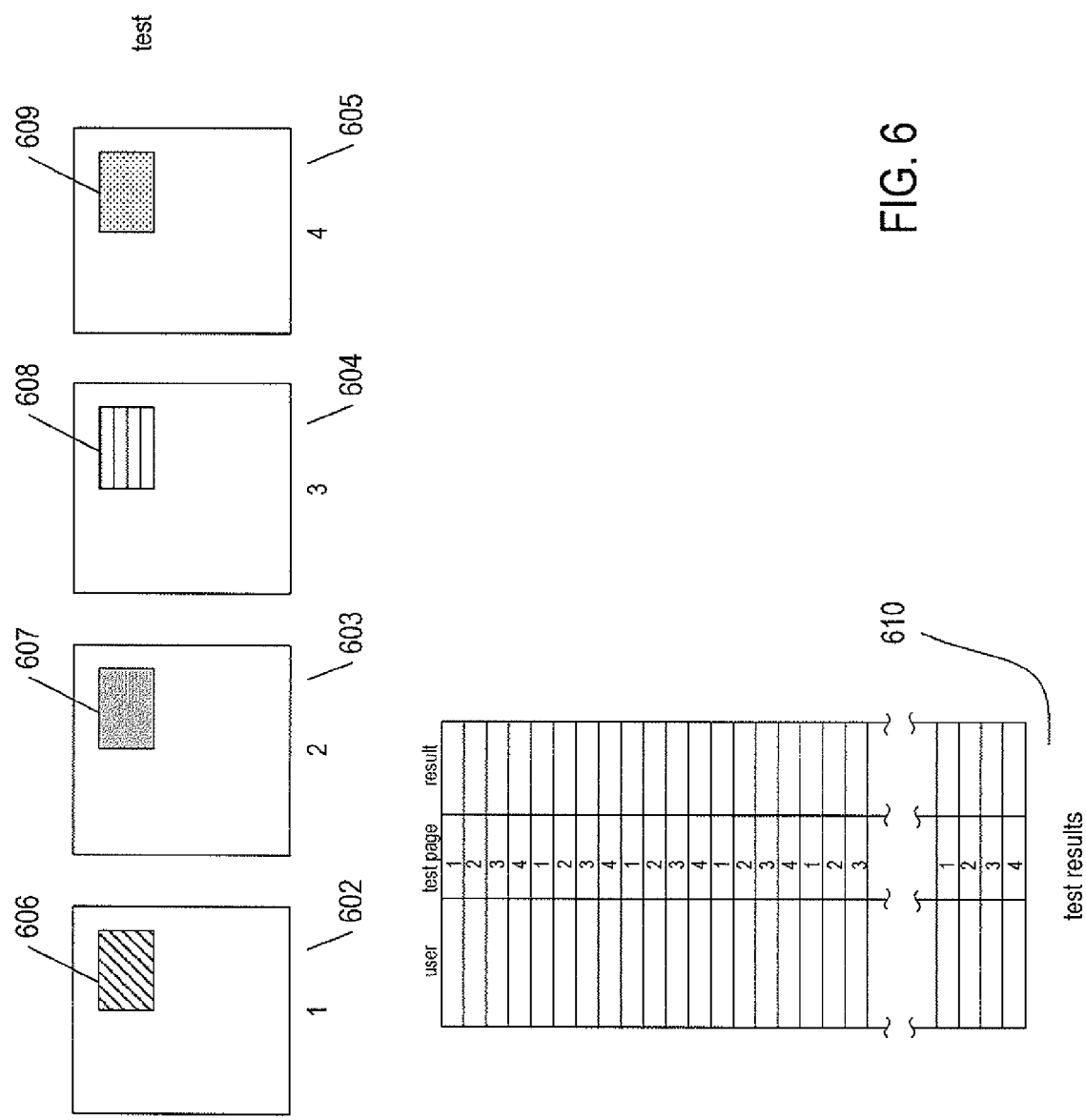

Binomial Distribution (1) experiment consists of *n* identical trials
(2) each trial results in one of two values: S or F
(3) for a given trial, P(S) = *p* and P(F) = 1 - *p* = *q*
(4) trials are independent
(5) random variable *Y* that is observed is the number of *n* trials that result is the result S $$p(y) = \binom{n}{y} p^y q^{n-y}, y \in \{0,1,2,\ldots,n\}$$

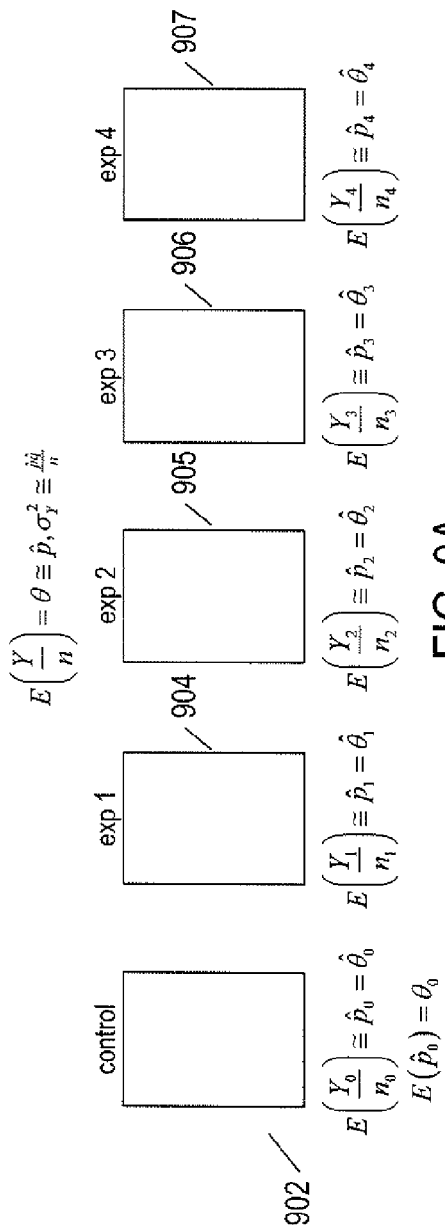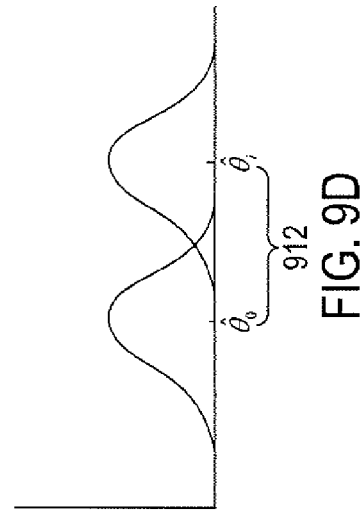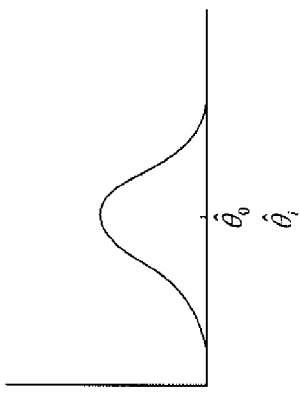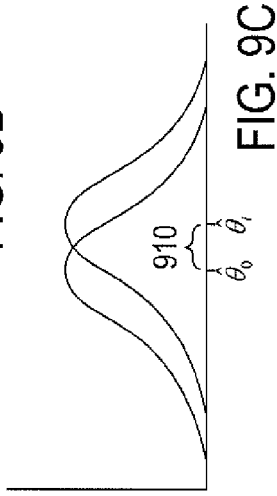

$$\begin{bmatrix} 0000 \\ 0112 \\ 0221 \\ 1011 \\ 1120 \\ 1202 \\ 2022 \\ 2101 \\ 2210 \end{bmatrix}$$

$y_1 = \beta_0 + \beta_1^0 + \beta_2^0 + \beta_3^0 + \beta_4^0 + \beta_{12}^{00} + \beta_{13}^{00} + \beta_{14}^{00} + \beta_{23}^{00} + \beta_{24}^{00} + \beta_{34}^{00} + \beta_{123}^{000} + \beta_{124}^{000} + \beta_{134}^{000} + \beta_{234}^{000} + \beta_{1234}^{0000} + \varepsilon_1$ $y_2 = \beta_0 + \beta_1^0 + \beta_2^1 + \beta_3^1 + \beta_4^2 + \beta_{12}^{01} + \beta_{13}^{01} + \beta_{14}^{02} + \beta_{23}^{11} + \beta_{24}^{12} + \beta_{34}^{12} + \beta_{123}^{011} + \beta_{124}^{012} + \beta_{134}^{012} + \beta_{234}^{112} + \beta_{1234}^{0112} + \varepsilon_2$ $y_3 = \beta_0 + \beta_1^0 + \beta_2^2 + \beta_3^2 + \beta_4^1 + \beta_{12}^{02} + \beta_{13}^{02} + \beta_{14}^{01} + \beta_{23}^{22} + \beta_{24}^{21} + \beta_{34}^{21} + \beta_{123}^{022} + \beta_{124}^{021} + \beta_{134}^{021} + \beta_{234}^{221} + \beta_{1234}^{0221} + \varepsilon_3$ $y_4 = \beta_0 + \beta_1^1 + \beta_2^0 + \beta_3^1 + \beta_4^1 + \beta_{12}^{10} + \beta_{13}^{11} + \beta_{14}^{11} + \beta_{23}^{01} + \beta_{24}^{01} + \beta_{34}^{11} + \beta_{123}^{101} + \beta_{124}^{101} + \beta_{134}^{111} + \beta_{234}^{011} + \beta_{1234}^{1011} + \varepsilon_4$ $y_5 = \beta_0 + \beta_1^1 + \beta_2^1 + \beta_3^2 + \beta_4^0 + \beta_{12}^{11} + \beta_{13}^{12} + \beta_{14}^{10} + \beta_{23}^{12} + \beta_{24}^{10} + \beta_{34}^{20} + \beta_{123}^{112} + \beta_{124}^{110} + \beta_{134}^{120} + \beta_{234}^{120} + \beta_{1234}^{1120} + \varepsilon_5$ $y_6 = \beta_0 + \beta_1^1 + \beta_2^2 + \beta_3^0 + \beta_4^2 + \beta_{12}^{12} + \beta_{13}^{10} + \beta_{14}^{12} + \beta_{23}^{20} + \beta_{24}^{22} + \beta_{34}^{02} + \beta_{123}^{120} + \beta_{124}^{122} + \beta_{134}^{102} + \beta_{234}^{202} + \beta_{1234}^{1202} + \varepsilon_6$ $y_7 = \beta_0 + \beta_1^2 + \beta_2^0 + \beta_3^2 + \beta_4^2 + \beta_{12}^{20} + \beta_{13}^{22} + \beta_{14}^{22} + \beta_{23}^{02} + \beta_{24}^{02} + \beta_{34}^{22} + \beta_{123}^{202} + \beta_{124}^{202} + \beta_{134}^{212} + \beta_{234}^{022} + \beta_{1234}^{2022} + \varepsilon_7$ $y_8 = \beta_0 + \beta_1^2 + \beta_2^1 + \beta_3^0 + \beta_4^1 + \beta_{12}^{21} + \beta_{13}^{20} + \beta_{14}^{21} + \beta_{23}^{10} + \beta_{24}^{11} + \beta_{34}^{01} + \beta_{123}^{210} + \beta_{124}^{211} + \beta_{134}^{201} + \beta_{234}^{101} + \beta_{1234}^{2101} + \varepsilon_8$ $y_9 = \beta_0 + \beta_1^2 + \beta_2^2 + \beta_3^1 + \beta_4^0 + \beta_{12}^{22} + \beta_{13}^{21} + \beta_{14}^{20} + \beta_{23}^{21} + \beta_{24}^{20} + \beta_{34}^{10} + \beta_{123}^{221} + \beta_{124}^{220} + \beta_{134}^{210} + \beta_{234}^{210} + \beta_{1234}^{2210} + \varepsilon_9$

FIG. 13

$$\begin{bmatrix} 0 & 0 & 0 & 1 & 1 & 1 \\ 0 & 1 & 2 & 0 & 1 & 2 \end{bmatrix} \text{\small 1402}$$

$$y_1 = \beta_0 + \beta_1^0 + \beta_2^0 + \beta_{12}^{00} + \varepsilon_1$$

$$\vdots$$

$$y_4 = \beta_0 + \beta_1^0 + \beta_2^1 + \beta_{12}^{01} + \varepsilon_4$$

$$\vdots$$

$$y_6 = \beta_0 + \beta_1^2 + \beta_2^1 + \beta_{12}^{21} + \varepsilon_6$$

FIG. 14A $$y_1 = \beta_0 + \beta_1^0 + \beta_2^0 + \beta_{12}^{00} + \varepsilon_1$$
$$\vdots$$
$$y_4 = \beta_0 + \beta_1^0 + \beta_2^1 + \beta_{12}^{01} + \varepsilon_4$$
$$\vdots$$
$$y_6 = \beta_0 + \beta_1^2 + \beta_2^1 + \beta_{12}^{21} + \varepsilon_6$$

X matrix $$\begin{bmatrix} 1 & 1 & 0 & 1 & 0 & 1 & 0 & 0 & 0 & 0 \\ 1 & 0 & 0 & 1 & 0 & 0 & 1 & 0 & 0 & 0 \\ 1 & 1 & 0 & 0 & 1 & 0 & 0 & 1 & 0 & 0 \\ 1 & 0 & 1 & 1 & 0 & 0 & 0 & 0 & 1 & 0 \\ 1 & 0 & 1 & 0 & 1 & 0 & 0 & 0 & 0 & 1 \\ 1 & 0 & 0 & 0 & 0 & 0 & 0 & 0 & 0 & 0 \end{bmatrix}$$

$\beta_0 \ \beta_1^0 \ \beta_1^1 \ \beta_2^0 \ \beta_2^1 \ \beta_{12}^{00} \ \beta_{12}^{01} \ \beta_{12}^{10} \ \beta_{12}^{11} \ \beta_{12}^{20} \ \beta_{12}^{21}$

FIG. 14B $$Y = X\beta + \varepsilon$$

$$
\begin{bmatrix} y_1 \\ y_2 \\ y_3 \\ y_4 \\ y_5 \\ y_6 \end{bmatrix}
=
\begin{bmatrix}
1 & 1 & 0 & 0 & 1 & 0 & 0 & 0 & 0 & 0 & 0 & 0 \\
1 & 0 & 1 & 0 & 0 & 1 & 0 & 0 & 0 & 0 & 1 & 0 \\
1 & 0 & 0 & 1 & 1 & 0 & 0 & 0 & 1 & 0 & 0 & 0 \\
1 & 1 & 0 & 0 & 0 & 1 & 0 & 1 & 0 & 0 & 0 & 0 \\
1 & 0 & 1 & 0 & 1 & 0 & 1 & 0 & 0 & 0 & 0 & 0 \\
1 & 0 & 0 & 1 & 0 & 1 & 0 & 0 & 0 & 1 & 0 & 0
\end{bmatrix}
\begin{bmatrix} \beta_0 \\ \beta_1^0 \\ \beta_1^1 \\ \beta_1^2 \\ \beta_2^0 \\ \beta_2^1 \\ \beta_{12}^{00} \\ \beta_{12}^{01} \\ \beta_{12}^{10} \\ \beta_{12}^{11} \\ \beta_{12}^{20} \\ \beta_{12}^{21} \end{bmatrix}
+
\begin{bmatrix} \varepsilon_1 \\ \varepsilon_2 \\ \varepsilon_3 \\ \varepsilon_4 \\ \varepsilon_5 \\ \varepsilon_6 \end{bmatrix}
$$

FIG. 14D

Estimates: $\hat{Y} = X\hat{\beta}$       Residuals: $\hat{\varepsilon} = Y - \hat{Y} = Y - X\hat{\beta}$ Least Squares Problem:

minimize residual squares $\hat{\varepsilon}^2$ minimize $(Y - X\hat{\beta})^T (Y - X\hat{\beta})$ Least Squares Estimate $\hat{\beta}_{LS} = (X^T X)^{-1} X^T Y$ ← Conversion Rates ↑ Factor Level Effects Estimates

$$\begin{bmatrix} \beta_0 \\ \beta_1^0 \\ \beta_1^1 \\ \beta_1^2 \\ \vdots \\ \beta_k^l \end{bmatrix}$$

1506         1504

$$\begin{bmatrix} y_1 \\ y_2 \\ y_3 \\ y_4 \\ \vdots \\ y_n \end{bmatrix} = \begin{bmatrix} 1 & \cdots \\ 1 & \cdots \\ 1 & \cdots \\ 1 & \cdots \\ & \vdots \\ 1 & \cdots \end{bmatrix} \begin{bmatrix} \beta_0 \\ \beta_1^0 \\ \beta_1^1 \\ \beta_1^2 \\ \vdots \\ \beta_k^l \end{bmatrix} + \varepsilon$$

Y               X $$\hat{\beta}_{LS} = \left(X^T X\right)^{-1} X^T Y$$

ANOVA Table

| effect | degrees of freedom | sum of squares | mean squares | influence | significance |
|---|---|---|---|---|---|
| Factor 1 | $DOF_1$ | $SS_1$ | $MS_1$ | $MS_1/TotMS$ | $S_1$ |
| Factor 2 | $DOF_2$ | $SS_2$ | $MS_2$ | $MS_2/TotMS$ | $S_2$ |
| Factor 3 | $DOF_3$ | $SS_3$ | $MS_3$ | $MS_3/TotMS$ | $S_3$ |
| ... | ... | ... | ... | ... | ... |
| Factors 1/2 | $DOF_{12}$ | $SS_{12}$ | $MS_{12}$ | $MS_{12}/TotMS$ | $S_{12}$ |
| Factors 1/3 | $DOF_{13}$ | $SS_{13}$ | $MS_{13}$ | $MS_{13}/TotMS$ | $S_{13}$ |
| Factors 2/3 | $DOF_{23}$ | $SS_{23}$ | $MS_{23}$ | $MS_{23}/TotMS$ | $S_{23}$ |
| ... | ... | ... | ... | ... | ... |
| errpr | $DOF_{err}$ | $SS_{err}$ | $MS_{err}$ | | |

<u>degrees of freedom</u> factor $i$: number of levels $-1 = DOF_i$ 2-factor interaction: $(DOF_a)(DOF_b) = DOF_{ab}$ 3-factor interaction: $(DOF_a)(DOF_b)(DOF_c) = DOF_{abc}$ error: number of rows in design $- (1 + \sum_{i=1}^{\text{non-error effects}} DOF_i) = DOF_{err}$

FIG. 16A mean of squares $$\text{main effect (factor}_i): \frac{SS_i}{DOF_i} = MS_i$$

$$\text{interaction effect (factors } i \text{ and } p): \frac{SS_{ip}}{DOF_{ip}} = MS_{ip}$$

$$\text{errors}: \frac{SS_{err}}{DOF_{err}} = MS_{err}$$

$\left.\right\}$ 1630

F value $$\text{main effect}: F_i = \frac{MS_i}{MS_{err}}$$

$$\text{interaction effect}: F_{ip} = \frac{MS_{ip}}{MS_{err}}$$

$\left.\right\}$ 1632

P value $$\text{main effect}: P_i = \Pr(F > F_i)$$

$$\text{interaction effect}: P_{ip} = \Pr(F > F_{ip})$$

$\left.\right\}$ 1634

TotMS $$TotMS = \sum MS_i + \sum MS_{ip} + \ldots + MS_{err}$$

$\left.\right\}$ 1636

Influence $$\text{main effect}: MS_i / TotMS$$

$$\text{interaction effect}: MS_{ip} / TotMS$$

$\left.\right\}$ 1638

FIG. 16C

| Experiment | Pageviews | Conversions | Conversion Rate, % |
|---|---|---|---|
| Experiment 1 | 2 | 1 | 50 |
| Experiment 2 | 2 | 1 | 50 |
| Experiment 3 | 4 | 2 | 50 |
| Experiment 4 | 5 | 2 | 40 |
| Experiment 5 | 2 | 1 | 50 |
| Experiment 6 | 4 | 1 | 25 |
| Experiment 7 | 5 | 1 | 20 |
| Experiment 8 | 3 | 1 | 33 |
| Experiment 9 | 4 | 2 | 50 |

FIG. 18A

| Experiment Name | Avg Visit Duration (min) |
|---|---|
| Experiment 1 | 24.52 |
| Experiment 1 | 39.42 |
| Experiment 1 | 22.13 |
| Experiment 5 | 7.47 |
| Experiment 9 | 5.55 |
| Experiment 6 | 14.5 |
| Experiment 2 | 46.17 |
| Experiment 2 | 80.03 |
| Experiment 4 | 35.7 |
| Experiment 4 | 3.43 |
| Experiment 1 | 6.53 |
| Experiment 4 | 1.33 |
| Experiment 4 | 5.38 |
| Experiment 6 | 10 |
| Experiment 4 | 46.57 |
| Experiment 1 | 2.77 |
| Experiment 4 | 6.68 |
| Experiment 2 | 2.92 |
| Experiment 6 | 55.95 |
| Experiment 2 | 4.73 |
| Experiment 2 | 31.43 |
| Experiment 7 | 18.17 |
| Experiment 3 | 25.47 |
| Experiment 8 | 73.9 |
| Experiment 2 | 10.63 |
| Experiment 4 | 5.3 |
| Experiment 2 | 36.25 |
| Experiment 3 | 0.28 |
| Experiment 9 | 69.05 |

FIG. 18B

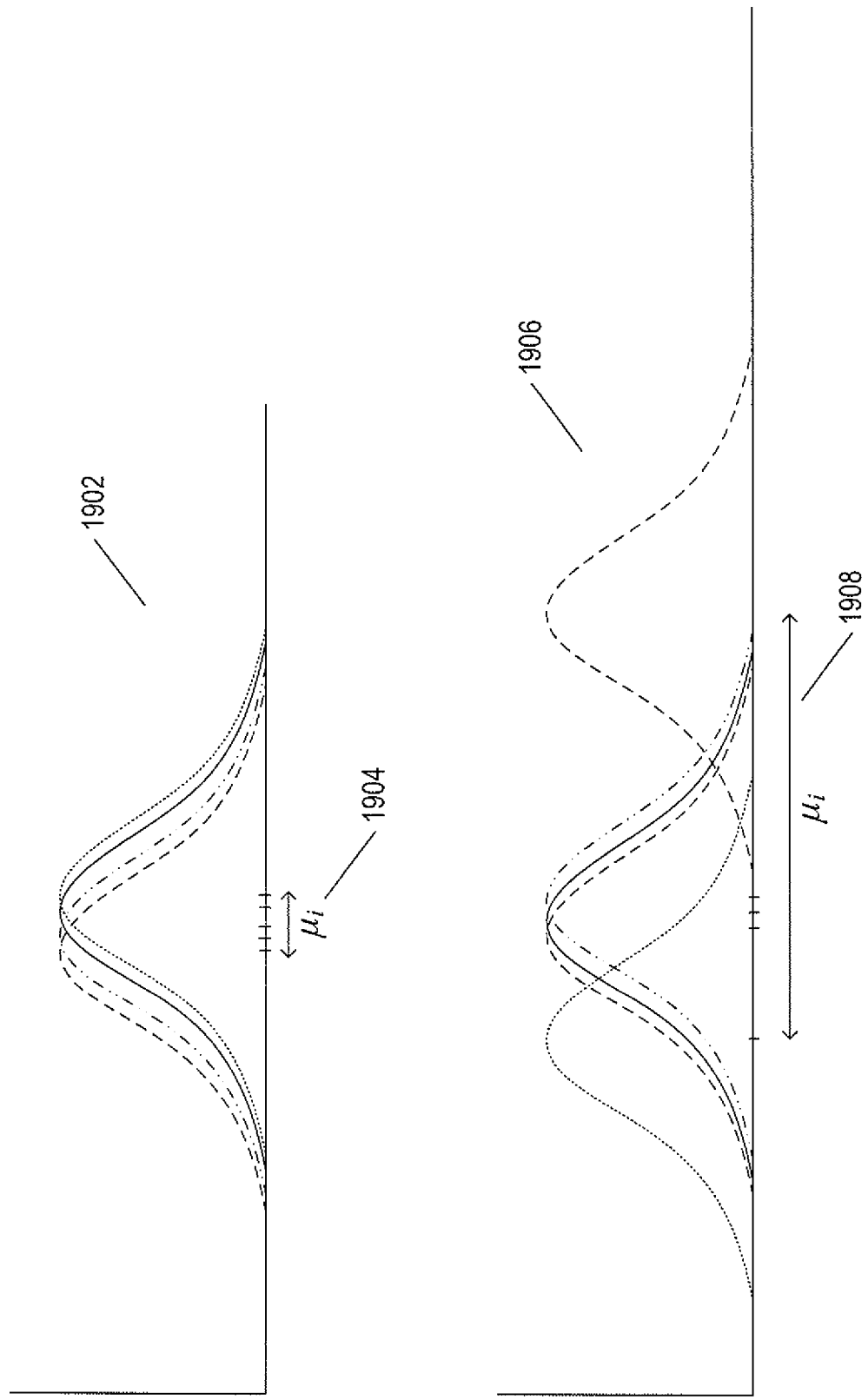

| control page | | version 1 | | version 2 | | version 3 | | version 4 | | version 5 | |
|---|---|---|---|---|---|---|---|---|---|---|---|
| n | y | n | y | n | y | n | y | n | y | n | y |
| 1 | 10.1 | 1 | 11.1 | 1 | 21.8 | 1 | 9.1 | 1 | 10.3 | 1 | 11.6 |
| 2 | 12.2 | 2 | 12.0 | 2 | 19.8 | 2 | 8.7 | 2 | 125.0 | 2 | 10.2 |
| 3 | 14.6 | 3 | 17.3 | 3 | 18.7 | 3 | 6.3 | 3 | 11.2 | 3 | 13.5 |
| 4 | 37.8 | 4 | 13.6 | 4 | 11.6 | 4 | 11.2 | 4 | 13.3 | 4 | 14.2 |
| 5 | 19.1 | 5 | 12.5 | 5 | 15.5 | 5 | 10.5 | 5 | 17.1 | 5 | 11.2 |
| 6 | 13.1 | 6 | 41.7 | 6 | 25.6 | 6 | 9.7 | 6 | 14.6 | 6 | 10.6 |
| 7 | 14.0 | 7 | 12.1 | 7 | 24.2 | 7 | 8.3 | 7 | 13.5 | 7 | 13.5 |
| 8 | 13.6 | 8 | 11.9 | 8 | 21.4 | 8 | 9.2 | 8 | 10.5 | 8 | 10.2 |
| 9 | 12.7 | 9 | 14.2 | 9 | 47.7 | 9 | 10.1 | 9 | 13.3 | 9 | 11.2 |
| 10 | 13.1 | 10 | 127.6 | 10 | 33.7 | 10 | 12.9 | | | | |
| | | | | 11 | 29.2 | 11 | 11.1 | | | | |
| | | | | | | 12 | 9.2 | | | | |

FIG. 19B

| 1922 | 1924 | | | | 1932 | | | |
|---|---|---|---|---|---|---|---|---|
| 1 | 6.3 | 48 | 18.7 | | 1 | 6.3 | 48 | 18.7 |
| 2 | 8.3 | 49 | 19.1 | | 2 | 8.3 | 49 | 19.1 |
| 3 | 8.7 | 50 | 19.8 (1926) | | 3 | 8.7 | 50 | 19.8 |
| 4 | 9.1 | 51 | 21.4 | 1928 | 4 | 9.1 | 51 | 21.4 |
| 5 | 9.2 | 52 | 21.8 (1927) | | 5.5 | }9.2 | 52 | 21.8 |
| 6 | 9.2 | 53 | 24.2 | 1929 | 5.5 | | 53 | 24.2 (1942) |
| 7 | 9.7 | 54 | 25.6 | | 7 | 9.7 | 54 | 25.6 |
| 8 | 10.1 | 55 | 29.2 | 1944 { | 8.5 | }10.1 | 55 | 29.2 |
| 9 | 10.1 | 56 | 33.7 | | 8.5 | | 56 | 33.7 |
| 10 | 10.2 | 57 | 37.8 | | 10.5 | }10.2 | 57 | 37.8 |
| 11 | 10.2 | 58 | 41.7 | | 10.5 | | 58 | 41.7 |
| 12 | 10.3 | 59 | 47.7 | | 12 | 10.3 | 59 | 47.7 |
| 13 | 10.5 | 60 | 125.0 | | 13.5 | }10.5 | 60 | 125.0 |
| 14 | 10.5 | 61 | 127.6 | | 13.5 | | 61 | 127.6 |
| 15 | 10.6 | | | | 15 | 10.6 | | |
| 16 | 11.1 | | | | 16.5 | }11.1 | | |
| 17 | 11.1 | | | | 16.5 | | | |
| 18 | 11.2 | | | | 19.5 | | | |
| 1934 { 19 | 11.2 | | | 1936 { | 19.5 | }11.2 — 1938 | | |
| 20 | 11.2 | | | | 19.5 | | | |
| 21 | 11.2 | | 1920 | | 19.5 | | | |
| 22 | 11.6 | | | | 22.5 | }11.6 | | |
| 23 | 11.6 | | | | 22.5 | | | |
| 24 | 11.9 | | | | 24 | 11.9 | | |
| 25 | 12.0 | | | | 25 | 12.0 | | |
| 26 | 12.1 | | | | 26 | 12.1 | | |
| 27 | 12.2 | | | | 27 | 12.2 | | |
| 28 | 12.5 | | | | 28 | 12.5 | | |
| 29 | 12.7 | | | | 29 | 12.7 | | |
| 30 | 12.9 | | | | 30 | 12.9 | | |
| 31 | 13.1 | | | | 31.5 | }13.1 | | |
| 32 | 13.1 | | | | 31.5 | | | |
| 33 | 13.3 | | | | 33.5 | }13.3 | | |
| 34 | 13.3 | | | | 33.5 | | | |
| 35 | 13.5 | | | | 36 | | | |
| 36 | 13.5 | | | | 36 | }13.5 | | |
| 37 | 13.5 | | | | 36 | | | |
| 38 | 13.6 | | | | 38.5 | }13.6 | | |
| 39 | 13.6 | | | | 38.5 | | | |
| 40 | 14.0 | | | | 40 | 14.0 | | |
| 41 | 14.2 | | | | 41.5 | }14.2 | | |
| 42 | 14.2 | | | | 41.5 | | | |
| 43 | 14.6 | | | | 43.5 | }14.6 | | |
| 44 | 14.6 | | | | 43.5 | | | |
| 45 | 15.5 | | | | 45 | 15.5 | | |
| 46 | 17.1 | | | | 46 | 17.1 | | |
| 47 | 17.3 | | | | 47 | 17.3 | | |

$Y = \{y_1, y_2, \ldots, y_n\}$ —— 2202

$|Y| = n$ —— 2204

$y_i = \mathbb{R}$ —— 2206

$V = \{v_{ij} : v_{ij} = y_i + y_j \text{ and } 1 \leq i, j \leq n \text{ and } i \leq j\}$ —— 2208

$v = \dfrac{n(n+1)}{2}$ —— 2210

```
void compute V (double*Y[ ], int n, double*V, int(*compare)(const void*, const void*))
{   int i, j;
    double* v = V;
    int N = (n*(n+1))/2;
    for (j = 1; j ≤ n; j++)
        for (i = 1; i ≤ j; i++)
            *v++ = Y[i] + Y[j];
    qsort(V, N, size of (double), compare);
}
```
⎫ 2214

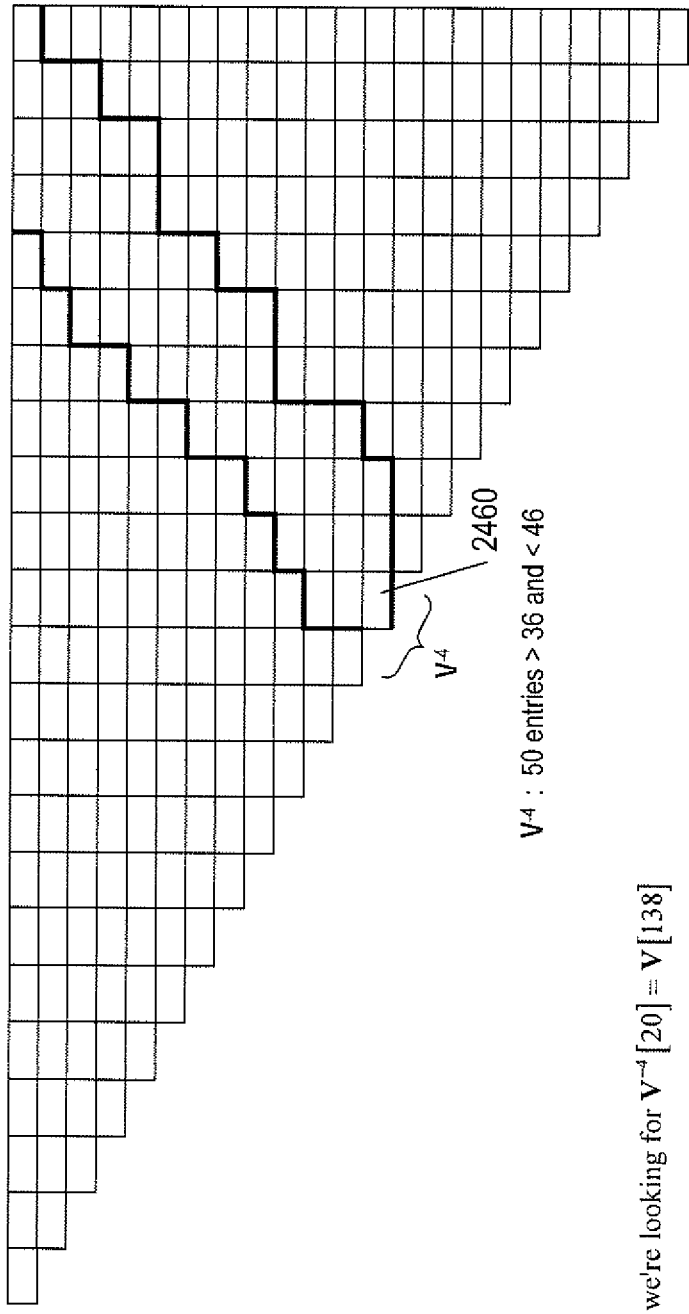

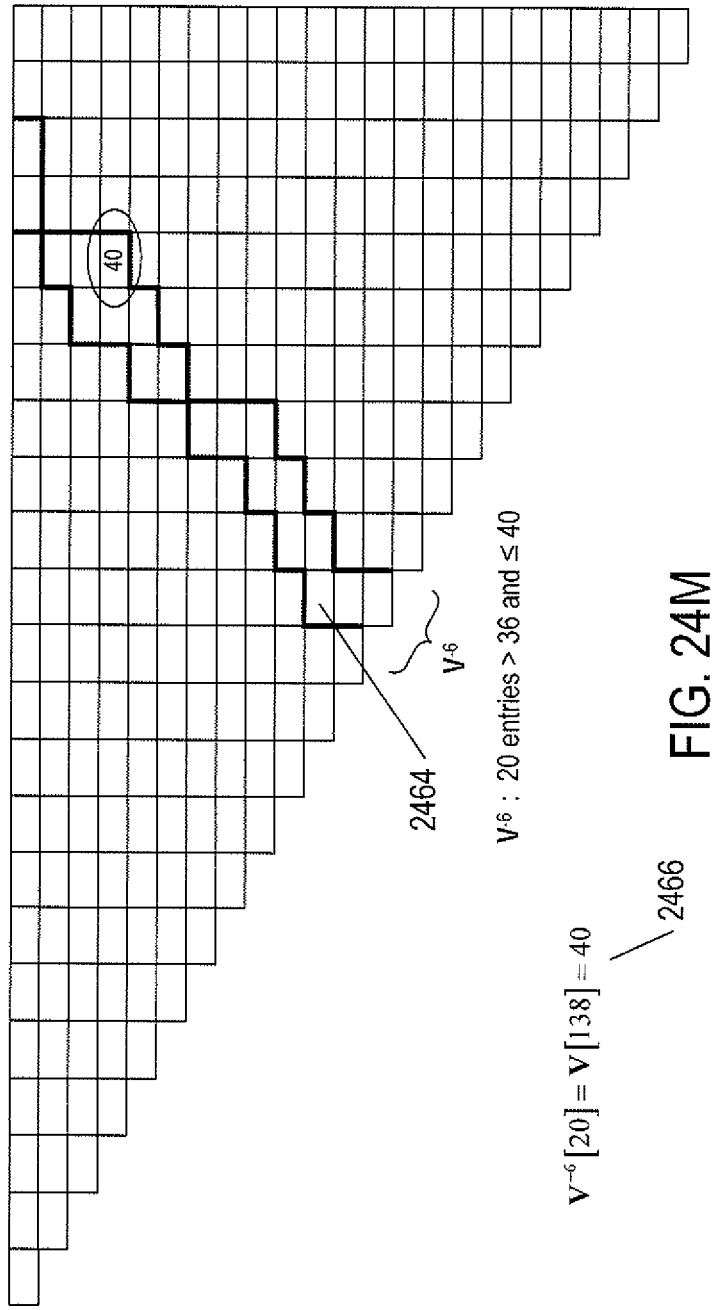

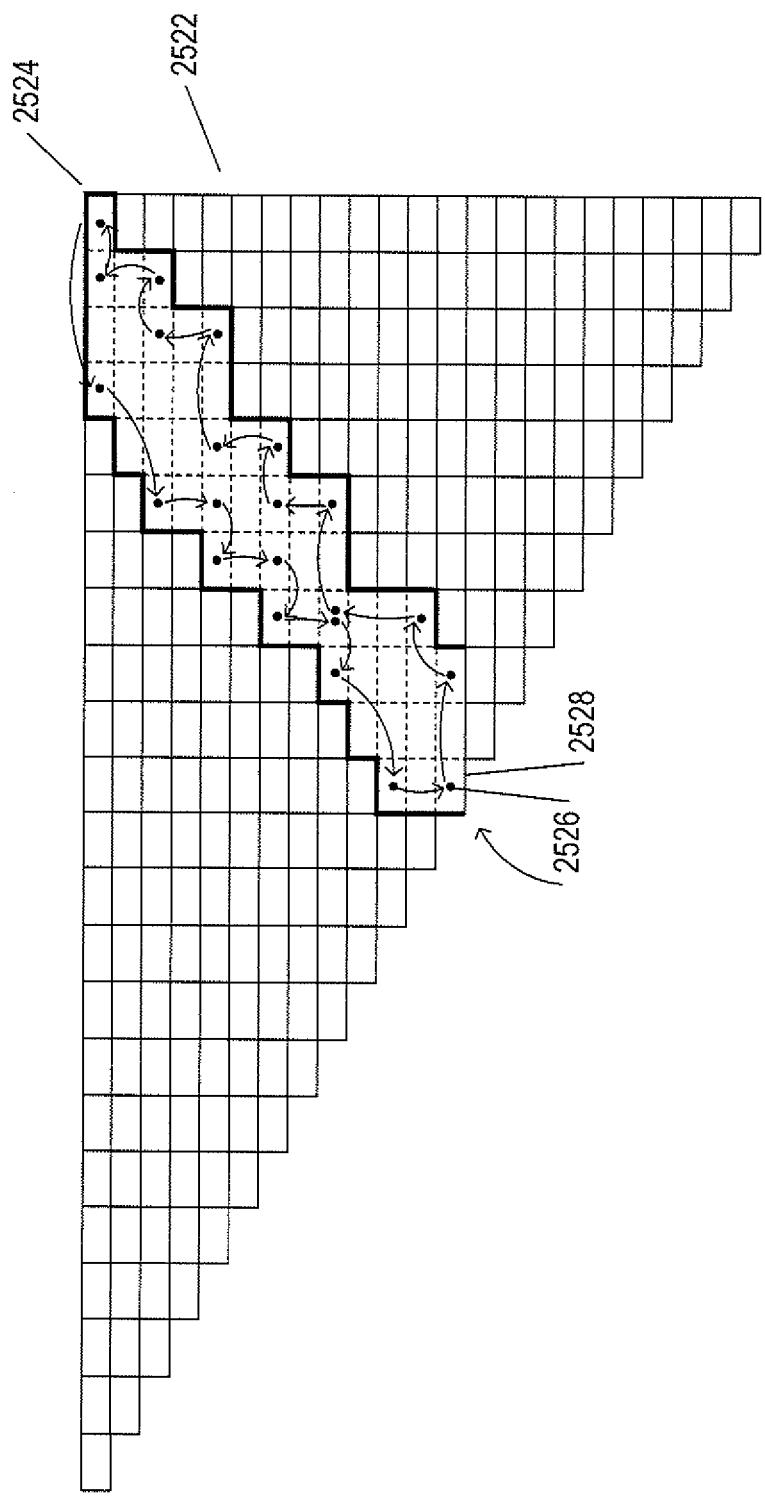

$\hat{\varepsilon}$
$\begin{bmatrix} .01 \\ .3 \\ .27 \\ .02 \\ .6 \\ .17 \\ .31 \\ .2 \\ .03 \\ .07 \\ .21 \end{bmatrix}$
/2706

$R(\hat{\varepsilon})$
$\begin{bmatrix} 1 \\ 9 \\ 8 \\ 2 \\ 11 \\ 5 \\ 10 \\ 6 \\ 3 \\ 4 \\ 7 \end{bmatrix}$
/2702

$aR(\hat{\varepsilon})$
$\begin{bmatrix} -1.44 \\ .866 \\ .577 \\ -1.15 \\ 1.44 \\ -2.89 \\ 1.15 \\ 0 \\ -.866 \\ -.577 \\ .289 \end{bmatrix}$
/2704

FIG. 27A

| $i$ | 1 | 2 | 3 | 4 | 5 | 6 | | $\sum_{i=1}^{n} a^2(i)$ |
|---|---|---|---|---|---|---|---|---|
| $n=1,\ a^2(i)$ | 0 | | | | | | → | 0 |
| $n=2,\ a^2(i)$ | .33 | .33 | | | | | → | .66 |
| $n=3,\ a^2(i)$ | .75 | 0 | .75 | | | | → | 1.5 |
| $n=4,\ a^2(i)$ | 1 | .12 | .12 | 1 | | | → | 2.24 |
| $n=5,\ a^2(i)$ | 1.33 | .33 | 0 | .33 | 1.33 | | → | 3.32 |
| $n=6,\ a^2(i)$ | 1.53 | .55 | .06 | .06 | .55 | 1.53 | → | 4.28 |

METHODS AND AUTOMATED SYSTEMS FOR TESTING, OPTIMIZATION, AND ANALYSIS THAT USE ROBUST STATISTICAL PROCESSING OF NON-BINOMIAL EXPERIMENTAL RESULTS

CROSS-REFERENCE TO RELATED APPLICATION

This application claims the benefit of Provisional Application No. 61/709,074, filed Dec. 18, 2012.

TECHNICAL FIELD

The current document is directed to automated systems for testing, optimization, and/or analysis, methods employed in such systems, and, in particular, to website-testing systems and methods that incorporate automated and efficient robust methods for processing non-binomial experimental results.

BACKGROUND

During the past 20 years, the continued evolution of computer processors, data-storage devices and subsystems, and networking, together with the emergence of the World Wide Web and broad consumer acceptance of the Internet, have created a vast new Internet-based retailing infrastructure that represents a significant portion of current retail transactions for products and services. In certain retail sectors, including books and recorded music, Internet-based retail transactions now rival or have surpassed traditional retailing media, including physical retail establishments and catalog-based mail-order and telephone transactions. It is expected that Internet-based retailing will continue to grow and assume increasingly greater shares of the total retail-transaction volumes on a worldwide basis.

As Internet-based retailing of products and services has evolved and increased in market share, a variety of new support industries have grown up around Internet-based retailing, including cloud computing, website-development services, Internet-transaction services, automated testing and optimization services, and web-analytics services. Automated testing and optimization services provide tools and infrastructure to allow owners and managers of websites to carry out experiments in which websites are systematically altered in order to determine salient features and characteristics of websites and modify the salient features and characteristics to improve website performance. Traditionally, automated testing systems have focused on conducting experiments which produce binomial results, such as whether a particular user ends up purchasing an item from the website or not during a user's session. While many different types of tests can be cast into the realm of binomial-result analysis, those who perform testing, optimization, and/or analysis, as well as those for whom testing, optimization, and/or analysis is performed, continue to seek more flexible and more broadly based testing, optimization, and/or analysis methods and systems in order to create and perform tests directed to understanding additional features, characteristics, and subtleties of website design and operation.

SUMMARY

The current document is directed to automated electronic testing, optimization, and/or analysis systems that perform testing that results in non-binomial experimental results that are processed by using efficient and robust processing methods. In one implementation, efficient and robust processing methods are employed to process non-binomial results produced from single-factor tests. In a second implementation, robust and computationally efficient processing methods are employed to analyze non-binomial results from multi-factor/multi-level tests.

BRIEF DESCRIPTION OF THE DRAWINGS

FIGS. 5A-C illustrate three of many different possible methods by which website-testing services carry out tests of web pages served by remote web servers.

FIG. 6 illustrates single-factor testing.

FIG. 9A illustrates a single-factor test assuming a binomial distribution of test results.

FIGS. 9B-D illustrate various different relationships between the probability distributions for the control web page versus those of an experimental web page.

FIG. 13 shows a mathematical model for the analytical test based on the design array shown in FIG. 12.

FIGS. 14A-E illustrate a method for processing multi-factor/multi-level test results based on the mathematical model discussed with reference to FIG. 13.

FIG. 15 illustrates the multi-factor/multi-level web site-testing methodology used, in certain web analytics systems, for obtaining and processing test results.

FIGS. 16A-D illustrate determination of the values listed in an ANOVA table.

FIGS. 18A-B illustrate a difference between binomial experiments and non-binomial experiments.

FIGS. 19A-F illustrate a robust web-analytics method for processing data obtained from a single-factor website test.

FIG. 21 illustrates the significance determination for web-page variants 2 and 3 in the example of FIGS. 19A-20B with a control web page and web-page-variant 2.

FIG. 22 illustrates a general problem in which a value of an element corresponding to a sorted-array index is sought.

FIGS. 24A-M provide an illustration, using an example sorted vector of initial values, of the determination of the midpoint value of the sorted vector of pair-wise sums V.

FIGS. 25A-F provide a control-flow-diagram description of the generalized method for finding the $i^{th}$ element of a sorted array, discussed above with reference to FIGS. 22-24M.

FIG. 27A illustrates the transformation of $\hat{\epsilon}$ to $a(R(\hat{\epsilon}))$ using a small example column vector $\hat{\epsilon}$.

FIG. 27B shows a table of values of the function $a^2(\,)$ for the first six positive integers.

DETAILED DESCRIPTION

The current document is directed to automated methods and systems for website testing. Because of the complexity of the method and systems to which the current document is directed, the following discussion is divided into a number of subsections that each refer to relatively large numbers of figures. In a first subsection, entitled "Overview of Website-Testing Systems," a general overview of web-analytics systems and of various implementations of web-analytics systems is provided. A second subsection, entitled "Single-Factor Analysis," discusses the traditional processing of single-factor binomial test data. A third subsection, entitled "Multi-factor/multi-level Analysis," discusses traditional processing of multi-factor/multi-level binomial test results. A fourth subsection, entitled "Non-binomial Data," discusses the nature of non-binomial results produced from many types of testing. A fifth subsection, entitled "Robust Processing and Analysis of Single-Factor, Non-binomial Test Results," discusses a first implementation of the robust and efficient methods for processing non-binomial data within an automated web-analytics system to which the current document is directed. A sixth subsection, entitled "Robust and Efficient Processing of Multi-factor/multi-level Non-binomial Test Results in an Automated Web-Analytics System," discusses a second implementation of the robust and efficient processing methods and automated systems to which the current document is directed.

It should be noted, at the onset, that the currently disclosed methods carry out real-world operations within physical systems and that the currently disclosed systems are real-world physical systems. Implementations of the currently disclosed subject matter may, in part, include computer instructions that are stored on physical data-storage media and that are executed by one or more processors in order to carry out website testing and to analyze results accumulated during website testing. These stored computer instructions are neither abstract nor characterizable as "software only" or "merely software." They are control components of the systems to which the current document is directed that are no less physical than processors, sensors, and other physical devices.

Overview of Website-Testing Systems

Figure 1:
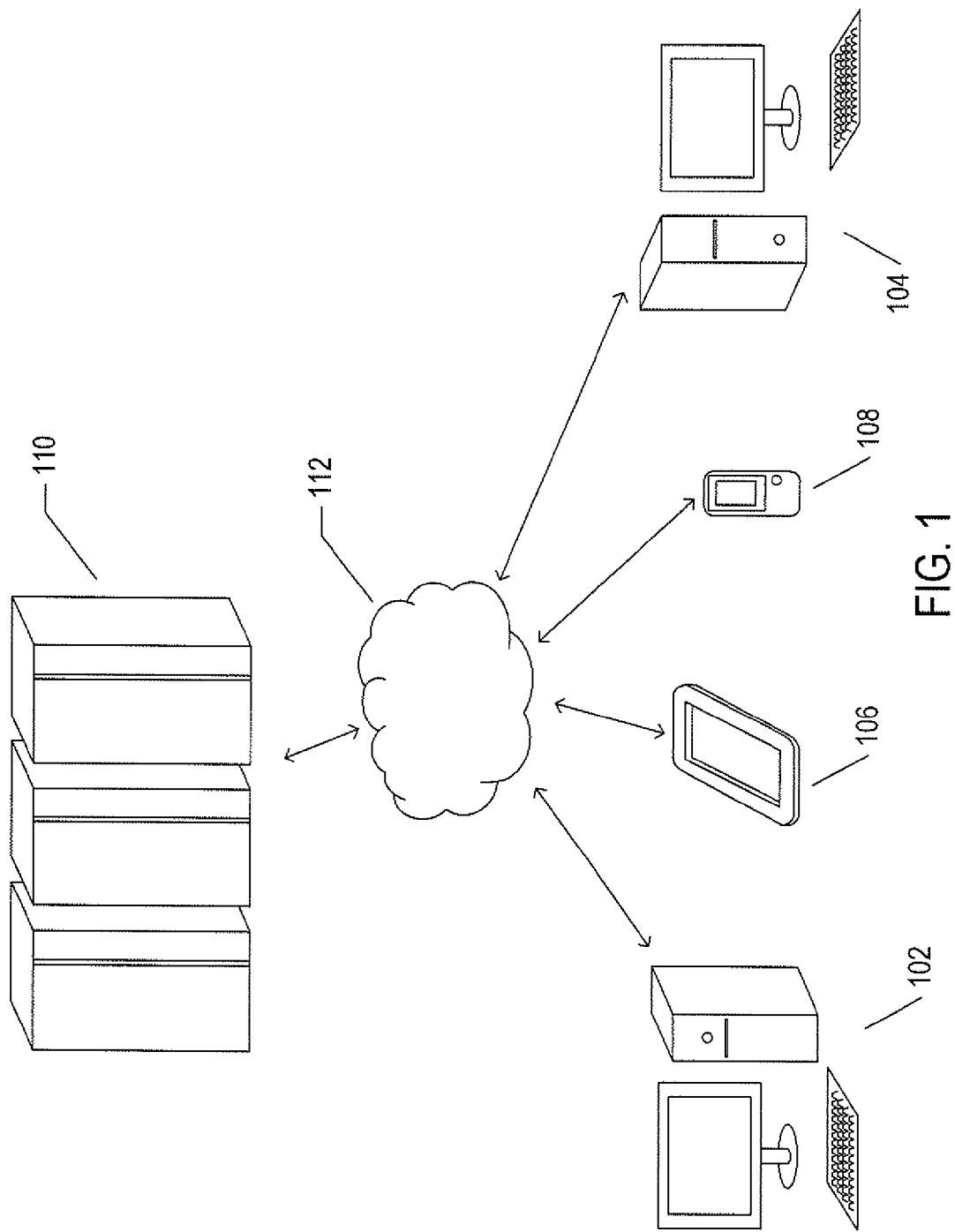
FIG. 1 illustrates an environment in which web analytics are conducted.

FIG. 1 illustrates an environment in which web analytics are conducted. Various users of a website employ a variety of different types of user devices, including personal desktop computers 102 and 104, electronic tablets 106, smart phones 108, and other such processor-controlled electronic devices to connect to a remote computer system 110 in order to access the pages of a website served by the remote computer system 110 through the Internet 112. Of course, each of the user devices, the remote computer system, and the Internet are extremely complex systems that would require thousands, tens of thousands, or more pages to describe in detail. As one example, a particular user device may access the websites served by the remote computer system through a local area network, various bridge and router systems, multiple wide-area networks, various routing systems, and a second local area network. In other cases, these systems may further include mobile-cell systems or public switched telephone networks.

The remote computational system 110 may be a single server computer, a larger system that includes multiple server computers, and an even larger, distributed system that may include a variety of different types of computer systems interconnected with local and wide-area networks, or server computers and other types of computers of a cloud-computing facility that provide virtual web servers and other virtual systems to a website owner. As another example, the remote computer system 110 may include hundreds of blade servers within blade-server enclosures, complex power supplies and other support components, network-attached mass-storage devices, including disk arrays, and many internal layers of control processes and application programs. In certain cases, the collection of data and the analysis of the collected data involved in web-analytics-based analysis of one or more tests may be carried out within the same remote computer system that serves web pages to users. In other cases, as discussed below, a separate web-analytics system carries out all or a portion of the website testing.

Figure 2:
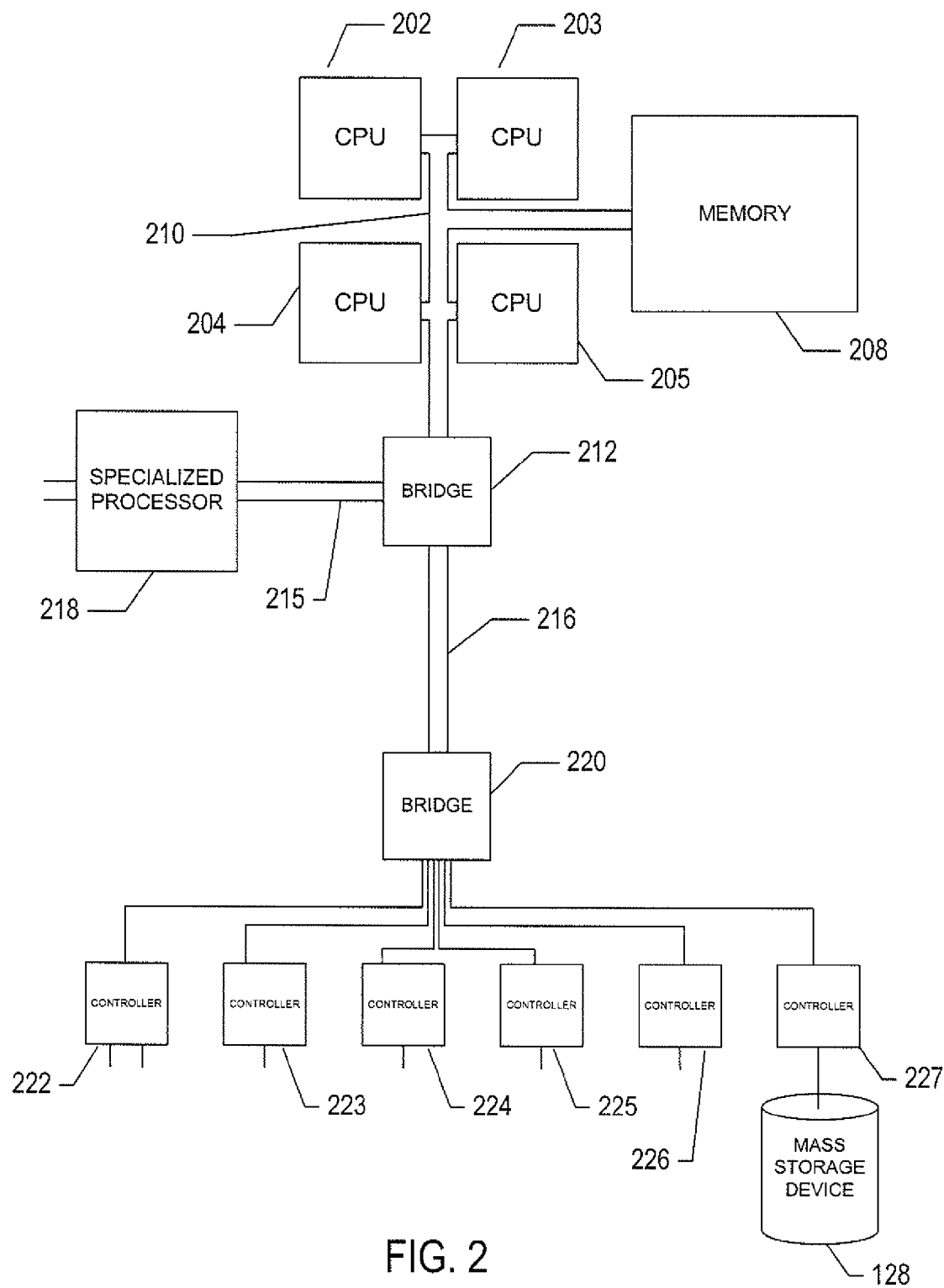
FIG. 2 provides a general architectural diagram for various types of computers.

FIG. 2 provides a general architectural diagram for various types of computers. The computer system shown in FIG. 2 contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational resources.

Figure 3:
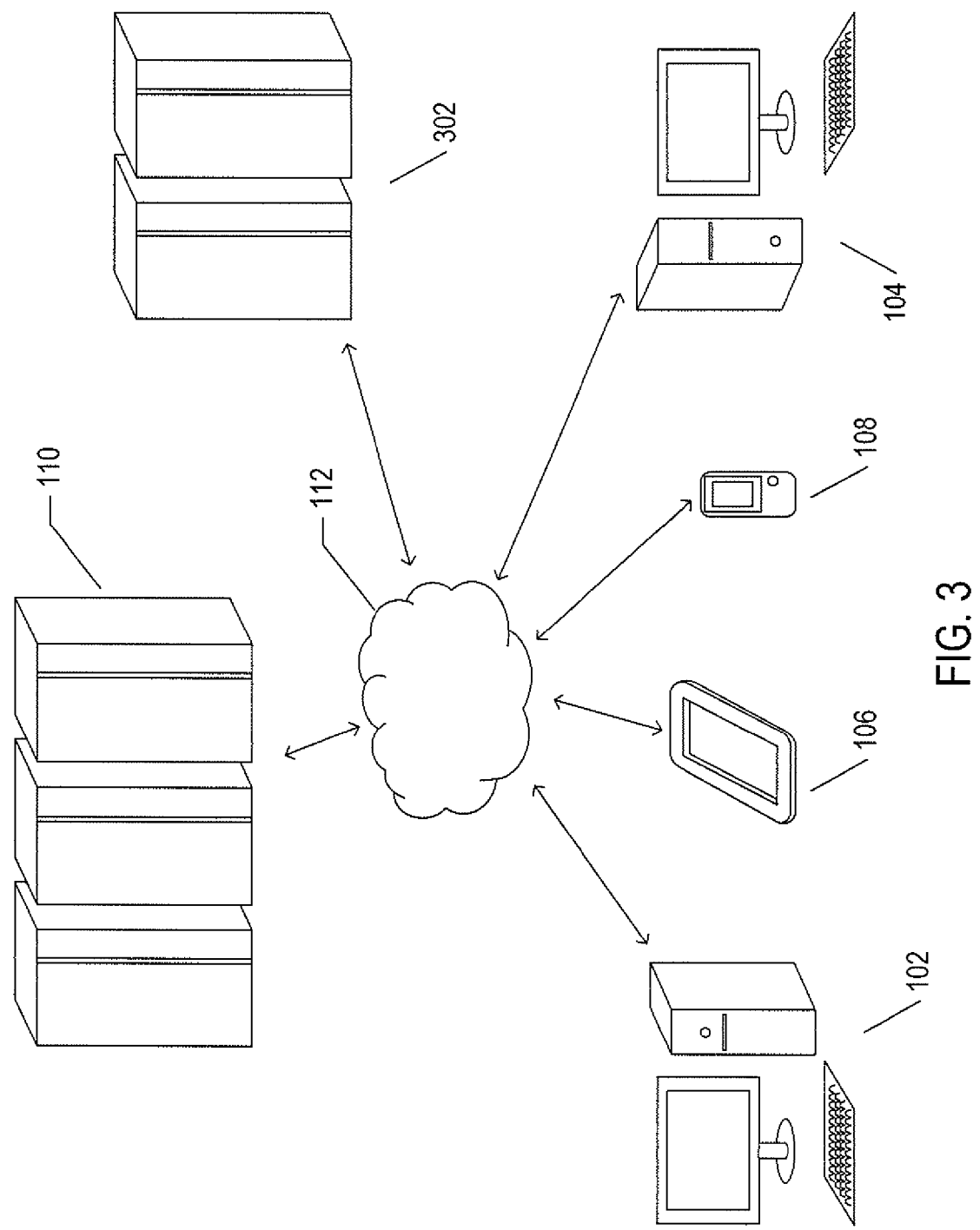
FIG. 3 illustrates a second type of environment in which tests are conducted to provide data for an automated web-analytics system.

FIG. 3 illustrates a second type of environment in which tests are conducted to provide data for an automated web-analytics system. FIG. 3 uses the same illustration conventions as used in FIG. 1 and shows the same different types of user devices 102, 104, 106, and 108, the remote computer system 110 that serves a website accessed by users using these devices, and the Internet 112. The computational environment also includes another remote computer system 302 that carries out all or a portion of website testing and analysis of test results. This remote system, just as the website-serving system 110, may be a single computer system, multiple interconnected computer systems, a geographically distributed computer system, virtual computers and data-processing facilities provided by a cloud-computing facility, and other types of computational facilities.

Figure 4A:
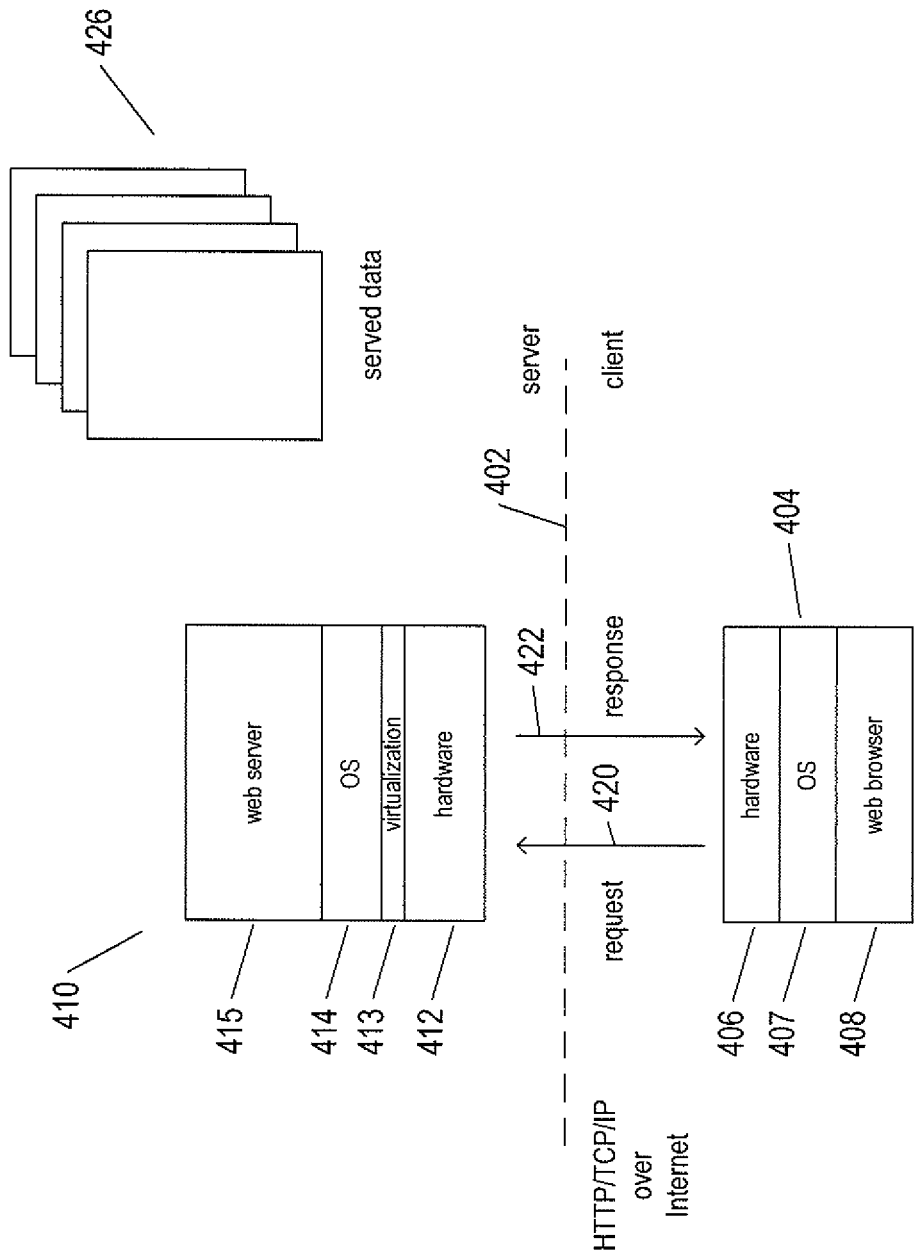
FIGS. 4A-C illustrate the exchange of information between a user of a website and the remote computer system that serves the website both under normal conditions as well as during testing of a website.
Figure 4B:
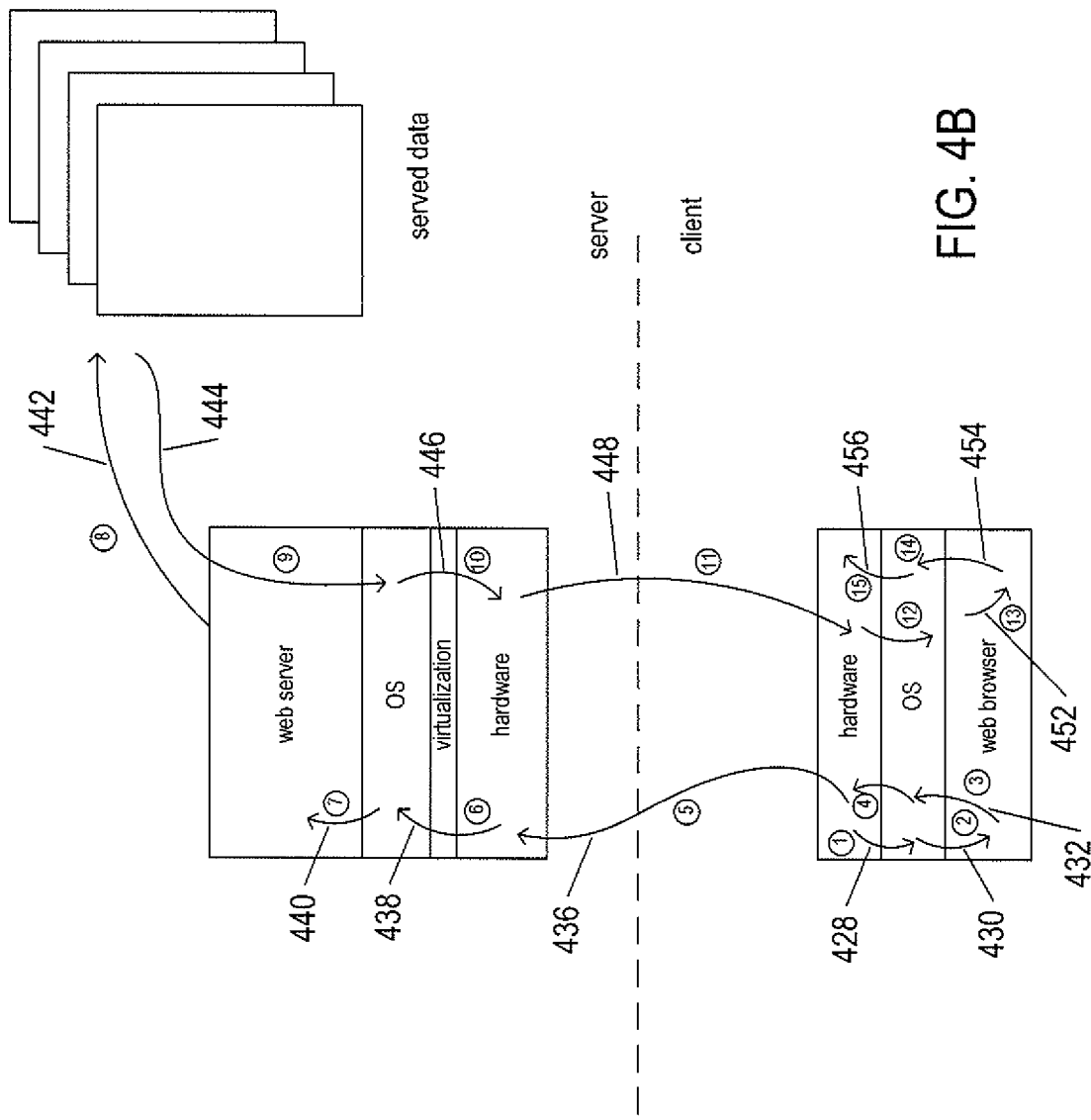
Figure 4C:
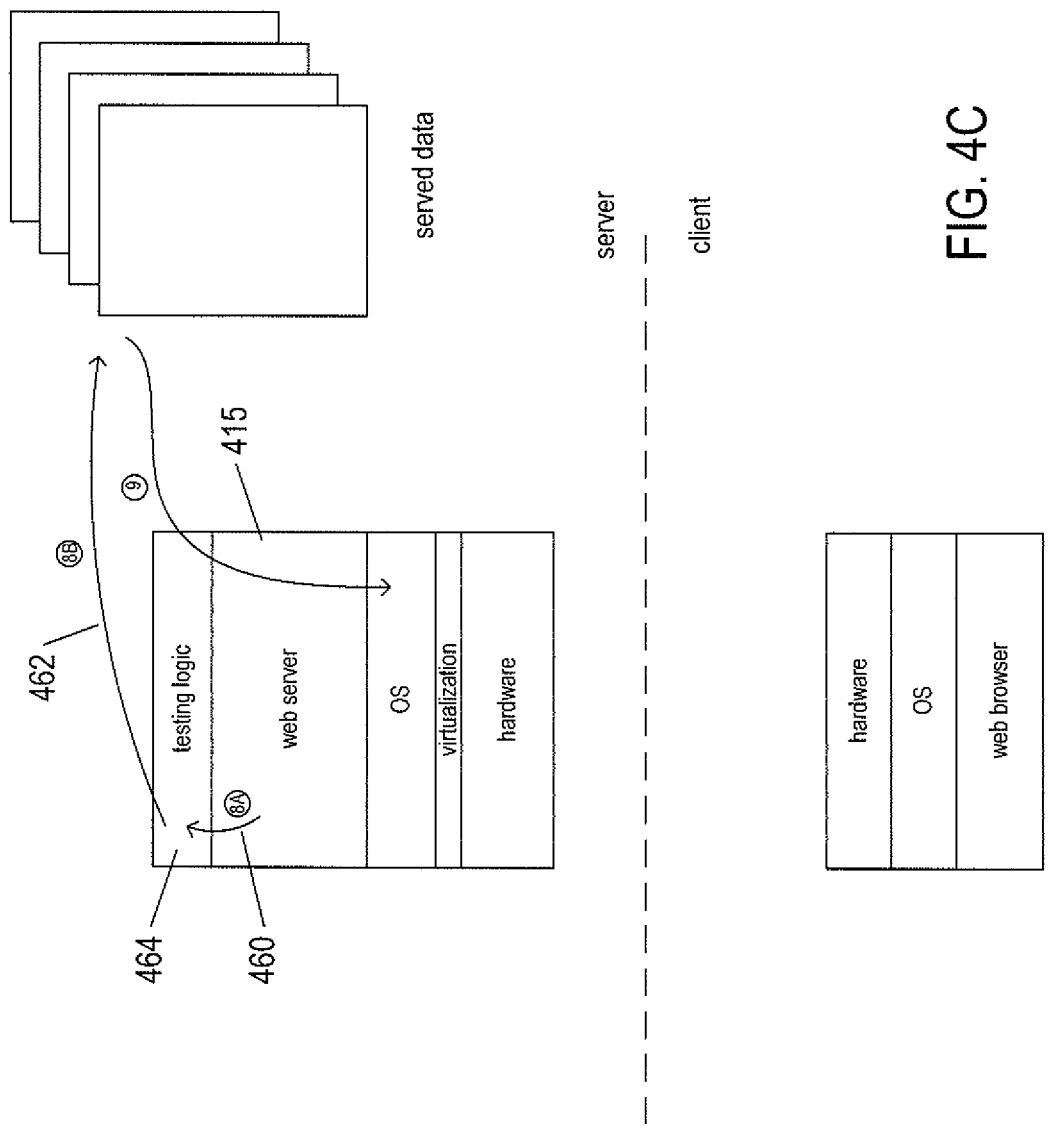

FIGS. 4A-C illustrate the exchange of information between a user of a website and the remote computer system that serves the website both under normal conditions as well as during testing of a website. FIG. 4A shows the basic components within the user device and remote web server. In FIG. 4A, dashed horizontal line 402 represents the boundary between the user or client device, below the dashed line, and the remote website-serving system, above the dashed line. The user device 404 is illustrated as having three fundamental layers: (1) a hardware layer 406; (2) an operating-system layer 407; and (3) a web-browser application program 408. The remote web-serving computer system 410 is similarly illustrated as having four fundamental layers: (1) a hardware layer 412; (2) a virtualization layer 413; (3) an operating-system layer 414; and (4) a web-server application program 415. The basic interaction between users, or clients, and the web-serving computer system is a client/server request/response protocol. In this protocol, clients initiate information exchange by making a request 420 to the server and receive the requested information in a response 422 transmitted from the web server to the client device. In order for the web browser of the client device to receive the information needed to display a particular web page to a user, a large number of request/response transactions may be carried out. Many different types of information may be requested by client devices and furnished by web servers, including hypertext markup language ("HTML") files, any of various different types of image files, such as .JPG files, executable code, audio files, streaming video, and other types of data. Often, the client/server protocol used for website access is a logical stack of protocols described as HTTP/TCP/IP over the Internet, where HTTP is the high-level hypertext transport protocol, TCP is a lower-level transmission control protocol, and IP is the still-lower-level Internet protocol. However, for any particular client and web server, many additional protocol layers may be involved to provide the high-level client/server request/response communications between a user device and the website-serving computer system. In general, the website-serving computer system 410 also stores at least a portion of the data 426 that is exchanged with user devices in order to display web pages on the user devices.

FIG. 4B illustrates a generalized sequence of events that occur during a single request/response transaction between the client and server. FIG. 4B, and FIG. 4C that follows, uses the same illustration conventions as used in FIG. 4A. In the example shown in FIG. 4B, the request sent from the client to the server is initiated by a user input, such as the click of a mouse when the mouse cursor overlays a hyperlink. The user's mouse click is sensed by the mouse controller in a first step represented by arrow 428. Note that, in FIG. 4B, and in FIG. 4C that follows, each step is represented by a curved arrow that is additionally annotated with a step number to indicate the sequence of operations underlying the request/response transaction. Hardware detection of the mouse-click event results in an interrupt being sent to the operating system. The operating system fields the interrupt, in a second step 430, determines that the interrupt represents an event to be handled by the web browser application running within the client device, and notifies the web browser of the occurrence of the event through a software interrupt, asynchronous call back, or some other mechanism by which events are transferred from the operating system to the application program to which the events are related. In a third step 432, the web browser handles the mouse-click event, using the mouse-cursor position to determine that the mouse-click event was directed to a hyperlink and then formulates a request to send to the web server that serves the web page represented by the hyperlink and requests transmission of the request from the operating system by calling a system call for transmitting the request message. In general, there may be additional transactions between the client device and a DNS server in order for the IP address of the web-serving computer system to be identified so that the request message can be directed to the website-serving computer system. Those additional request/response transactions are omitted from FIG. 4B in the interest of clarity and simplicity of illustration.

The operating system then processes the request through numerous protocol layers and passes the processed request to the hardware, in a fourth step 434, which carries out several additional lower-level protocol-based processing steps before transmitting the request message to a communications media that results in the request message traversing the Internet and arriving at the web server, in a fifth step 436. In this case, the primary hardware component involved in the message transmission, aside from internal busses or serial connections, is a network interface controller or wireless interface controller. Within the web server, the message is received by a complementary hardware controller and passed, in a sixth step 438 to the operating system of the web server. The operating system processes the received message and, in a seventh step 440, transfers the message to the web-server application running on the web server along with some type of software interrupt or asynchronous call back to alert the web-server application that a new message is available for processing. The web-server application processes the message contents and determines that the message represents a request for the HTML file that encodes a particular web page that is represented by the hyperlink initially clicked by the user of the user device. The web-server application, in an eighth step 442 then retrieves the HTML file and creates a response message containing the file, in a ninth step 444 that the web-server application passes to the operating system. The operating system then applies various protocol layers and passes the processed response message to the hardware layer, in a tenth step 446 for transmission back to the client device. In many cases, although not shown in FIG. 4B, the various protocol layers executed within the operating system result in the response message being broken up into a sequence of data messages, each containing a portion of the HTML file, which are then transferred one after another to the client device in multiple steps, all represented by the single eleventh step 448 in FIG. 4B.

When the HTML file has been received, possibly through multiple low-level messages, and assembled into memory by the client hardware layer and operating system, in a twelfth step 450, the HTML file is passed to the requesting web-browser application in a thirteenth step 452. The web browser then processes the HTML file in order to generate a series of commands to the operating system, in a fourteenth step 454, that result in the operating system transmitting a large number of low-level display commands to the display device, in a fifteenth step 456 that result in display of the requested web page to the user on the client-device display screen. In many cases, during processing of the HTML file, the web-browser application may need to carry out many additional request/response transactions in order to fetch image files and other files that contain content displayed within the web page in addition to the basic web-page description contained in the HTML file.

FIG. 4C illustrates additional operations carried out within the web server in order to conduct website testing under certain types of website-testing-service implementations. The same actions that occur for general serving of a web page, illustrated in FIG. 4B, also occur during testing of the website. However, as shown in FIG. 4C, the eighth step (442 in FIG. 4B) is now expanded to include two separate steps 460 and 462 and the web-server application 415 includes, or runs in parallel with, an additional layer of testing logic 464. When the web-server application receives the request for a web page, the request is forwarded to the testing logic in step 460. The testing logic then determines, from the identity of the requesting client or client device and the identity of the web pages being accessed, whether the access to the web page represents a testing event or, in other words, whether the web page and requesting client represent a user access that falls under monitoring of events that together comprise a website test. If so, then the testing logic may access different content, in step 462, for return to the client device than the content that would be accessed for a non-test request for the web page. In other words, the testing logic may systematically alter the web page returned to the client device as a portion of an experiment conducted within a time interval corresponding to a test of the web page. The testing logic may also, in certain cases, consider the web-page access to be the start of a session during which other requests made by the same client device are monitored and combined together as a logical user session from which test results can be derived. For example, in a certain class of web-analytics experiments, the test data may include an indication of whether or not the user purchases a product or service during a session while the web page is under test, referred to as a "conversion" event when the user purchases a product or service during the session.

Thus, website testing can be carried out by testing logic included within the web server that serves the web pages under test. After the test period has been completed, or as the test data is being recorded by testing logic, various types of analytical processing may be performed on the test data to derive various types of analytical results.

In many cases, however, the testing of websites and the analysis of test data involves significant complexities and the development of large and complex testing and analysis methodologies. It has therefore become increasingly popular for website testing and the analysis of data collected during website testing to be fully or partially carried out by website-testing services that execute on different, discrete website-testing-service computer systems.

Figure 5A:
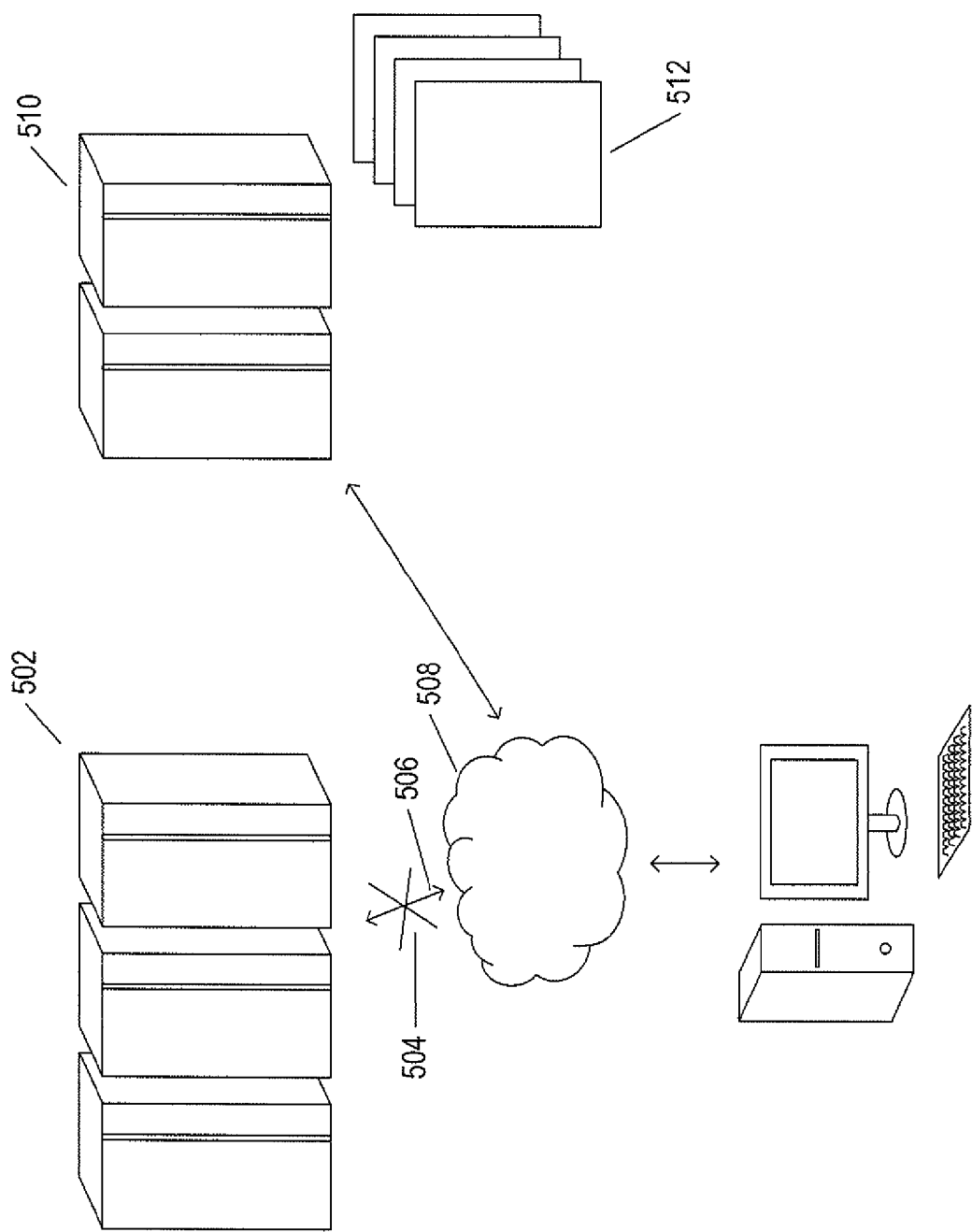
Figure 5B:
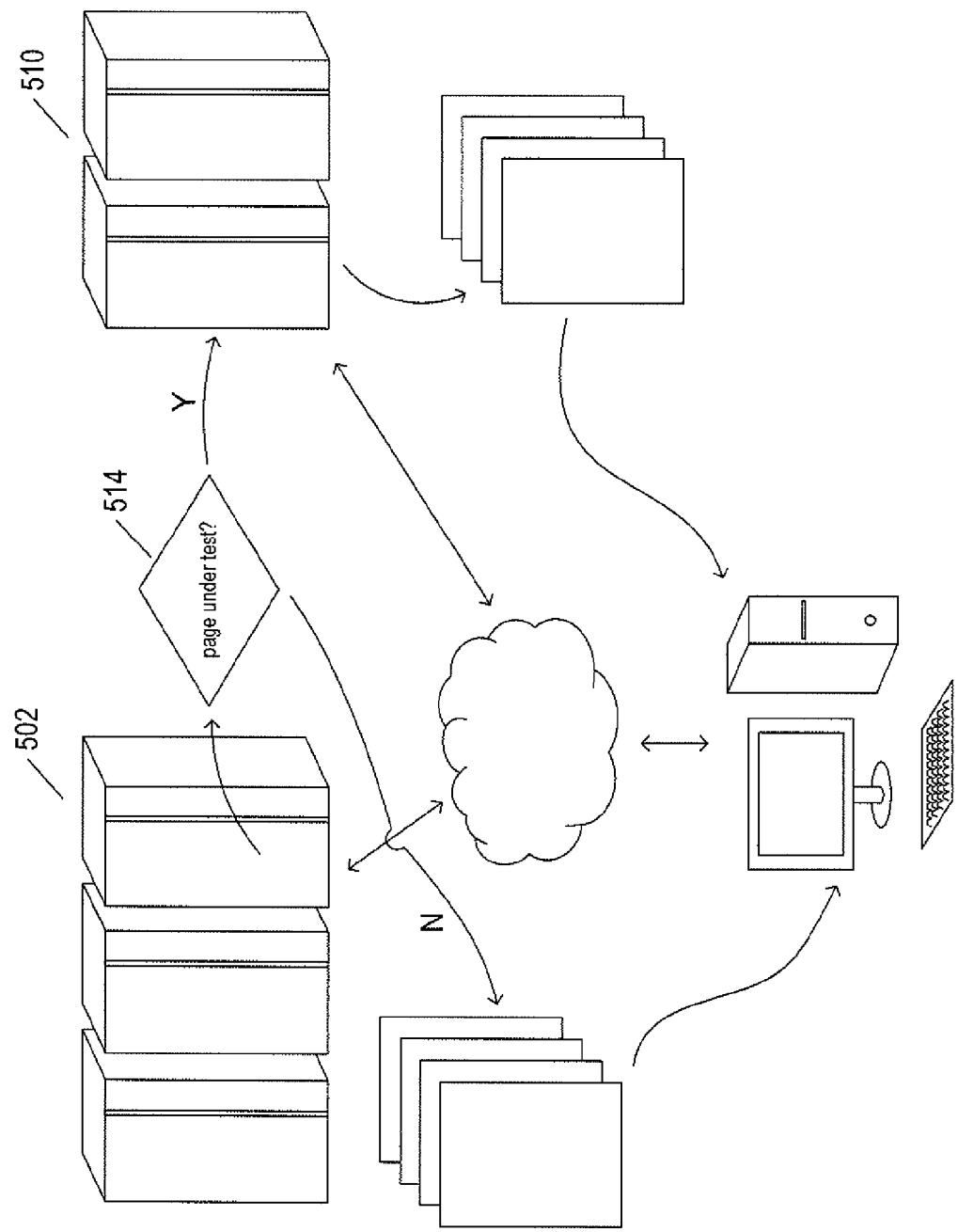

There are many methods for testing web pages by website-testing services. FIGS. 5A-C illustrate three of many different possible methods by which website-testing services carry out tests of web pages served by remote web servers. As shown in FIG. 5A, one approach is that, during the testing of a particular website, the web-server system 502 discontinues serving web pages, as indicated by the "X"-like symbol 504 overlying the double-headed arrow 506 representing request/response traffic between the web-server system 502 and the Internet 508. During testing, requests for web pages under test are redirected to the website-testing-service computer system 510, which serves the web pages under test to client devices in a fashion similar to that in which the web server 502 would normally serve web pages to requesting clients. In this case, the website-testing-service computer system 510 is provided, by the website owner, data for the web pages 512, including various alternative forms of web pages under test, as well as a test design so that the website-testing-service computer systematically provides altered web pages to clients and records client activities with respect to the web pages.

FIG. 5B illustrates a second approach to website testing. In this approach, client requests are initially forwarded to the web-server system 502. The web-server system includes logic to determine whether or not a requested page is current under test 514. When the web page is under test, then the request is forwarded to the website-testing-service computer system 510 which transfers the requested web page back to the client device. Otherwise, when the requested page is not under test, the page is returned to the requesting client device by the web-server system 502. There are many different variations of this general scheme involving various types of proxy servers and reverse proxy servers.

FIG. 5C illustrates yet an additional type of implementation of a website-testing service. In this approach, various tags, represented in FIG. 5C by the small dark rectangles, such as rectangle 520, within HTML files that encode web pages are introduced into the web pages by the web-server system. These tags indicate portions of the web page that are varied during testing of the web page. When a client device 522 requests the web page, the request is handled by the web-server system 502 in the normal fashion, but the client device receives a tagged web page. As the browser on the client device begins to process the HTML file corresponding to a requested web page under test, the browser identifies and processes the tags by requesting the website-testing-service computer system 510 to return an encoding of the object represented by the tag for display by the browser. The website-testing-service computer system also can use information transferred by the client-device browser in order to monitor user activities, within user sessions, related to web pages under test and collect and process the test data to provide various types of analysis.

Thus, there are many different possible implementations of website-testing applications and services. The currently disclosed computationally efficient and robust method and systems for analyzing non-binomial data produced by website testing can be incorporated into any of these various types of website-testing systems and services.

There are two different fundamental types of testing that are commonly carried out on web pages. A first type of test varies a single object, region, or feature of a web page and is referred to as a "single factor" test. FIG. 6 illustrates single-factor testing. As shown in FIG. 6, the test may involve serving each of multiple different variants of a single web page 602-605. Each web page includes a particular object or region 606-609, the contents of which is varied to generate the multiple web-page variations. Then, a website-testing service or website-testing logic incorporated within a web server provides generally equal numbers of the different web-page variants to users who access the page during a testing interval, often randomly selecting a particular web-page variant to return to each next user who accesses the web page. Ultimately, the accumulated test results can be thought of as comprising a test-result table 610. In the example results table shown in FIG. 6, each row of the table represents an observation, and includes an indication of the user who accessed the test page, an indication of the particular test-page variant served to the user, and a result. As one example, the result may be a binary indicator that indicates whether or not the user completed a retail transaction within a session or time interval following access of the web page. There are many other different types of results that may be derived during web-page testing.

Figure 7:
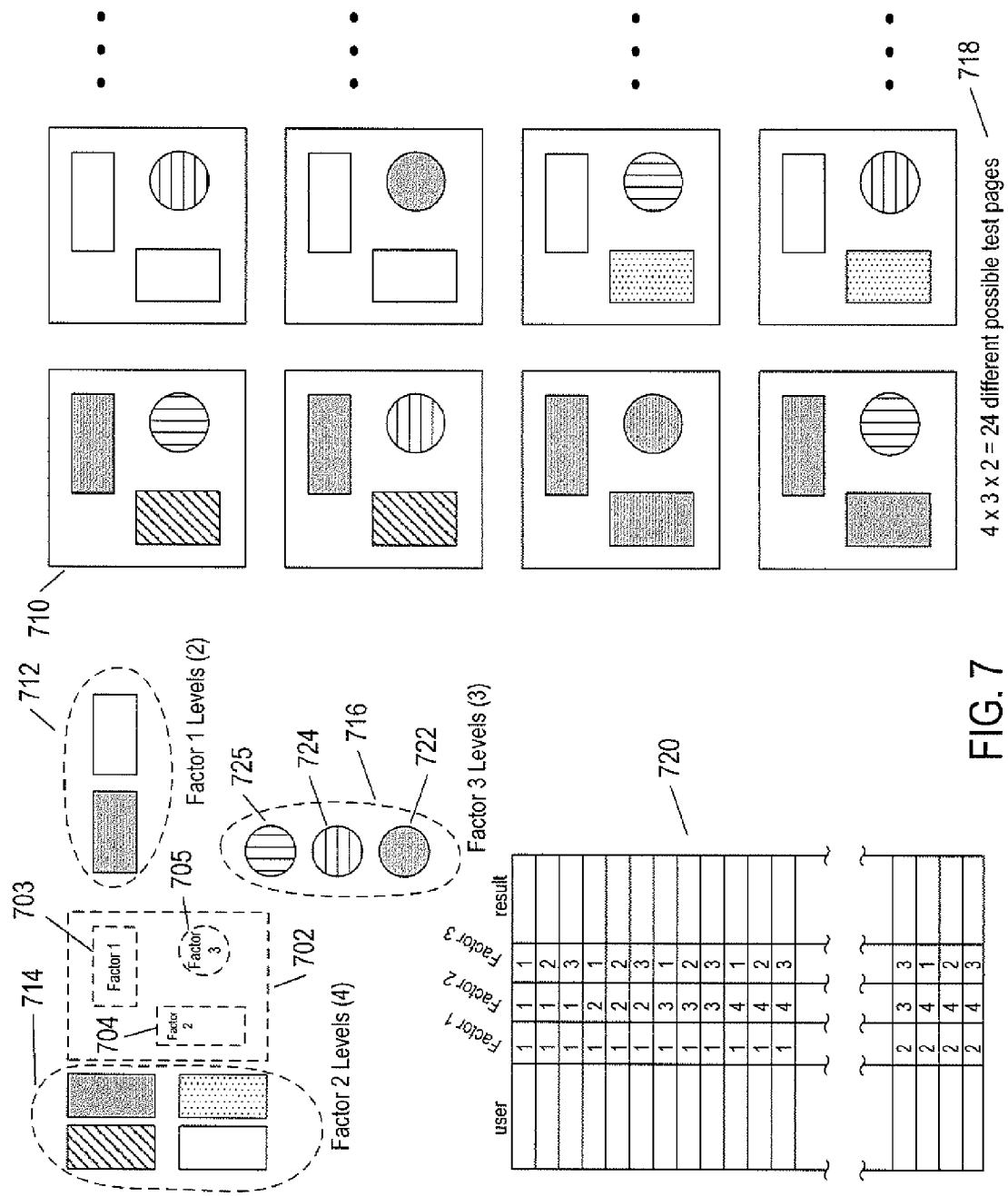
FIG. 7 illustrates a second type of web-page test, referred to as a "multi-factor/multi-level" test.

FIG. 7 illustrates a second type of web-page test, referred to as a "multi-factor/multi-level" test. In the second type of web-page testing, the web page being tested 702 includes multiple items, objects, or features 703-705 that are systematically varied to produce a relatively large number of different web-page variants, a portion of which 710 are shown in the right-hand portion of FIG. 7. The first object that is varied, factor 1 (703 in FIG. 7), includes two different variants, or levels 712, the second item or object within the web page that is varied, factor 2 (704 in FIG. 7), includes four different variants or levels 714, and the third item or object that is varied, factor 3 (705 in FIG. 7), includes three different variants or levels 716. As a result, there are 4×3×2=24 different possible test-page variants 718. Again, a website-testing service or website-testing logic embedded within the web server randomly selects a web-page variant from among the 24 different possible web-page variants to return to each next accessing user during a test interval, and collects observations or results that can be thought of as comprising a test-results table 720. In this test-results table, each row specifies an observation and includes an indication of the user, the level of each factor in the web-page variant served to the user, and a test result.

The goal of website testing is often to try various types of variants in a systematic fashion in order to identify factors that appear to be relevant with respect to a measured result as well as to identify particular levels of significant factors that positively contribute to desired results. For example, in the web-page-testing example of FIG. 7, it may be the case that of the three factors, only factor 3 significantly impacts whether or not users end up completing retail transactions. Furthermore, it may be determined that a solid-colored factor 3 (722 in FIG. 7) results in a larger percentage of completed retail transactions than either of the striped factor 3 variants 724-725. Thus, website testing may allow the website owner to determine that, by including a solid-colored factor 3 object in web pages, a greater proportion of accessing users will end up completing retail transactions through the website. Alternatively, the result of the experiment illustrated in FIG. 7 may encourage the website owner to devise additional tests to test a greater number of possible variants for factor 3, having concluded that factor 3 is the significant factor that determines whether or not retail transactions are completed by those who access the web page. Note that, although factor levels are illustrated in FIG. 7 as different colors or patterns within a rectangular object, factor levels may include one or more of a wide variety of differences, including differences in textual content of features, different images, different colors and shading, different font sizes, and many other such differences.

Single-Factor Analysis

Figure 8:
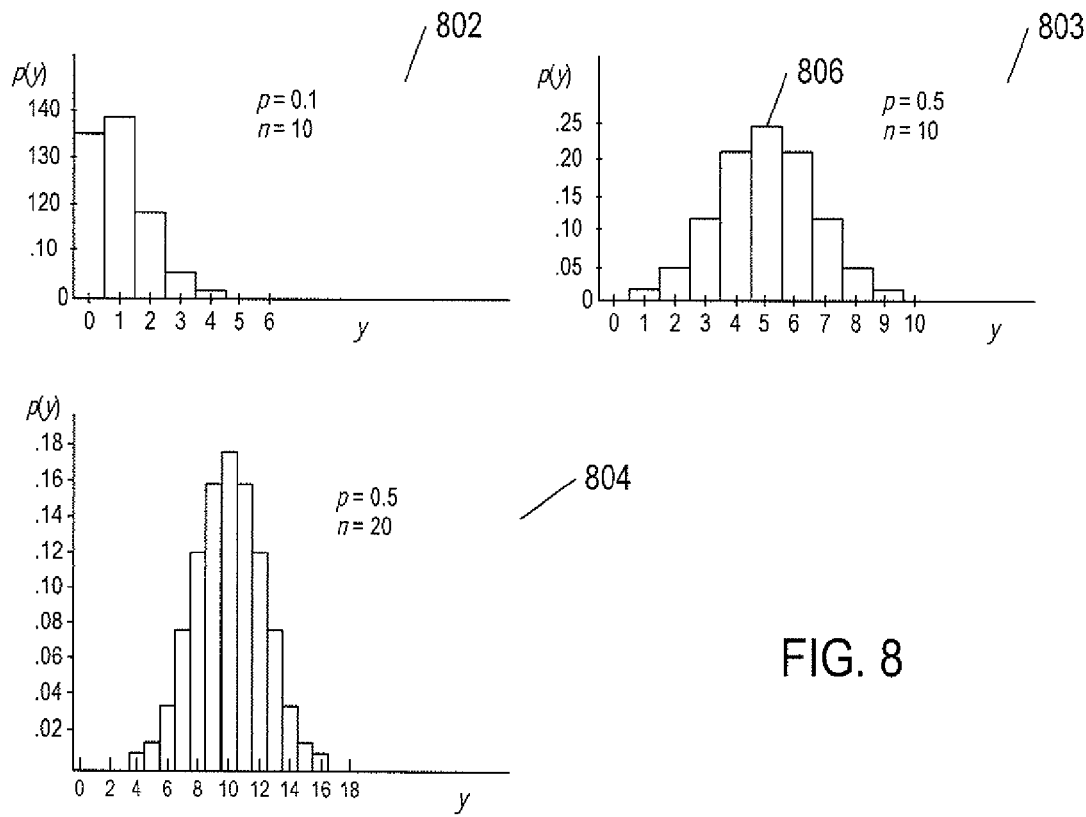
FIG. 8 illustrates the binomial distribution, which underlies processing of certain types of single-factor tests.

FIG. 8 illustrates the binomial distribution, which underlies processing of certain types of single-factor tests. Binomial distributions of test results occur when the experiment consists of n identical trials, each trial of which results in one of two different values, S or F, representing success or failure. What is deemed to be success and what is deemed to be failure is essentially arbitrary, and does not necessarily correspond to what a particular human observer might regard as a successful or non-successful outcome. In the following examples, the conversion rate for a test page is often used as the test result, where the conversion rate is the number of users who accessed the test page and completed some type of transaction as a result of the access divided by the total number of users who accessed the test page. For each trial, the probability of success, P(S), is equal to p and the probability of a failure outcome, P(F), is 1−p=q. The n trials are all independent from one another and the random variable Y stands for the number of the n trials that have resulted in an outcome S. The probabilities p and q are real values in the range [0,1]. The random variable Y can take on any value y in the set {0, 1, 2, . . . n}. When the value of p is known, the probability that an experiment results in a particular value y is straightforwardly computed as:

$$p(y) = \binom{n}{y} p^y q^{n-y}, y \in \{0, 1, 2, \ldots, n\},$$

where $$\binom{n}{y}$$

is the number of ways of choosing y values from a set of n values, and is equal to $$\frac{n!}{k!(n-k)!}.$$

In FIG. 8, plots 802-804 of the binomial distribution for various values of p and n are shown in histogram fashion. The height of each column, such as column 806, represents the probability P(y) that y successes are observed in the experiment.

In one approach to processing the test data produced by the single-factor test illustrated in FIG. 6, one of the web-page variants may be considered to be a control page with respect to which the other pages are evaluated. FIG. 9A illustrates a single-factor test assuming a binomial distribution of test results. As shown in FIG. 9A, the web-page variants include a control page 902 and four additional web-page variants 904-907. When each of the web-page variants, including the control and the four additional test web pages, is tested by a website-testing service, the test results are assumed to be binomially distributed, with the expected value for the random variable $$\frac{Y_i}{n_i},$$

$$E\left(\frac{Y_i}{n_i}\right) = \theta_i,$$

estimated from the test results as $$\frac{y_i}{n_i} = \hat{p}_i$$

and the variance $\sigma_i^2$ estimated as the product of $\hat{p}_i$ and $\hat{q}_i$ divided by $n_i$, or:

$$E\left(\frac{Y_i}{n_i}\right) = \theta_i \cong \frac{y_i}{n_i} = \hat{p}_i,$$

-continued $$\sigma_i^2 \cong \frac{\hat{p}_i \hat{q}_i}{n_i}.$$

Thus, as shown below each of the representations of the control and test web pages in FIG. 9A, following a testing interval, the expected result for each web page can be estimated from the collected results of the test. For example, in the case that the control web page was served to 100 users during the test interval, 35 of which completed a retail transaction, then the expected value for the conversion rate of the control web page can be estimated as $$\frac{35}{100} = 0.35$$
$$= \hat{p}_0.$$

Following the estimates of the expected values for the conversion rates of the control web page and the test web pages, the test results are analyzed, in certain analyses, to determine whether or not any of the estimated expected values for the test web pages significantly exceeds the expected value for the control page and, if so, to select the test web page with the largest expected value as being the feature variant most correlated with successful outcomes, such as retail-transaction completions, or conversions. FIGS. 9B-D illustrate various different relationships between the probability distributions for the control web page versus those of an test web page. As shown in FIG. 9B, both distributions may be identical, with the estimated expected values for the control page and the test page i, $\hat{\theta}_0$ and $\hat{\theta}_i$, respectively, identical. In this case, there is clearly no significant difference between the two distributions, since they are identical, and therefore the experiment fails to show that test web-page variant i is associated with a greater conversion rate than the control page. As shown in FIG. 9C, the distributions for the control page and experiment page may be somewhat offset from one another, with a relatively small difference 910 between $\hat{\theta}_0$ and $\hat{\theta}_i$. In this case, it may be difficult to decide whether the larger value of $\hat{\theta}_i$ with respect to $\hat{\theta}_0$ reflects a significant increase in conversion rate for test web page i versus that of the control web page. However, as shown in FIG. 9D, when the two distributions are offset from one another by relatively large distance 912, it is more likely that web page i is associated with a higher conversion rate than the control web page. In other words, as the difference between $\hat{\theta}_0$ and $\hat{\theta}_i$ increases, the probability that the distributions associated with observed conversion rates for the test web page and the control web page are similarly positioned decreases.

Figure 10:
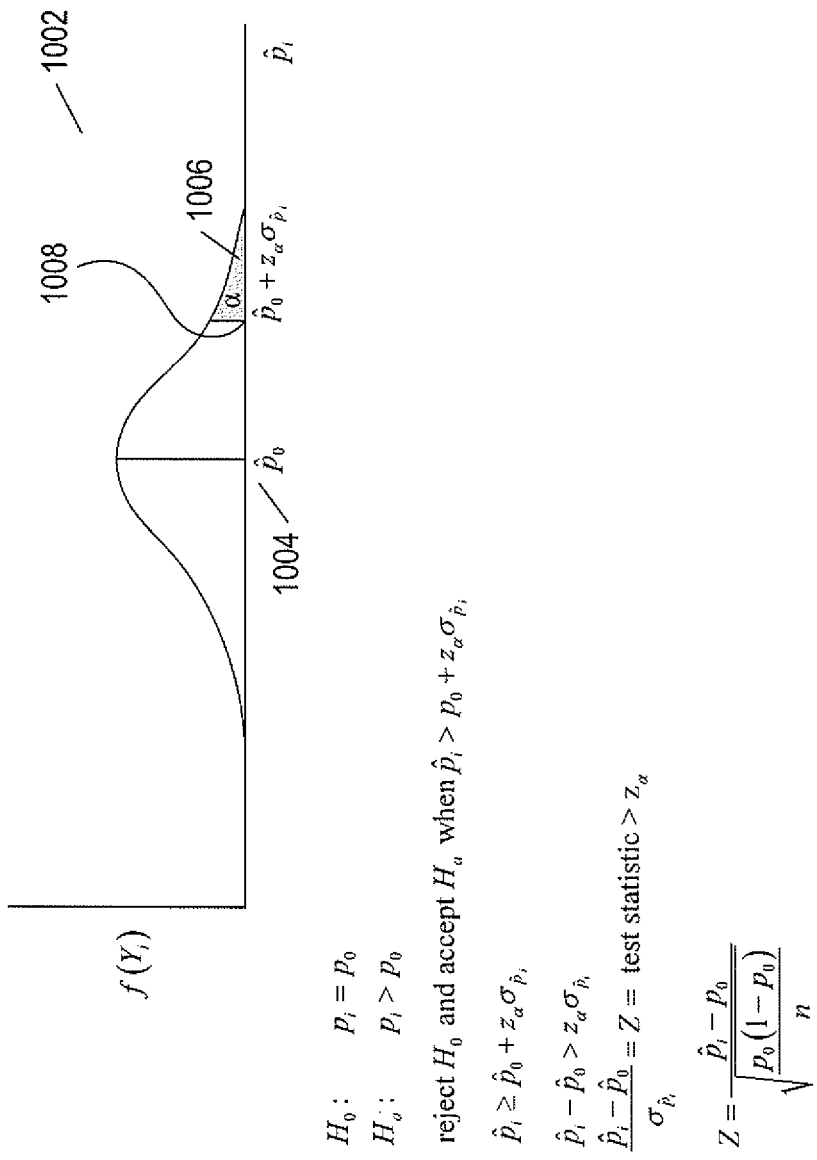
FIG. 10 illustrates one technique used to determine whether or not to ascribe significance to a particular test result for a web-page variant.

In automated website-testing systems, it is desirable that a quantitative measure of the significance of a test result be obtained so that the significance of an observed increased conversion rate for an test web page with respect to that of a control web page can be automatically determined and reported. In general, when the significance rises above a threshold significance, then the test web page is deemed to be associated with a higher conversion rate, or with some other such measured test results, than the control web page. FIG. 10 illustrates one technique used to determine whether or not to ascribe significance to a particular test result for a web-page variant. The process starts by defining a null hypothesis $H_0$ and an alternative hypothesis $H_a$. The null hypothesis $H_0$ is that the probability of success for the test web page, $p_i$, is equal to the probability of success for the control web page, $p_0$. The alternative hypothesis is that $p_i > p_0$:

$H_0: p_i = p_0$ $H_a: p_i > p_0.$

Thus, as shown in plot 1002, the method assumes that the probability distribution for $Y_i$ is a symmetrical, binomial distribution with expected value $\hat{p}_0$ 1004. A threshold value $\alpha$ is selected as the area underneath a right-hand tail of the probability distribution 1006 with the vertical boundary of the tail region located at $\hat{p}_0 + z_\alpha \sigma_{\hat{p}_i}$. The confidence interval corresponding to this selected threshold is $1-\alpha$. The smaller the magnitude of $\alpha$, the greater the confidence one can associate with a decision to either accept the null hypothesis or the alternative hypothesis. A test statistic Z is defined as $$\frac{\hat{p}_i - \hat{p}_0}{\sigma_{\hat{p}_i}}.$$

It is assumed that the test statistic is normally distributed. The probability that the test statistic Z is greater than the value $z_\alpha$, $P(Z > z_\alpha)$, is equal to $\alpha$ under this assumption. Values of $z_\alpha$ corresponding to various values of $\alpha$ are tabulated in tables for the normal distribution with a mean of 0. The larger the value of $z_\alpha$, the smaller the value of $\alpha$. For example, when $z_\alpha$ has the value 0, or corresponds to the mean, then a has $\alpha$ value of 0.5, corresponding to one-half of the area under the probability-distribution curve. However, when z has the value 2.57, $\alpha$ has the value 0.0051. Thus, when the test statistic Z is greater than $z_\alpha$, $\hat{p}_i$ is greater than $\hat{p}_0 + z_\alpha \sigma_{\hat{p}_i}$. The null hypothesis is therefore rejected and the alternative hypothesis is instead accepted. Thus, in order to determine whether or not the estimated probability of success, or conversion rate, for test web page i, $\hat{p}_i$, is significantly greater than the estimated conversion rate for the control page, $\hat{p}_0$ the method computes the test statistic Z and compares the value of the test statistic with $z_\alpha$. When the test statistic is greater than $z_\alpha$, the null hypothesis is rejected.

Figure 11:
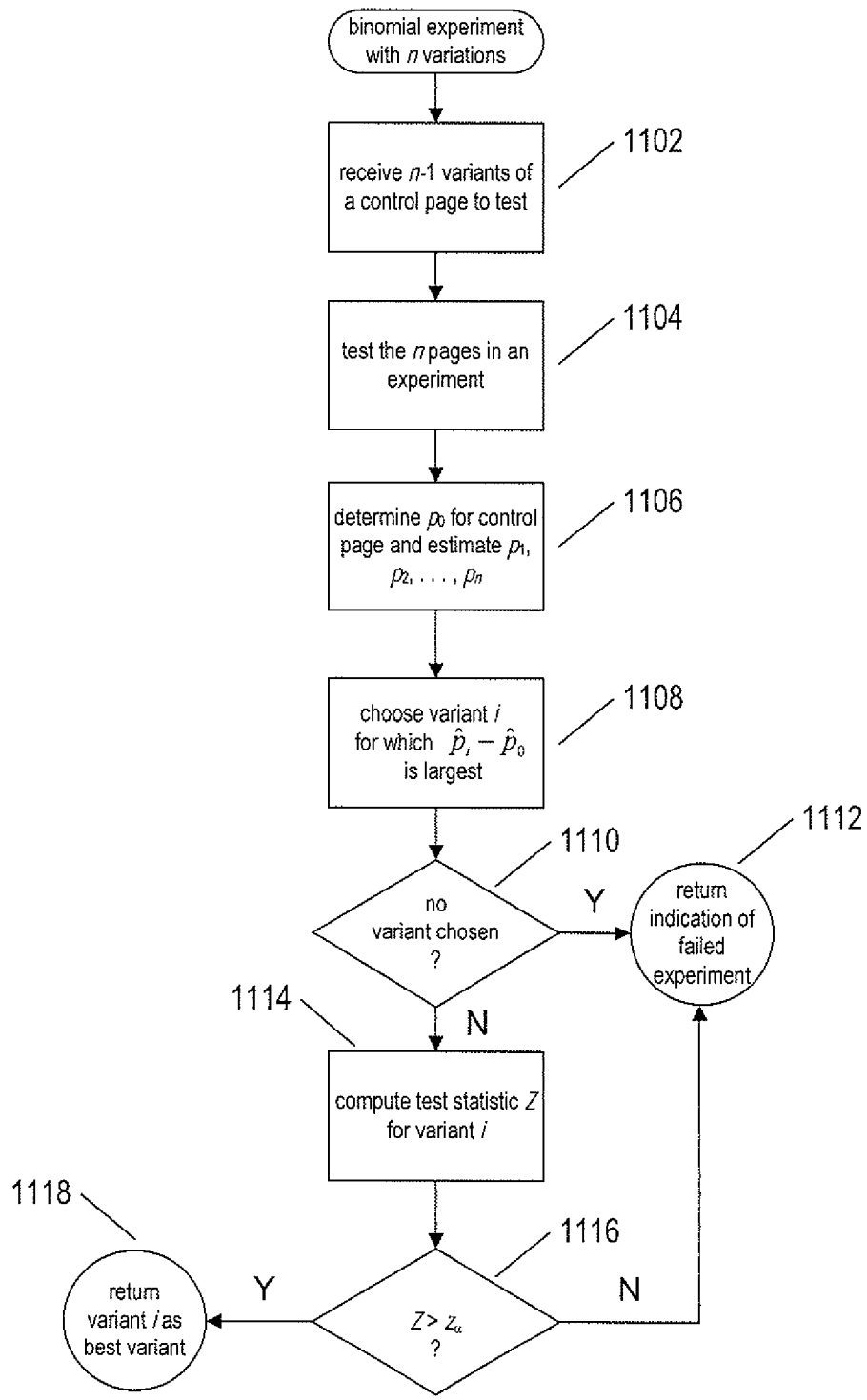
FIG. 11 provides a control-flow diagram that illustrates processing of test results for a binomial test with n variations, such as the test illustrated in FIG. 6.

FIG. 11 provides a control-flow diagram that illustrates processing of test results for a binomial test with n variations, such as the test illustrated in FIG. 6. In step 1102, n−1 variants of a control page are received for testing. In step 1104, the n web-page variants are tested, as discussed above with reference to FIGS. 1-6. Once the experiment has concluded, estimates for the probabilities of success, such as the conversion rate, for the control page and the n−1 variants of the control page are computed, in step 1106, as discussed above with reference to FIG. 9A. Then, in step 1108, those test web pages, or variants, for which $\hat{p}_i - \hat{p}_0$ is greater than 0 are selected and ordered in descending order in a list with respect to the computed difference between the estimated success rate for the variant and the estimated success rate for the control page. If no variants are selected, as determined in step 1110, then an indication of failure is returned in step 1112. Otherwise, in the for-loop of steps 1114-1118, the selected variants in the list created in step 1108 are evaluated, one-by-one, in descending order. The Z statistic for the currently considered variant is computed in step 1115. When the computed test statistic Z is greater than the threshold $z_\alpha$, as determined in step 1116, then the currently considered variant is returned, in step 1117, as the best web-page variant as determined by the test. Otherwise, when more selected variants remain on a list to be evaluated, as determined in step 1118, control flows back to step 1115. If no variants in the list are determined to have significantly greater success rate than the control page, then an indication of failure is returned in step 1112 at the conclusion of the for-loop of steps 1114-1118.

Multi-Factor/Multi-Level Analysis

In a multi-factor/multi-level experiment, as discussed above, a relatively large number of web-page variants are tested, each variant having a particular level for each of the multiple factors. For a relatively small number of factors and levels, a website-testing service can serve each possible web-page variant during a testing interval. However, in the general case, there are more possible web-page variants than can be adequately tested during reasonable testing intervals. In order to obtain statistically significant test results, a relatively large number of each web-page variant needs to be served to the reasonably large number of different users during the testing interval and, because the number of possible web-page variants increases geometrically with the number of factors and levels, a full combinatoric test is only practically possible for a relatively small number of factors, each associated with a relatively small number of levels. When the number of factors and associated levels exceed a threshold of reasonability, sparse tests can be designed to provide meaningful and statistically significant results for multiple factors associated with multiple levels, without the need to generate a full combinatoric set of all possible web-page variants.

Figure 12:
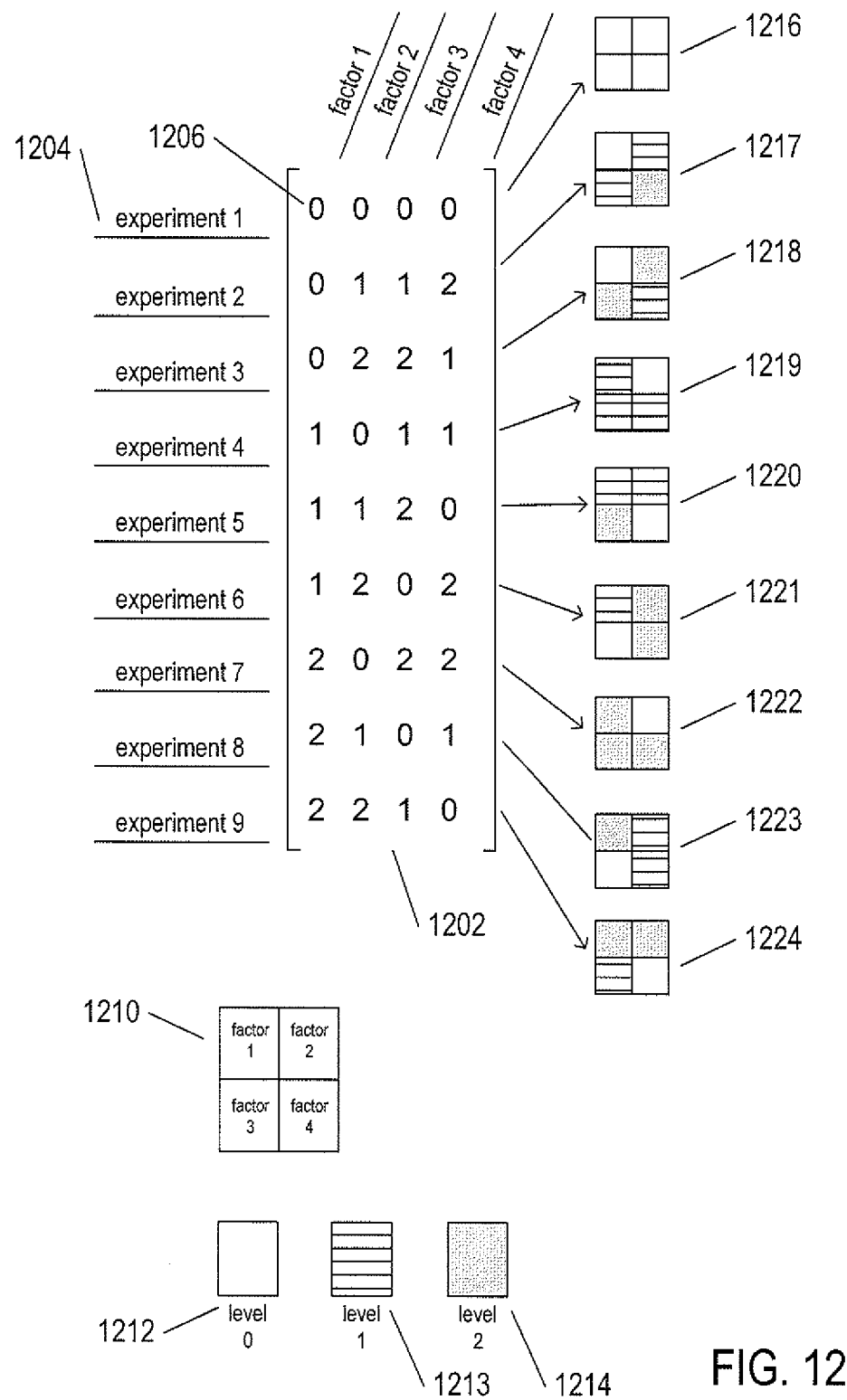
FIG. 12 illustrates the general case in which an orthogonal-array-based experiment is designed for a multi-factor/multi-level analysis.

FIG. 12 illustrates the general case in which an orthogonal-array-based experiment is designed for a multi-factor/multi-level analysis. In FIG. 12, a numeric matrix 1202 constitutes an orthogonal array that describes a test design for a multi-factor/multi-level test. Each row in the numerical matrix represents a different experiment or, in other words, one of the possible web-page variants. Thus, in FIG. 12, each row is labeled with an experiment name, such as the name "Experiment 1" 1204 for the first row 1206 in the orthogonal array 1202. Each column in the orthogonal array corresponds to a single factor. The numeric value at a position in the orthogonal array indexed by a particular experiment and particular factor represents a particular level for the factor in the experiment. In the design array 1202 shown in FIG. 12, three different levels for four different factors are specified. The web-page variants are symbolically represented, in page 12, by a rectangle evenly divided into four smaller rectangles 1210. Each of the smaller four rectangles corresponds to a single factor. Each factor can have one of three different levels 1212-1214. In FIG. 12, a representation of each of the web-page variants represented by each row in the design array is shown associated with the row of the design array. For example, the experiment, or web-page variant, with all factors having the zero level is represented by the first row 1206 of the design array 1202 as well as by the symbolic representation 1216. The theory of orthogonal arrays provides design methodology for testing multiple levels of multiple factors systematically without needing to test all possible web-page variants. In the case shown in FIG. 12, statistically meaningful results are obtained for four three-level factors using only nine page variants 1216-1224 rather than $3^4=81$ possible web-page variants.

FIG. 13 shows a mathematical model for the analytical test based on the design array shown in FIG. 12. In FIG. 13, design array 1202, shown in FIG. 12, is located in the left-hand portion of the figure. As discussed above, each row in a design array represents a different experiment, or web-page variant, that is served to multiple users who access a web page under test during a test interval. In the present case, the result of each access by a user to a web-page variant is a binomial value as, for example, an indication whether or not the user completed a retail transaction during a session that included access to the web-page variant. Over the course of the testing interval, therefore, each web-page variant or experiment i is associated with a number of users who accessed the web-page variant and who then completed a retail transaction or, in other words, the number of conversions associated with the web-page variant $y_i$. Alternatively, $y_i$ may represent the conversion rate or the number of users who accessed the web-page variant and who then completed a retail transaction divided by the number of users who accessed the web-page variant. Thus, in FIG. 13, each row of the design array is associated with a $y_i$ value, such as the value $y_i$ 1304 associated with the first row 1206 of the design array. In the mathematical model, each $y_i$ value is the sum of a set of coefficients $\beta_k^l$ and a final error term $\epsilon_i$. Thus, in FIG. 13, the number of converting users or the conversion rate $y_1$ for the first web-page variant is modeled as: $y_1 = \beta_0 + \beta_1^0 + \beta_2^0 + \beta_3^0 + \beta_4^0 + \beta_{12}^{00} + \beta_{13}^{00} + \beta_{14}^{00} + \beta_{23}^{00} + \beta_{24}^{00} + \beta_{34}^{00} + \beta_{123}^{000} + \beta_{124}^{000} + \beta_{134}^{000} + \beta_{234}^{000} + \beta_{1234}^{0000} + \epsilon_1$. The values $\beta_k^l$ represent values, or coefficients, associated with the $l^{th}$ level or levels of the $k^{th}$ feature or features. When l and k are single-digit quantities, the value $\beta_k^l$ is associated with the $l^{th}$ level of the $k^{th}$ factor. Otherwise, the values l and k can be thought of as aligned row vectors, each element corresponding to a different factor. For example, the value $\beta_{13}^{00}$ is associated with the $0^{th}$ level of the first factor and the $0^{th}$ level of the third factor.

Figure 14C:
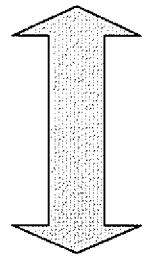

FIGS. 14A-E illustrate a method for processing multi-factor/multi-level test results based on the mathematical model discussed with reference to FIG. 13. In FIG. 14A, a simple design array 1402 is shown along with the corresponding mathematical model 1404. In this model, each conversion-rate result for a different web-page variant, or experiment, is computed as the sum of a first scaling term $\beta_0$ 1406, a value corresponding to a first factor 1408, a value corresponding to a second factor 1410, and a value corresponding to an interaction between the first and second factor 1412, and an error term 1414. Thus, all of the $\beta$ values in the mathematical model with multiple-digit superscripts and subscripts correspond to interaction effects between multiple factors/levels. The scaling constant and values such as are referred to as "single-factor effects" and values such as $\beta_{12}^{00}$ are referred to as "factor-interaction effects." The larger the value of $\beta_k^l$, the greater the positive effect of the corresponding factor and level, or factor interaction and corresponding levels, on the observed experimental result $y_i$.

In general, the full mathematical model for a design array, such as that shown in FIG. 13, is not employed in the analysis of experimental results obtained from website testing. Instead, usually the $\beta_0$ scaling constant and single-factor effects are considered, along with selected factor-interaction effects. As discussed below, the numeric values for the $\beta$ values in the model are estimated using a least-squares estimation procedure. The more $\beta$ values included in the model, the greater the number of web-page accesses needed during the testing interval in order to provide statistically meaningful estimates of the $\beta$ values. Furthermore, the purpose of the experiment may be to identify the most important single-factor or multi-factor-interaction effects among a relatively small subset of all possible single-factor and multi-factor-interaction effects that could be considered.

In such cases, the factors and interaction effects that are not of interest are often omitted from the model.

FIG. 14B illustrates the X matrix representation of an experimental design. In FIG. 14B, the mathematical model 1404 shown in FIG. 14A as corresponding to design array 1402 is provided on the left-hand side of the figure. A representation of this model is provided by the binary-valued X matrix 1406 shown in the right-hand side of FIG. 14B. As indicated by column indices 1408 below the X matrix 1406, each column in the X matrix corresponds to a single $\beta$ value of the mathematical model. Each row in the X matrix 1406 corresponds to an expression for the conversion rate for a particular web-page variant, in turn corresponding to a row of the design-array experiment. Each value "1" in a row of the X matrix indicates that, in the corresponding expression for a test result for a web-page variant, the particular $\beta$ value index of the column including the "1" value is included in the model expression for the result. For example, in FIG. 14B, the expression for the conversion rate $y_1$ for the first web-page variant includes the values $\beta_0$ 1410, $\beta_1^0$ 1412, $\beta_2^0$ 1414, and $\beta_{12}^{00}$ 1416. In the corresponding first row of the X matrix 1420, the "1" values 1422-1425 have column indices $\beta_0$ 1426, $\beta_1^0$ 1428, $\beta_2^0$ 1430, and $\beta_{12}^{00}$ 1432, which are the particular $\beta$ values 1410, 1412, 1414, and 1416 in the expression for the conversion rate $y_1$ for the first web-page variant. Thus, as shown in FIG. 14C, the X matrix is equivalent to, and an alternative representation of, the design array. The mathematical model 1404 for design array 1402, shown in FIG. 14A, can therefore, as shown in FIG. 14D, be alternatively represented, using vector notation, as:

$$Y = X\beta + \epsilon,$$

where Y is a column vector that includes the conversion rates for each of the web-page variants, X is the X matrix discussed in FIGS. 14B-C, $\beta$ is a column vector that includes all possible coefficients that may be considered for inclusion in the conversion-rate expressions, and $\epsilon$ is a column vector of error values or error terms.

FIG. 14E illustrates the basic underlying experimental-results-processing methodology for binomial multi-factor/multi-level website analysis. A least-squares estimation procedure is used to obtain estimates for the $\beta$ values, $\hat{\beta}_{LS}$, using the well-known least-squares procedure:

$$\hat{\beta}_{LS} = (X^T X)^{-1} X^T Y.$$

This procedure essentially minimizes the residuals $\hat{\epsilon}$ representing the difference between the observed conversion rates and conversion rates that would be estimated from the estimates of the $\beta$ values, $Y - \hat{Y}$, in turn equal to $Y - X\hat{\beta}$:

$$\hat{\epsilon} = Y - \hat{Y} = Y - X\hat{\beta}.$$

Thus, $\hat{\epsilon}^2$, which is the square of the residuals, can be alternatively expressed as:

$$(Y - X\hat{\beta})^T (Y - X\hat{\beta})$$

and the least-squares-estimation procedure essentially minimizes this quantity. Once estimates for the $\beta$ values, or effects, are obtained by the least-squares procedure, estimates for the conversion rates $\hat{Y}$ are obtained as:

$$\hat{Y} = X\hat{\beta}.$$

FIG. 15 illustrates the multi-factor/multi-level website-testing methodology used, in certain web analytics systems, for obtaining and processing test results. In a first step, a number of factors are identified for testing and each factor is associated with a number of devised levels. In addition, interactions effects of interest are included. The determination of the factors, levels, and interaction effects of interest therefore specifies a $\beta$ vector 1502 that generally contains fewer elements than the $\beta$ vector of all possible effects. Then, orthogonal-array theory and/or additional or alternative experimental-design methodologies are employed to design a test, with the design represented by an X matrix 1504, only a few elements of which are shown in FIG. 15. Testing is then undertaken in order to produce test results that are accumulated to form the conversion-rate column vector Y 1506. A least-squares procedure 1508, or similar optimization-based method, is then used to obtain an estimate of the values of the effects, $\hat{\beta}_{LS}$, based on the experimental observations Y.

Once estimates of the effects coefficients are obtained, a web-analysis system then makes a determination of the significance of the effects just as, in the single-factor experiments discussed in the preceding section, a significance is computed for those page variants with estimated expected conversion rates greater than the expected conversion rate for the control web page. In the case of multi-factor/multi-level testing and analysis, the significance of the various effects is computed in an automated fashion in order to produce an indication of those effects most likely to positively influence the conversion rate, or whatever experimental result is accumulated during testing.

Figure 16B:
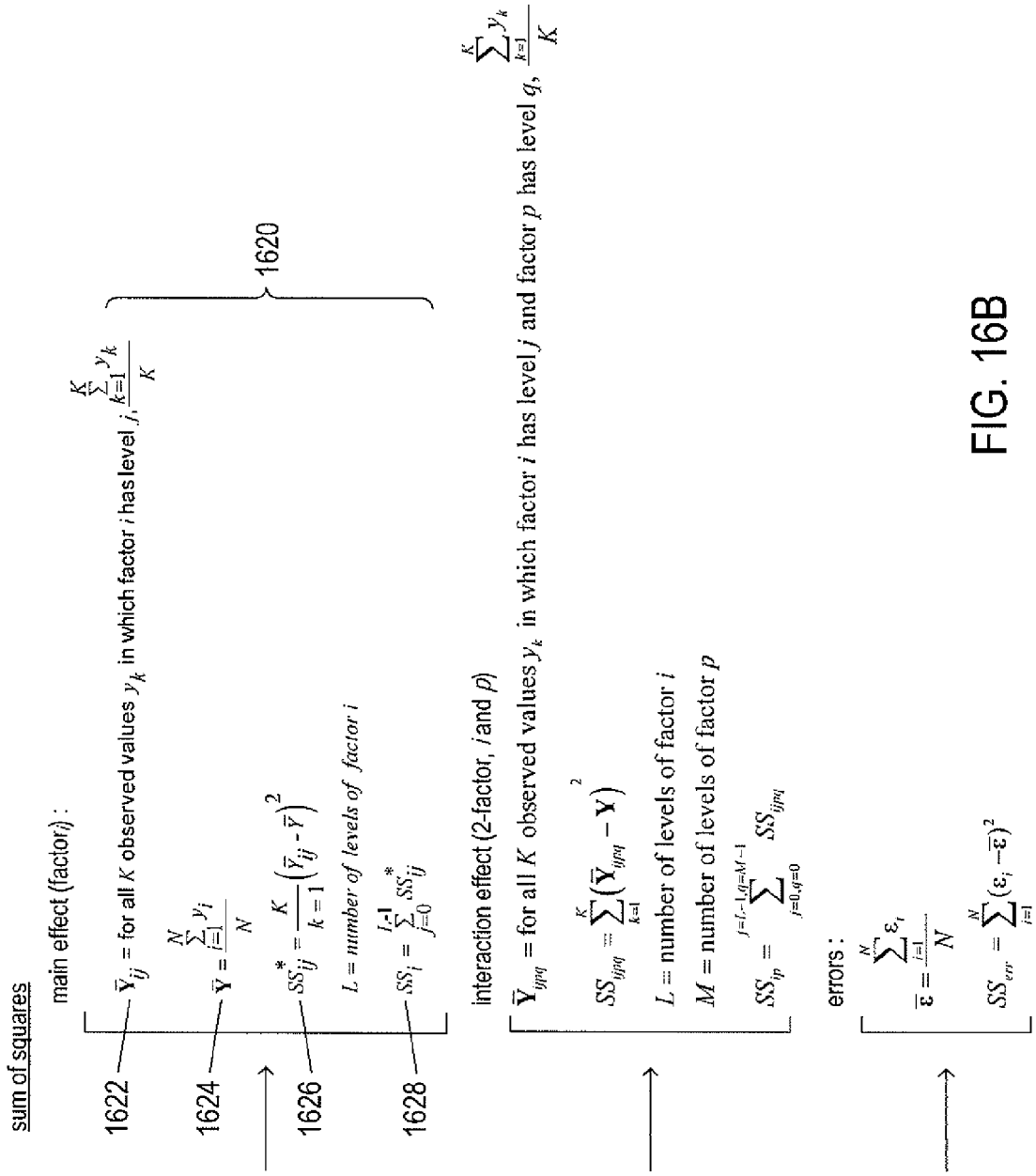

In the case of the multi-factor/multi-level experiments, an analysis-of-variation ("ANOVA") table is constructed to determine the significance of each effect, in certain implementations. FIGS. 16A-D illustrate determination of the values listed in an ANOVA table. In FIG. 16A, an example ANOVA table 1602 is shown. In this example, there are six different columns 1604-1609, the latter five of which each contains a type of computed value for each effect of the test model and the residuals or errors. Each row in the table corresponds to an effect of the model or the residuals, the row identified by an indication of the effect or the residuals represented by the row in column 1604. Thus, the first row of the table 1610 represents computed values for factor 1. Note that the rows correspond to multiple $\beta$ values in the mathematical model. In other words, the ANOVA table describes the significance of factors or multiple-factor interactions, rather than the significance of factor/level combinations. The computation of the degrees-of-freedom values listed for the factors and factor interactions in column 1605 of the ANOVA table is shown 1612 below the ANOVA table in FIG. 16A. For example, the degrees of freedom for a factor i is equal to one less than the number of levels associated with that factor, as indicated by line 1614. Note that the factors are referred to as "main effects" and interactions between factors are referred to as "interaction effects." FIG. 16B illustrates computation of the sum-of-squares values listed in column 1606 of the ANOVA table 1602 for each main effect, interaction effect, and the residuals or errors. For example, the calculation of the sum of squares $SS_i$ for factor i is shown in equations 1620 in FIG. 16B. The average observed result, such as a conversion rate, for served test pages in which factor i has level j is the computed value $\overline{Y}_{ij}$ 1622. The average observed conversion rate for the entire test is $\overline{Y}$ 1624. The intermediate sum of squares $SS_{ij}^*$ 1626 is the sum of squares for factor i and level j, for which there are K observations. The $SS_{ij}^*$ for all levels j are then summed to produce a final sum of squares for factor i, $SS_i$ 1628.

FIG. 16C illustrates computation of the mean squares for main effects, interaction effects, and errors 1630, computation of F values or F-statistic values for the main effects and interaction effects 1632, calculation of the P values for the main effect and interaction effect 1634, computation of the total mean squares 1636, and computation of the numerical influence value for the main effect and interactions effect 1638.

Figure 16D:
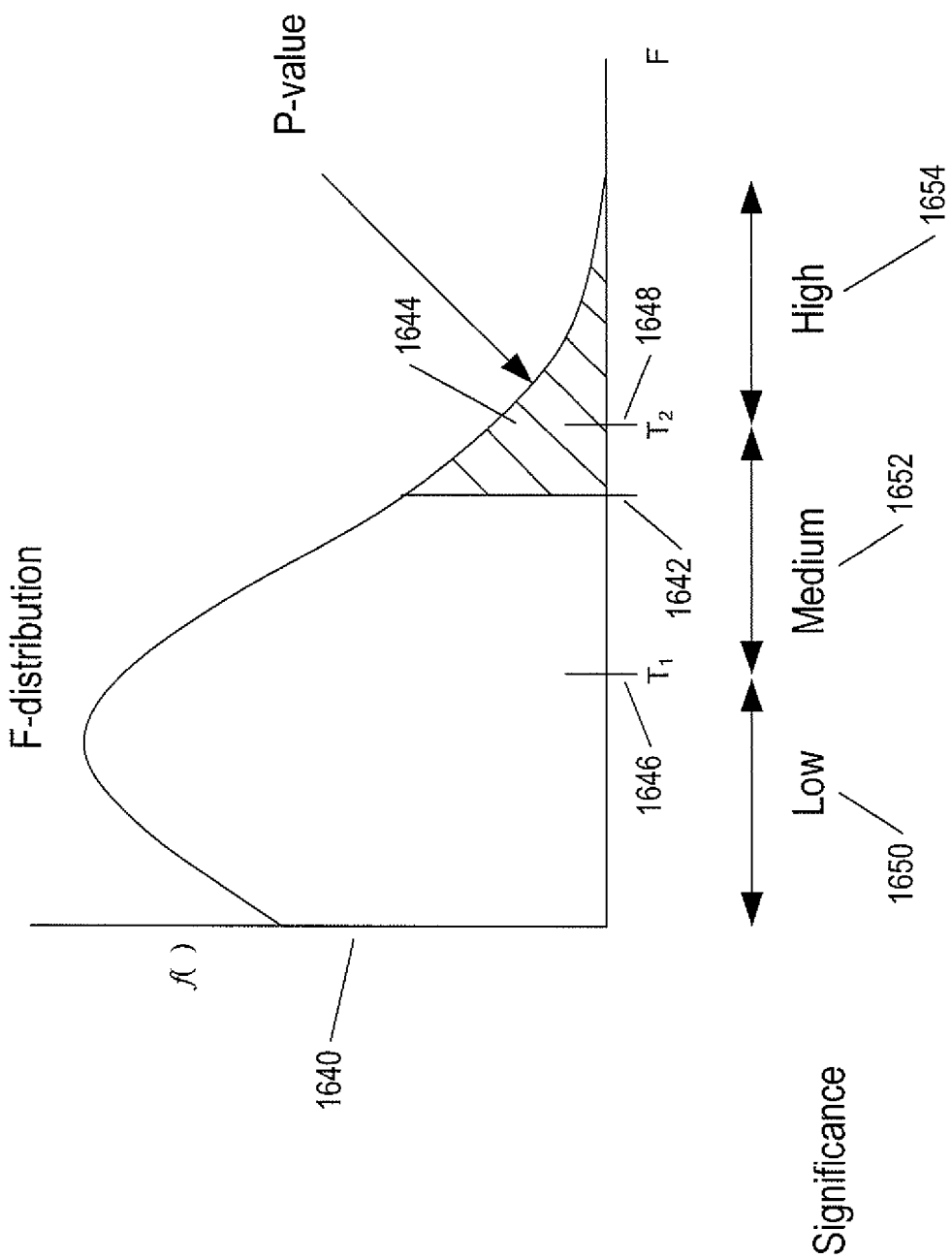

FIG. 16D illustrates computation of the significance values that are included in the final column 1609 of the ANOVA table 1602. In FIG. 16C, computation of F values for the main effects and interaction effects is illustrated. These F values are F-statistic values theoretically distributed according to an F distribution. One example of an F distribution is plotted in FIG. 16D in plot 1640. The computed F value for a main effect or interaction effect is plotted on the horizontal axis, such as the point 1642. The main-effect or interaction-effect F statistic is computed as described in FIGS. 16A-C. The area under the F-probability-distribution curve 1644 to the right of the plotted F point 1642, shown in cross-hatching in FIG. 16D, is the probability of an F statistic being greater than the computed F statistic for the main effect or interaction effect. Clearly, as the computed F statistic increases in value, the probability that an F statistic could fall in the region of the area underneath the distribution curve greater than the F statistic decreases. Probability 1644 constitutes the P value for the computed F statistic for a main effect or interaction effect. The range of possible F values, represented by the horizontal axis, is partitioned by a first threshold 1646 and a second threshold 1648 into three sections: low 1650, medium 1652, and high 1654. The significance shown in the final column of the ANOVA table 1609 is an identification of one of these three regions, low, medium, or high, within which the F statistic computed for a main effect or interaction effect falls. In short, those main effects and interaction effects for which the significance is high, in the ANOVA table, are those factors and factor interactions which are deemed to be significant with respect to the observed experimental results.

Figure 17:
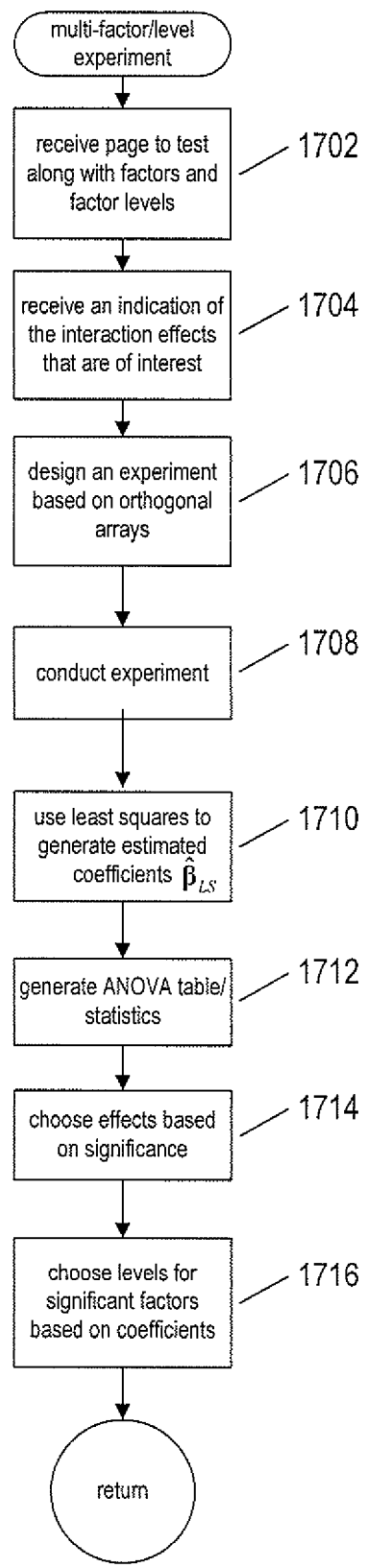
FIG. 17 provides a control-flow diagram that encapsulates data processing for a multi-factor/multi-level website-analysis test.

FIG. 17 provides a control-flow diagram that encapsulates data processing for a multi-factor/multi-level website-analysis test. In step 1702, the routine receives a web page to test along with a list of factors and the set of factor levels to be tested for each factor. Next, in step 1704, an indication of the interaction effects that are of interest, in addition to the main factors described in the list received in step 1702, are received. In step 1706, an experiment is designed, in certain implementations based on orthogonal-array theory, to provide statistically meaningful results with respect to the main factors and interaction factors that are to be tested. Next, in step 1708, website testing is carried out according to the experiment design created in step 1706. In step 1710, the data accumulated during website testing is used as the basis for a least-squares processing in order to generate estimated coefficients $\hat{\beta}_{LS}$. Then, in step 1712, an ANOVA table is generated based on the estimated coefficients obtained in step 1710. In step 1714, a set of main and interaction effects with high significance is chosen from the significance-level indications in the ANOVA table as those effects with greatest observed importance in determining the desired result, such as conversion rate. Finally, in step 1716, for the significant factors, optimal levels are chosen based on the estimated coefficients $\hat{\beta}_{LS}$. Of course, it may be the case that no test effects prove to be significant or have a significantly positive effect on the desired result.

Non-Binomial Data

FIGS. 18A-13 illustrate a difference between binomial experiments and non-binomial experiments. FIG. 18A shows a table of experimental results 1802 typical of a binomial test. This test features nine different web-page variants listed in a first column 1804, the number of accesses of the web-page variant in column 1806, the number of users who accessed the web-page variant and later completed a retail transaction, or conversions, listed in column 1808, and a computed conversion rate listed in column 1810. The raw data for the test is the number of conversions for each web-page variant listed in column 1808. This is converted into a conversion rate by division by the number of page views. Each sample or trial produces a binary outcome. Either a user who accessed the web-page variant completes a retail transaction or does not complete a retail transaction. Because of the binary nature of the outcomes of the individual samples or trials, the raw data is binomially distributed. Although, depending on the data type and precision used to store the conversion-rate results, these results may be integers, fixed-precision real numbers, or some other type of quantity, they are based on binomially distributed raw data.

FIG. 18B shows a table of test results for a non-binomial experiment 1812. These test results are also collected for nine different web-page variants. For each trial, or user access to a web-page variant, the time during which a user spent accessing the website that includes the web-page variant is recorded as an observation. For example, for the first listed trial 1814, a user accessed a first web-page variant and spent 24.52 minutes on this and other pages of the website 1816. The raw data, in this case, are samples of random variables that range over a continuous subset of the real numbers. Unlike a binomial experiment, the outcome of a particular trial is not binary, but can be any real value or, more likely, fixed-precision real value or integer approximation of a real value, over a region of the real-number line. These observations are not binomially distributed. In fact, in general, it is not known how the population represented by these experimental observations is distributed. Often, in statistical analysis, an underlying distribution model is assumed for the population based on a variety of considerations. However, for much of the data generated from non-binomial testing of websites, there are few, if any, reasonable theoretical justifications for choosing an underlying distribution model. Furthermore, because cost-effective website testing is generally an automated process, any attempt to ascertain which, if any, model distributions might fairly represent the underlying population from which the samples are drawn would add enormous additional complexity to the automated process with a very low probability of identifying reasonable underlying models. Another significant problem in website testing is the potential for outlier observations. For example, were the observational data recorded as the time interval between first user access to a web-page variant and access of any other page by a user, the mean observed values may lie in the range of several seconds to several minutes. However, occasionally, a user may be distracted after accessing the web-page variant, for a variety of different reasons, as a result of which the time interval may rise to tens of minutes to hours. These outlier observations are not reflective of, for example, the degree to which the web-page variant engaged the user's attention, but are instead artifacts of a largely uncontrolled experimental environment. Such outlier data can deleteriously skew the common parameters for characterizing sample distributions, such as means and variances, and can lead to statistically meaningless conclusions, even had an accurate underlying distribution model been somehow ascertained. In the essentially uncontrolled experimental environment of website testing, which relies on actual remote users to access web-page variants and interact with a website, it is nearly impossible to accurately accommodate the many different sources of anomalous, outlying observational data. For these reasons, in certain implementations of website-testing-data analysis, disclosed in the current document, robust statistics are employed, rather than traditional statistical methods, such as those described above.

Theoretical and practical research has produced various methodologies for the statistical analysis of non-binomially distributed data for which an underlying distribution model is not known and which often includes outlier data values. However, to date, efficient methodologies for processing the large amounts of data generated by website testing have not been devised and made available to website testing services. The current document discloses several methodologies for efficiently analyzing this type of data.

Robust Processing and Analysis of Single-Factor, Non-Binomial Test Results

Figure 19E:
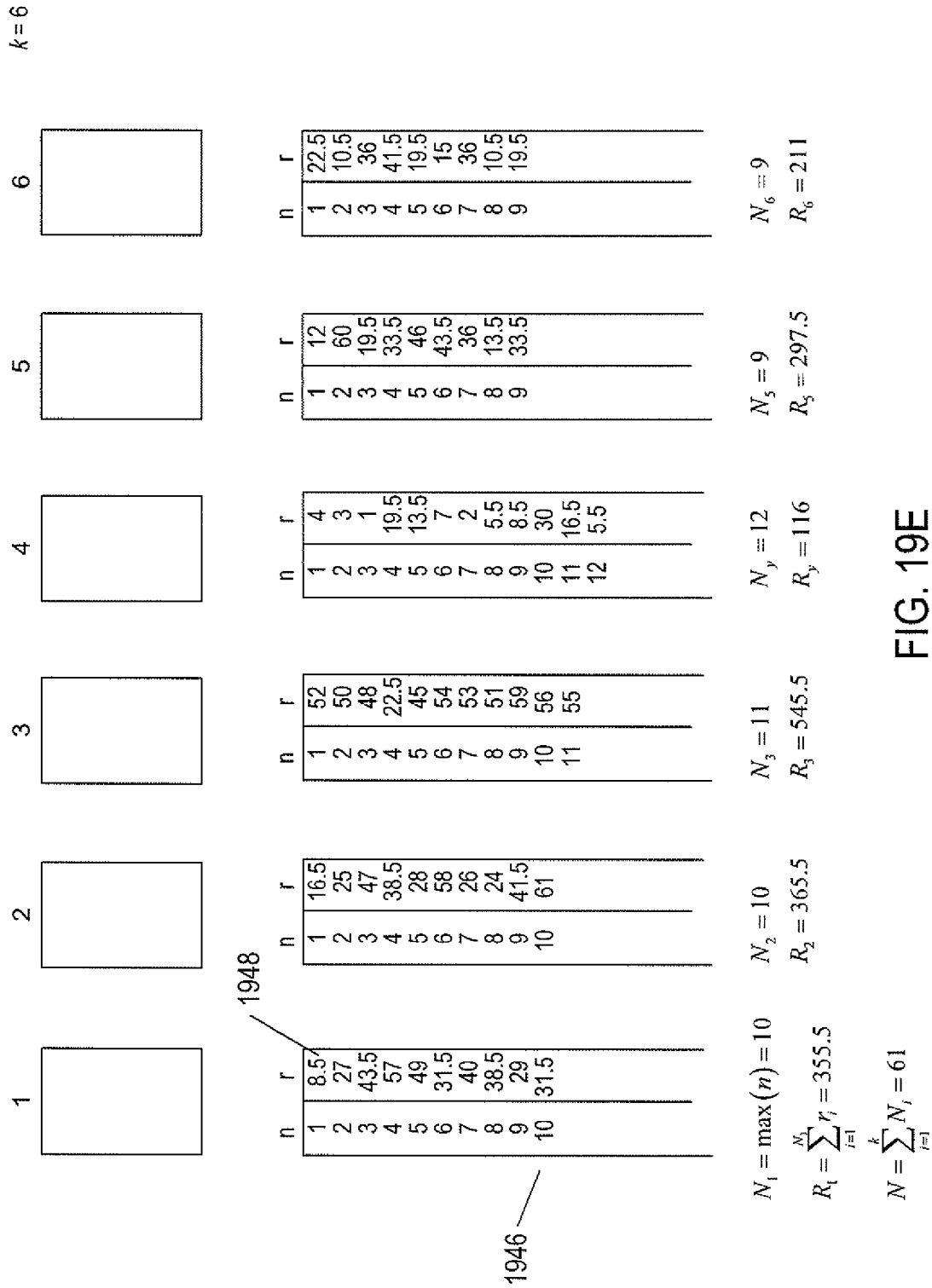

FIGS. 19A-F illustrate a robust web-analytics method for processing data obtained from a single-factor website test. As initially discussed above, with reference to FIG. 6, the website test involves serving a control page and a number of web-page variants of the control page. As shown in FIG. 19A, the robust processing methods are designed to determine whether or not the distributions for experimental results for the control page and web-page variants are clustered together, as shown in plot 1902, with means distributed within a relatively small range 1904, or whether at least one of the results distributions for one of the web-page variants is well separated from the results distribution for the control page and other of the web-page variants, as illustrated in plot 1906 of FIG. 19A. In the latter case, the means for the underlying population distributions are distributed across a relatively wide range 1908.

FIG. 19B shows the experimental design for a single-factor non-binomial test. This test considers the times during which users access pages of a website following access to a first webpage. For this test, there is a single control page 1910 and five web-page variants 1912-1916. Below each of the control page and web-page variants, shown in FIG. 19B, is a tabulation of the observed duration times y for each of n samples, trials, or web-page accesses, such as the n=10 duration-time observations listed in table 1918 for the control page 1910.

In a first step, following collection and tabulation of the observed duration times during a website test, the observed duration times are ordered, in increasing order, by numerical value, as shown in the vector 1920 of ordered duration-time values in FIG. 19C. The duration-time values are shown as elements of the vector and the indices of each element are shown to the left of the vector, such as the index 1 (1922 in FIG. 19C) for the first duration-time element 1924. The indices of these elements are referred to as ranks. There are 61 different observed duration times with ranks 1-61. In a second step, shown in FIG. 19D, ranks of the duration-time observed values are flattened for identically valued elements. For example, elements 1926-1927 in the ordered vector shown in FIG. 19C both have the same value of "9.2." These elements have ranks 5 and 6 1928 and 1929, respectively. However, the identically valued elements should each have the same rank, so the mean of the two ranks 5 and 6, 5.5, is therefore assigned to both elements, as shown by ranks 5.5 1930-1931 which are associated, in FIG. 19D, with the duration-value "9.2" 1932. Similarly, there are four elements with observed-duration-time value "11.2" 1934 and, therefore, the median rank 19.5 for these four identically valued elements 1936 is assigned to the duration-time value "11.2" 1938 in the flattened ranking shown in FIG. 19D. This flattened ranking can be used, in an inverse direction, to assign a rank to each observed duration time. In FIG. 19E, the tables of observations have been altered to include the ranks, rather than underlying duration-time values, corresponding to each trial or sample. For example, the first entry in table 1918 in FIG. 19B, 1940, had an observed duration time of "10.1." Duration time 10.1 (1942 in FIG. 19D) in the flattened-rank vector of is associated with a rank of "8.5" 1944. Thus, in the altered table 1946 in FIG. 19E corresponding to table 1918 in FIG. 19B, the first entry shows the rank "8.5" 1948 rather than the duration time "10.1" shown in the first entry of table 1918 in FIG. 19B. The currently described robust statistical method is based on ranks of observed values rather than on the observed values themselves. Using ranks, rather than observed values, significantly ameliorates the outlier problem as well as handling the lack of an underlying distribution model.

Figure 19F:
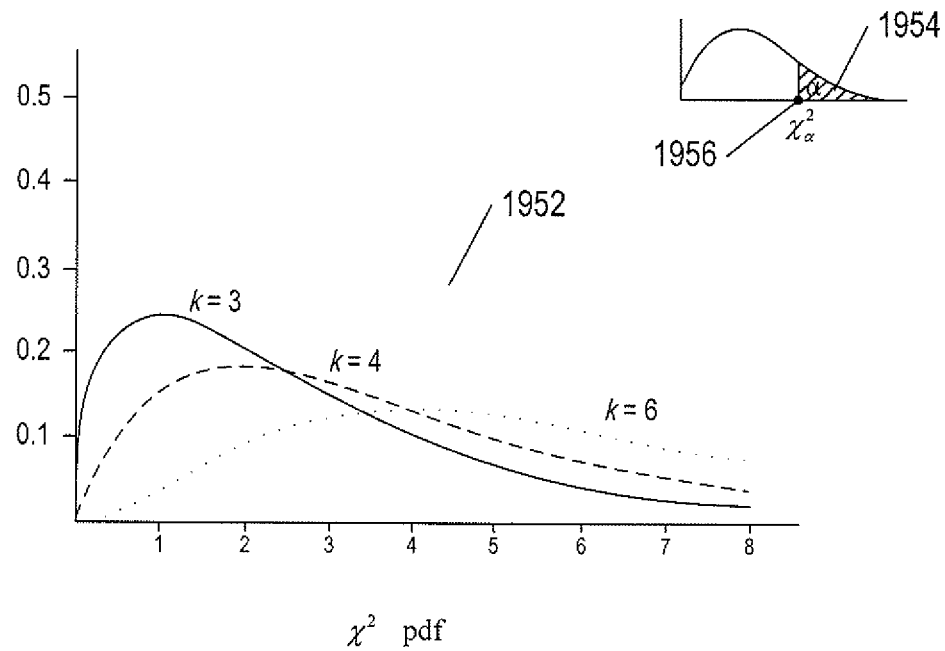

Next, as shown in FIG. 19F, a Kruskal-Wallis statistic K can be computed for the observed data 1950 as:

$$K = \left(\frac{12}{N(N+1)} \sum_{j=1}^{k} \frac{R_j^2}{N_j}\right) - 3(N+1),$$

where N is the total number of observations;

k is the number of web pages, including the control page and the web-page variants;

$$R_j = \sum_{i=1}^{N_j} r_{ij};$$

and $N_j$ is the number of observations for web page j.

It turns out that the Kruskal-Wallis statistic K can be considered to be distributed according to a $\chi^2$ distribution. There is a different $\chi^2$ distribution for each value of the degrees of freedom, a number of which are illustrated in the plot 1952 shown in FIG. 19F. As discussed previously with respect to other types of distributions, the area under a right-hand tail of a $\chi^2$ distribution 1954 is the probability of a value, such as the test statistic K, having a value greater than or equal to the value 1956 that defines the vertical left-hand edge of the region 1954. This threshold value 1956 can be determined from the desired probability 1954, referred to as α. In FIG. 19F, the test statistic K is calculated for the data shown in FIG. 19B to be 32.78 (1960 in FIG. 19F). The threshold value for the $\chi^2$ distribution for k−1=5 degrees of freedom and a probability of the test statistic K exceeding the threshold value of 0.05 is equal to 11.0705 (1962 in FIG. 19F). Therefore, the computed test statistic K is greater than the threshold value and is therefore associated with the probability within the region 1954 that defines α. Thus, because the computed statistic K is very improbable, the null-hypothesis assumption that the ranks of the observed values for the control page and each web-page variant are commonly distributed, as in the case shown in plot 1902 of FIG. 19A, is unlikely, and the null hypothesis is therefore rejected. Thus, using the methodology illustrated in FIG. 19F, an automated web-analytics system can process the data for a single-factor test to determine whether or not any of the observed data for a web-page variant is distributed significantly differently from other of the web-page variants or the control page.

Figure 20A:
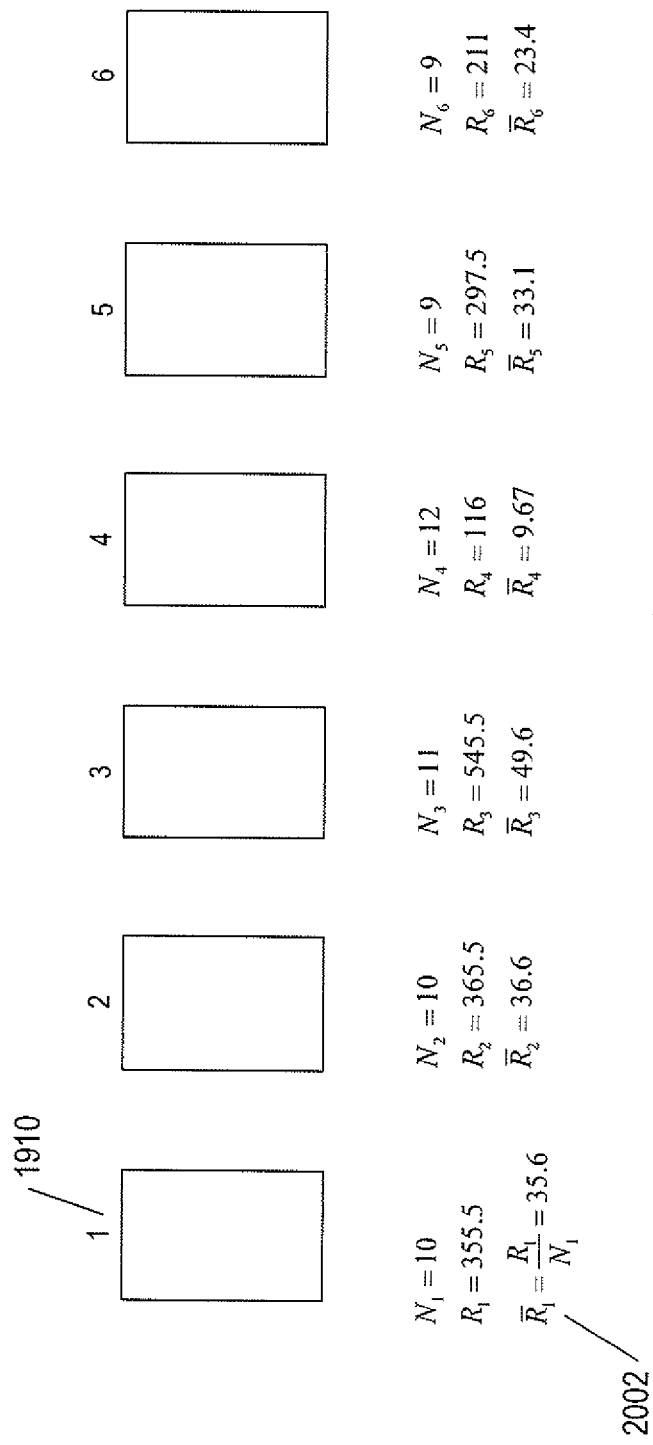
FIGS. 20A-B illustrate a robust-test-statistic-based process.
Figure 20B:
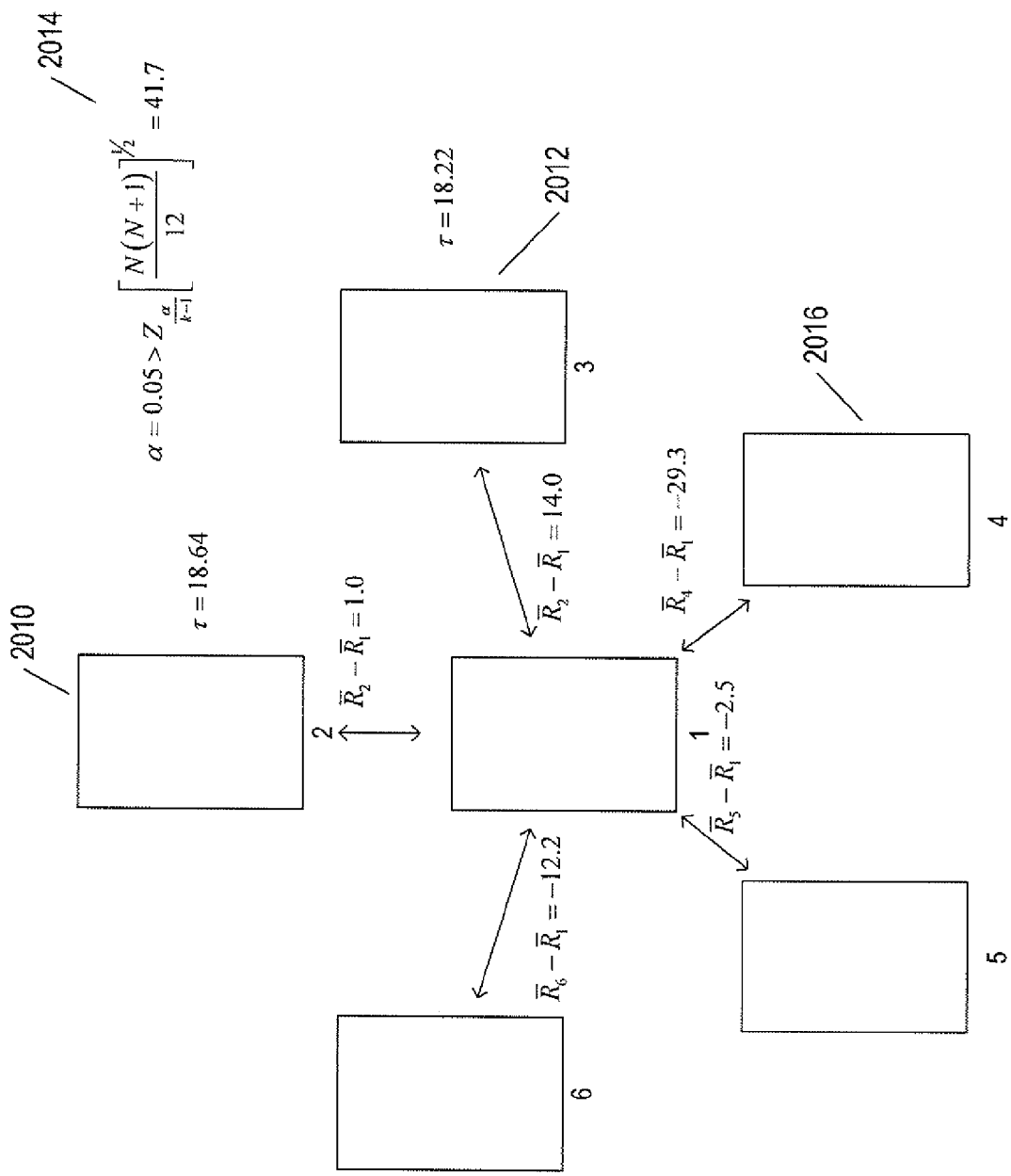

When the K-statistic analysis, discussed above with reference to FIG. 19F, indicates that there may be a significantly better web-page variant than the control page, then a second robust test statistic is used to determine whether any of the web-page variants are significantly better, with respect to the results of the trials, than the control page. The term "better" in the last sentence refers to having an expected result greater than that of the control page, when larger-magnitude results are considered more desirable. FIGS. 20A-B illustrate a robust-test-statistic-based process. Average ranks are shown, in FIG. 20A, to be computed for each of the control page and web-page variants, including average rank $\overline{R}_1$ 2002 for the control page 1910. Then, for each web-page variant i, the test statistic $\overline{R}_i - \overline{R}_1$ is computed. This test statistic is referred to as $\tau$. When, for a particular web-page variant i, the test statistic $\tau_i$ is greater than or equal to $$Z_{\frac{\alpha}{k-1}} \left[ \frac{N(N+1)}{12} \right]^{1/2} \left[ \frac{1}{N_1} + \frac{1}{N_i} \right]^{1/2},$$

then the results for web-page variant i are considered to be significantly better, with respect to the tested result, than the control page. The test statistic $\tau$ is referred to as the Nemenyi-Damico-Wolfe statistic. Thus:

$$\tau_i = \overline{R}_i - \overline{R}_1 \geq Z_{\frac{\alpha}{k-1}} \left[ \frac{N(N+1)}{12} \right]^{1/2} \left[ \frac{1}{N_1} + \frac{1}{N_i} \right]^{1/2}$$

indicates that web-page variant i is significantly better than the control page. Note that the term "better," in this context, does not necessarily mean that the web page is better for the website owner or for the user, but simply that whatever the result being tested, that result increases in magnitude when web-page-variant i is accessed by users with respect to access by the users to the control page. If, for example, the website owner wants to reduce the time spent by users on the website, then a web-page variant that increases the duration of time and that is "better" with respect to the computed test statistic is, in fact, undesirable to the website owner. Note that, in the above expression, $$z_{\frac{\alpha}{k-1}}$$

is the z threshold for a normal distribution with mean 0 and variance 1 for which the probability underlying the right-hand tail is $$\frac{\alpha}{k-1}.$$

Next, estimates of expected results for web-page variants and associated confidence intervals are determined, using robust methods. For the trial-rank-based method discussed with reference to FIGS. 19A-F and 20A-B, one method for determining estimated results, such as access durations, and associated confidence interval for a particular confidence level $(1-\alpha)100\%$, is based on computing pair-wise averages of the trial observations, often for each of the web-page variants that appear to be better than the control page. Thus, for each of these web-page variants, a set of $$M = \frac{N_i(N_i + 1)}{2}$$

pair-wise trial result averages, $$\frac{Y_i + Y_j}{2}$$

for $i \leq j = 1, \ldots, N_i$, are computed and arranged in ascending order by magnitude. Denoting these computed pair-wise averages as $W^{(1)} \leq \ldots \leq W^{(M)}$, then the estimator $\hat{\theta}$ for the web-page variant is computed as:

$$\hat{\theta} = W^{(\frac{M+1}{2})} \text{ if } M \text{ is odd}$$

$$\hat{\theta} = \frac{W^{(\frac{M}{2})} + W^{(\frac{M}{2}+1)}}{2} \text{ if } M \text{ is even.}$$

Thus, the estimator $\hat{\theta}$ indicates an estimated expected value. The confidence interval for confidence level $(1-\alpha)100\%$ is computed as:

$$(W^{(C)}, W^{(M+1-C)}),$$

where C is computed by:

$$C = \left\lfloor \frac{M}{2} - z_{\frac{\alpha}{2}} \sqrt{\frac{M(2n+1)}{12}} \right\rfloor,$$

where $\lfloor x \rfloor$ denotes the floor operation.

FIG. 20B shows the values of the $\tau$ statistics computed for each of the web-page variants in the example of FIGS. 19A-F. As can be seen, only web-page variant 2 (2010 in FIG. 20B) and web-page-variant 3 (2012 in FIG. 20B) are positive, but neither of these $\tau$ statistics is greater than the threshold value 41.7 (2014 in FIG. 20B). Thus, the example test data shown in FIG. 19B does not indicate that any of the web-page variants are statistically better than the control page with respect to length of duration of user access of the website. Although this may seem surprising, in view of the fact that the Kruskal-Wallis statistic K exceeded the significance threshold, as discussed above with reference to FIG. 19F, it can be seen, in FIG. 20B, that web-page variant 4 (2016 in FIG. 20B) has a very large negative value for $\overline{R}_4 - \overline{R}_1$. Thus, the test did find a significantly worse web-page variant, but not a better web-page variant with respect to the control page.

Figure 21:
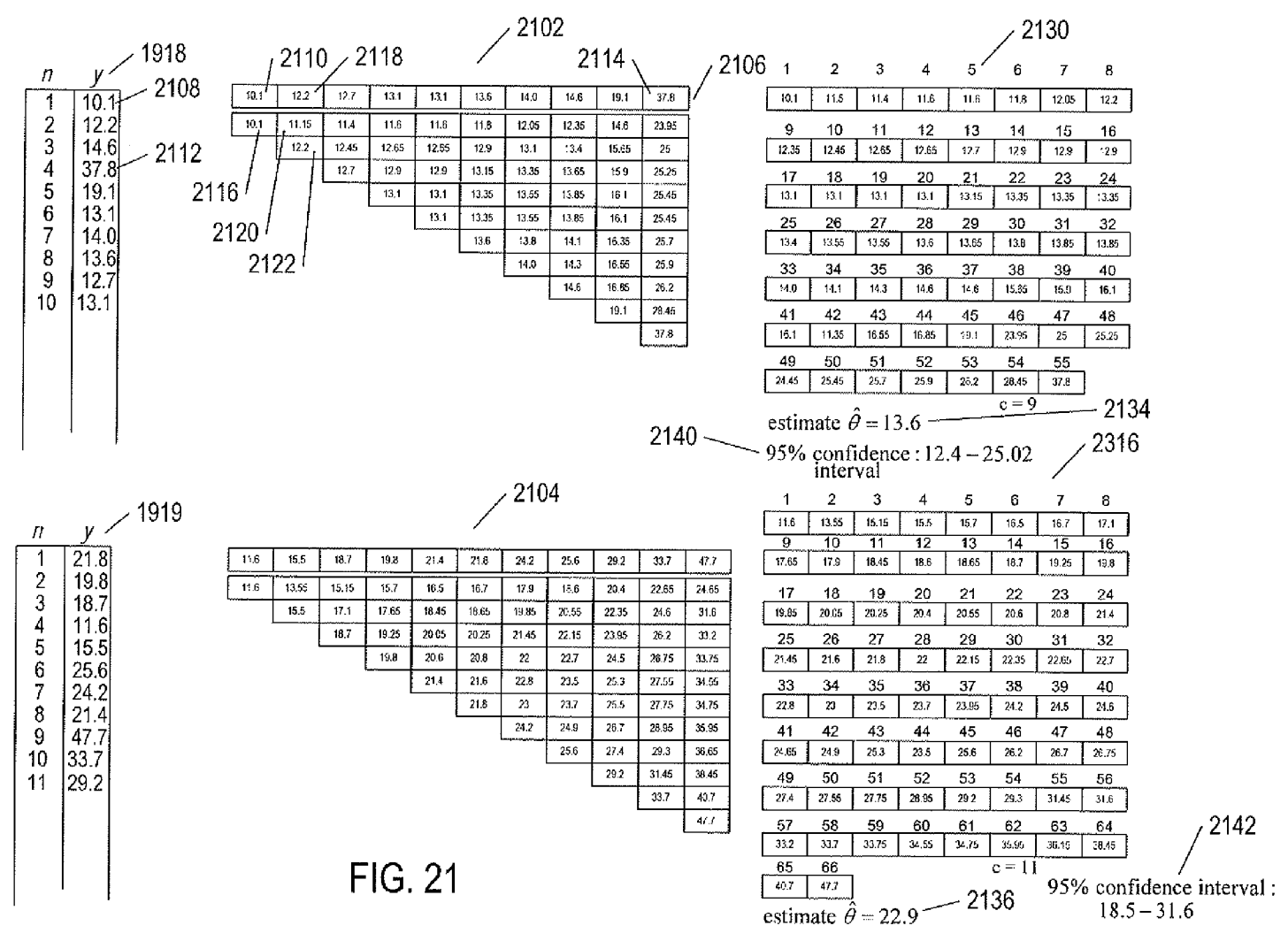

FIG. 21 illustrates the estimate and confidence-interval determination for web-page variants 2 and 3 in the example of FIGS. 19A-20B with a control web page and web-page-variant 2. As discussed above, there were no web-page variants with $\tau$ statistics greater than or equal to the threshold, and thus the test did not find any basis for declaring one of the web-page variants to be better than the control page. Nonetheless, the computation of the estimator $\hat{\theta}$ for the control page and web-page variant 2 illustrates the above-described method. In FIG. 21, table 1918 from FIG. 19B for the control page and table 1919 for web-page variant 2 are shown at the left-hand side of the figure. For each of these tables, the pair-wise averages of duration-time results are computed in the triangular data structures 2102 and 2104. The top row vector above each of the triangular data structures, such as top row vector 2106 of triangular data structure 2102, is simply a horizontal vector that includes the results from the corresponding table of results ordered in increasing-magnitude order. Thus, for example, result 10.1 2108 appears at the beginning of this row of ordered values 2110 and the largest result, 37.8 2112, appears at the end of this row of sorted values 2114. The columns of the triangular data structure below each element in the row of sorted values represent the pair-wise averages for that element and all smaller elements in the row. Thus, for the first element 2110, there is only a single pair-wise average with itself, namely 10.1 (2116 in FIG. 21). For the second element 2118 in the row of sorted values, a first pair-wise average is computed as:

$$\frac{12.2 + 10.1}{2}$$

or 11.15 (2120 in FIG. 21). A second pair-wise average is computed as $$\frac{12.2 + 12.2}{2}$$

or 12.2 (2122 in FIG. 21). Then, in FIG. 21, the computed pair-wise averages are sorted into a long row vector 2130 and 2132 for the control page and web-page variant 2, respectively. The indices of these vectors of sorted pair-wise averages are shown above the elements of the vectors. The estimator $\hat{\theta}$ is then the median pair-wise average within this sorted row vector, as discussed above. The estimator $\hat{\theta}$ is 13.6 (2134 in FIG. 21) for the control page and 22.9 (2136 in FIG. 21) for web-page variant 2. The confidence interval is computed, as discussed above, to be 12.4-25.0 (2140 in FIG. 21) and the confidence interval for web-page-variant 2 is computed to be 18.5-31.6 (2142 in FIG. 21).

The method for determining estimators and confidence intervals for web-page variants that show better test results than the control page, discussed above with reference to FIG. 21, involves the computationally burdensome steps of generating pair-wise averages of test results for each web-page variant, sorting the computed pair-wise averages, and identifying the median of the sorted pair-wise averages. While conceptually straightforward, as illustrated in FIG. 21, for a data set that includes tens of thousands or more trial results for a particular web-page variant, which is not unusual, computing, storing, and sorting all of the pair-wise averages starts to become computationally burdensome and very quickly, with increasing numbers of trial results, becomes infeasible. The computational complexity of the operations is $O(n^2)$. The problem is related to a slightly more general problem of computing pair-wise sums from a set of initial values and then finding the sum at an arbitrary position i within a sorted array of the computed pair-wise sums.

FIG. 22 illustrates a general problem in which a value of an element corresponding to a sorted-array index is sought. The initial set of values Y, 2202, has a cardinality of n 2204. In this general problem, the initial values are elements of the real numbers 2206. From the initial values, an array of pair-wise sums V is generated 2208. The cardinality of the set corresponding to array V is $$\frac{n(n+1)}{2}$$

2210. The array V is then sorted to produce an array of pair-wise sums V 2212. A small example C++-like routine for generating the sorted array V is provided in FIG. 22 as routine 2214. The general problem is to determine, for an arbitrary index i 2216, the value of element V[i] 2218.

Figure 23:
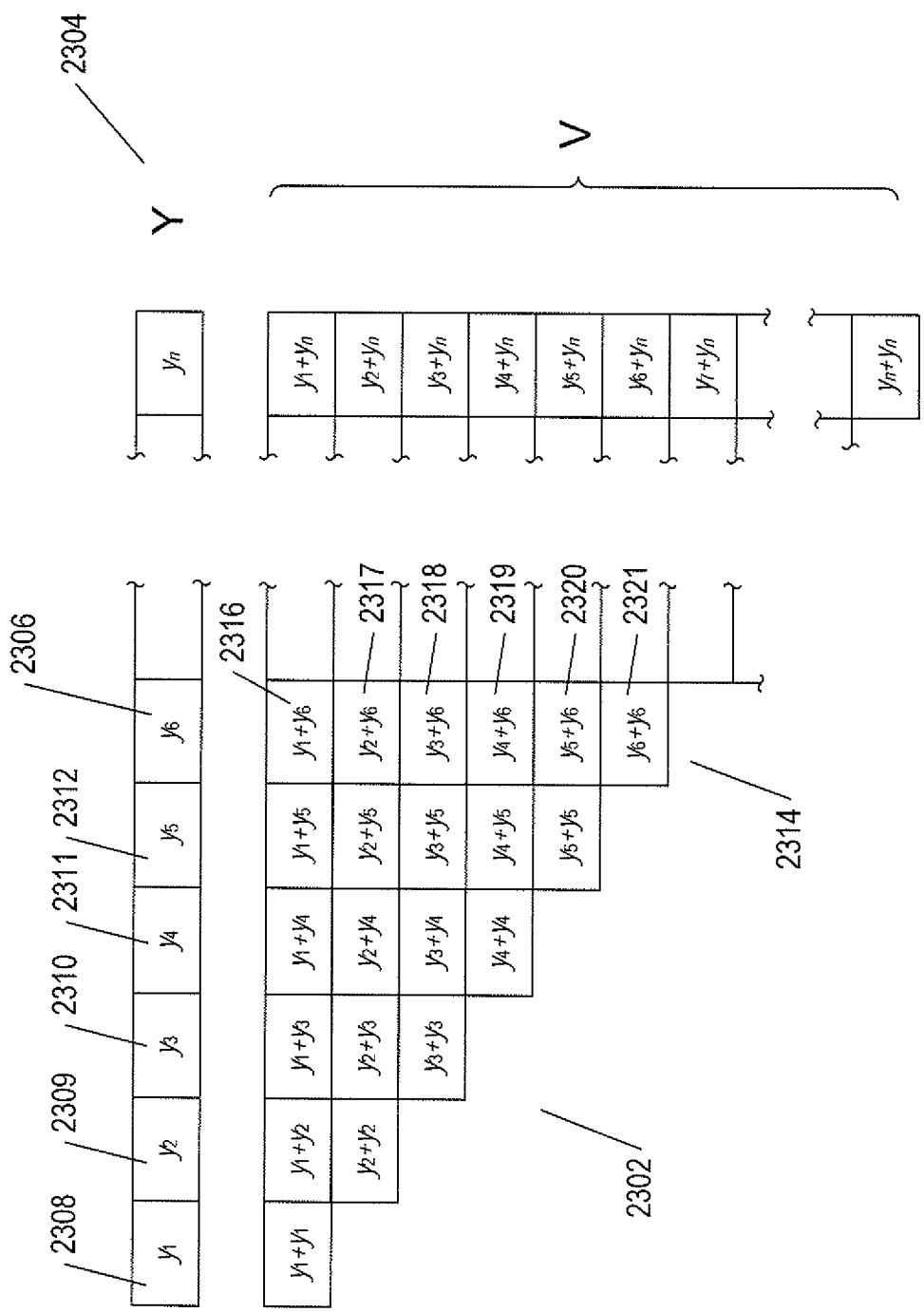
FIG. 23 shows a virtual triangular data structure that represents the values of the elements in an array V that contains sorted pair-wise sums of an initial set of values.

FIG. 23 shows a virtual triangular data structure that represents the values of the elements in an array V that contains sorted pair-wise sums of an initial set of values. The initial values are sorted and arranged in ascending order in a row vector Y. The virtual triangular data structure is discussed above, with reference to FIG. 21, for the specific case of computing the median pair-wise average of an ordered set of pair-wise averages generated from the results of a number of trials during a web-page test. In FIG. 23, a precise definition for the virtual triangular data structure for the general problem is provided. The virtual triangular data structure V 2302 includes one column for each of the elements of the row vector Y 2304. These columns include all of the pair-wise sums for the indexing element of row vector Y and all elements of Y below that indexing element. Thus, for example, for the element $y_6$ 2306, the pair-wise sums of element $y_6$ with the lower elements 2308-2312 and with element $y_6$, itself, appear, in order, in the column 2314 as elements of column 2314 2316-2321, respectively. Note that, in the current discussion, the virtual triangular data structure is referred to as V, since it logically contains the same values contained in the array V that contains sorted pair-wise sums of an initial set of values, discussed above with reference to FIG. 22.

FIGS. 24A-M provide an illustration, using an example sorted vector of initial values, of the determination of the midpoint value of the sorted vector of pair-wise sums V. This method depends on properties of the virtual triangular data structure illustrated in FIG. 23 that contain the values contained in the sorted row vector of initial values Y.

Figure 24A:
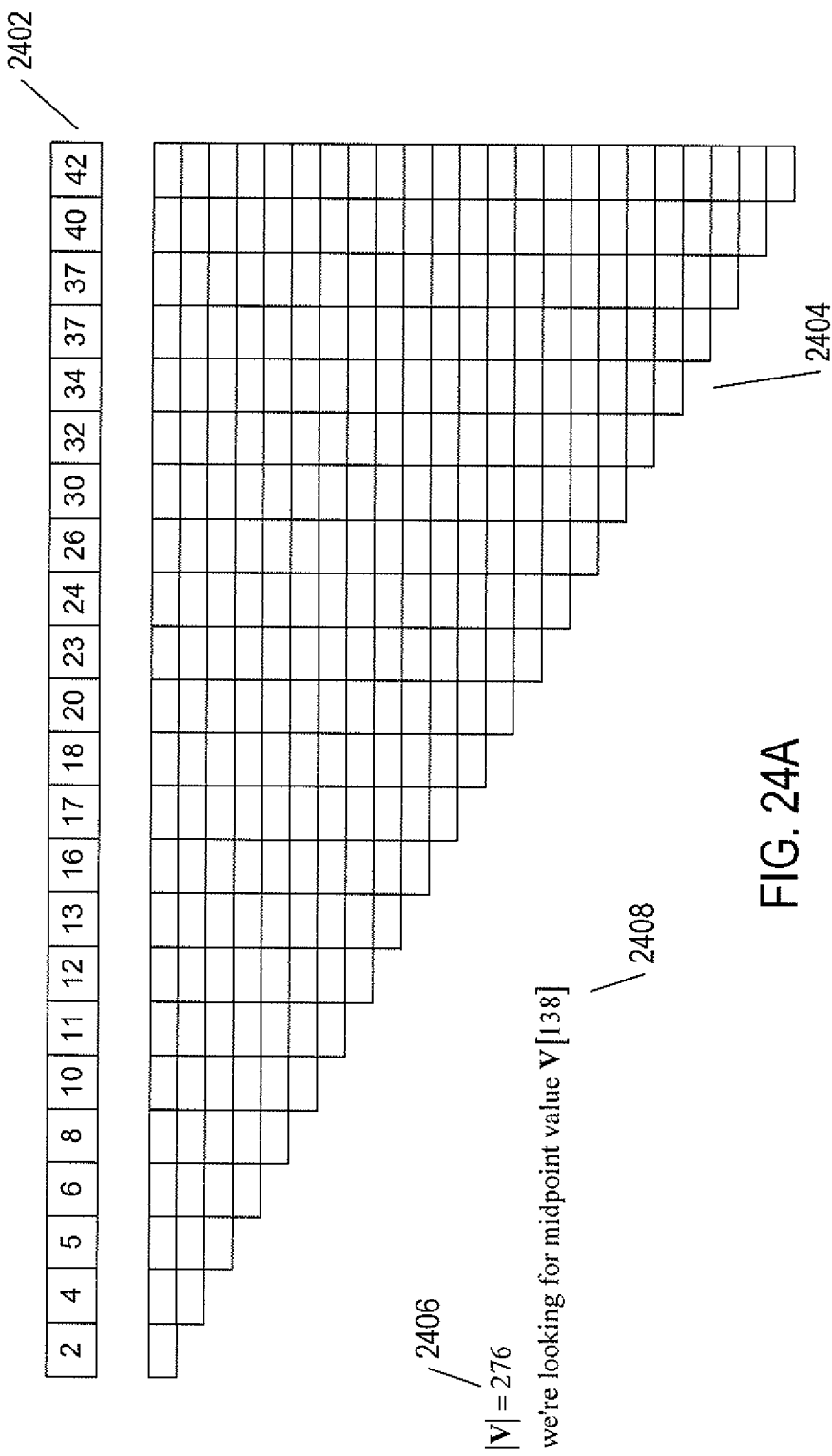

FIG. 24A shows an initial setup for the method for providing the midpoint value of the sorted vector of pair-wise sums of V. The sorted row vector Y 2402 containing the initial values is received as input to the method. It is, of course, relatively simple and efficient to sort an unsorted set of initial values into a sorted row vector, such as row vector 2402, using any of many different popular sorting algorithms, including variations of the well-known algorithm quicksort. Initially, the virtual triangular data structure V 2404 can be considered to be empty. In fact, it is important to note that the currently described method does not generate all or even a large fraction of the values of the virtual triangular data structure, but generates only a relatively small subset of the pair-wise sums of the virtual triangular data structure. The term "virtual" indicates that the virtual triangular data structure is not necessarily mapped to a physical data storage device or memory, as non-virtual data structures are generally mapped, and no particular element of the virtual triangular data structure is instantiated to include a computed value. However, while the triangular data structure is virtual, the numerical properties of the virtual triangular data structure are fixed by the sorted row vector of initial values 2402 and the computation method for generating sums of pairs of values. These characteristics are described, below, as part of the description of the method. One characteristic of the virtual triangular data structure is its size, in elements, which is the cardinality of set of values corresponding to sorted vector V 2406. For the current example, in which there are 23 initial values, the number of elements in sorted array V is 276. Thus, in the example problem, the midpoint value of V, or, in other words, V[138] (2408 in FIG. 24A), needs to be determined.

Figure 24B:
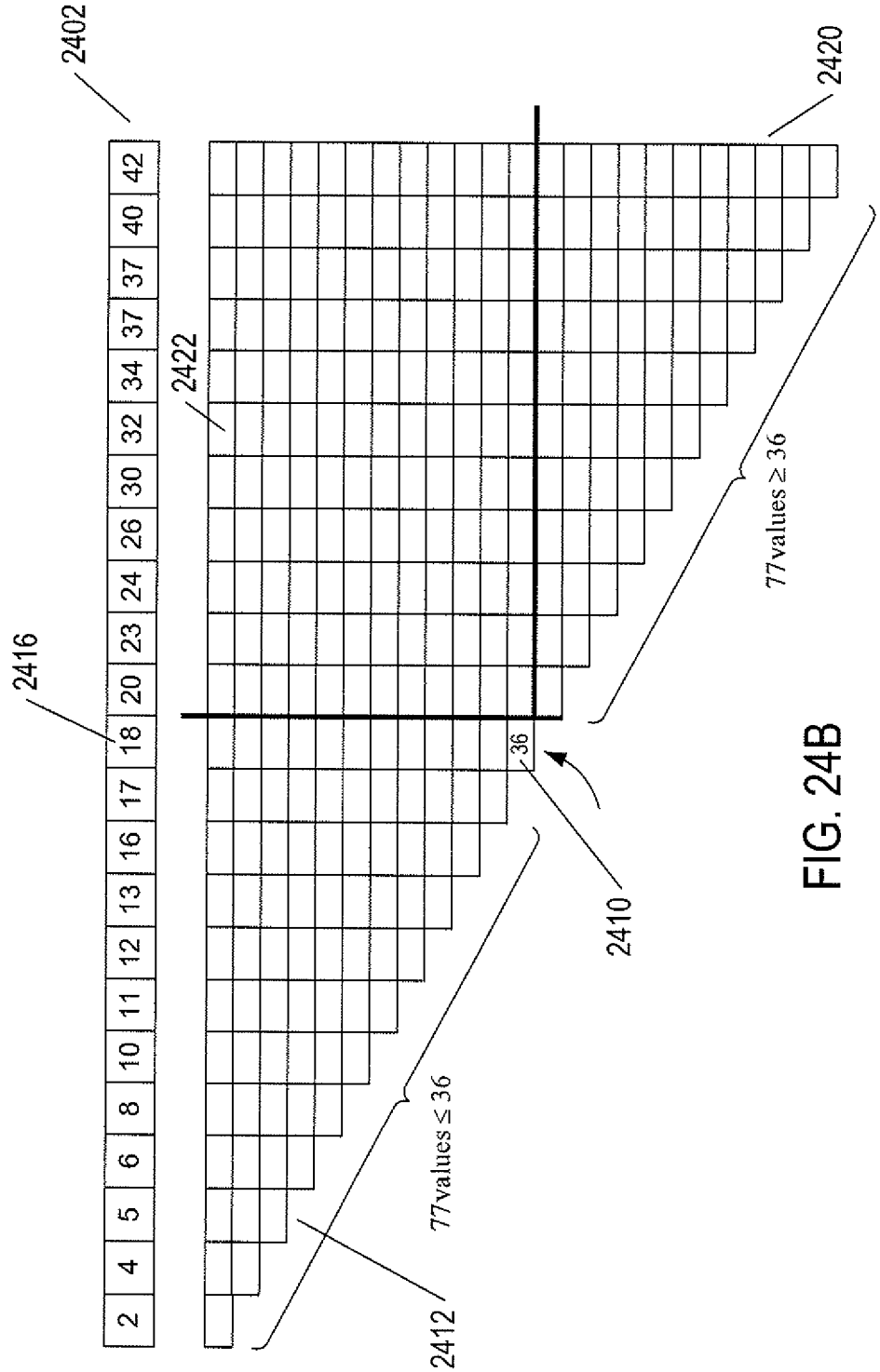

FIG. 24B illustrates an initial logical partitioning step. It can be easily seen, in FIG. 23, that the lower diagonal edge of the virtual triangular data structure includes elements that are non-decreasing, in magnitude, along the diagonal. In one implementation, the midpoint element, or one of the two midpoint elements, of this lower diagonal 2410 is selected as an initial partitioning point, or pivot. Because the method is trying to determine the median value in V, the initial pivot point is an approximation to a partitioning the virtual triangular data structure that will provide a smaller region of the virtual triangular data structure that contains the sought value.

Another characteristic of the virtual triangular data structure is that the elements in a column are non-decreasing in a downward traversal of the column. This characteristic arises from the fact that the elements in the row vector Y are sorted in ascending order. Furthermore, the elements in columns to the left of a particular column are less than or equal to the lowest element of the column and the elements in any row of the virtual triangular data structure are non-decreasing in a left-to-right traversal. As a result, a choice of the initial pivot 2410 partitions the virtual triangular data structure into three regions. In the first, triangular-shaped region 2412, all values must be less than or equal to the value stored in the pivot element, which is easily calculated to be 36, or twice the value in the corresponding element 2416 of the row vector 2402. In the current example, this first partition includes 77 values. A second, nearly triangular region 2420 also includes 77 values that are known to be greater than or equal to the value 36. The third, remaining rectangular region 2422 contains 122 values that must necessarily contain the median value. Note that, at this point in the method, it has only been necessary to compute the value stored in the pivot element 2410, 36, but already more than half of the total elements of the virtual triangular data structure have been eliminated as candidates for the median value.

Figure 24C:
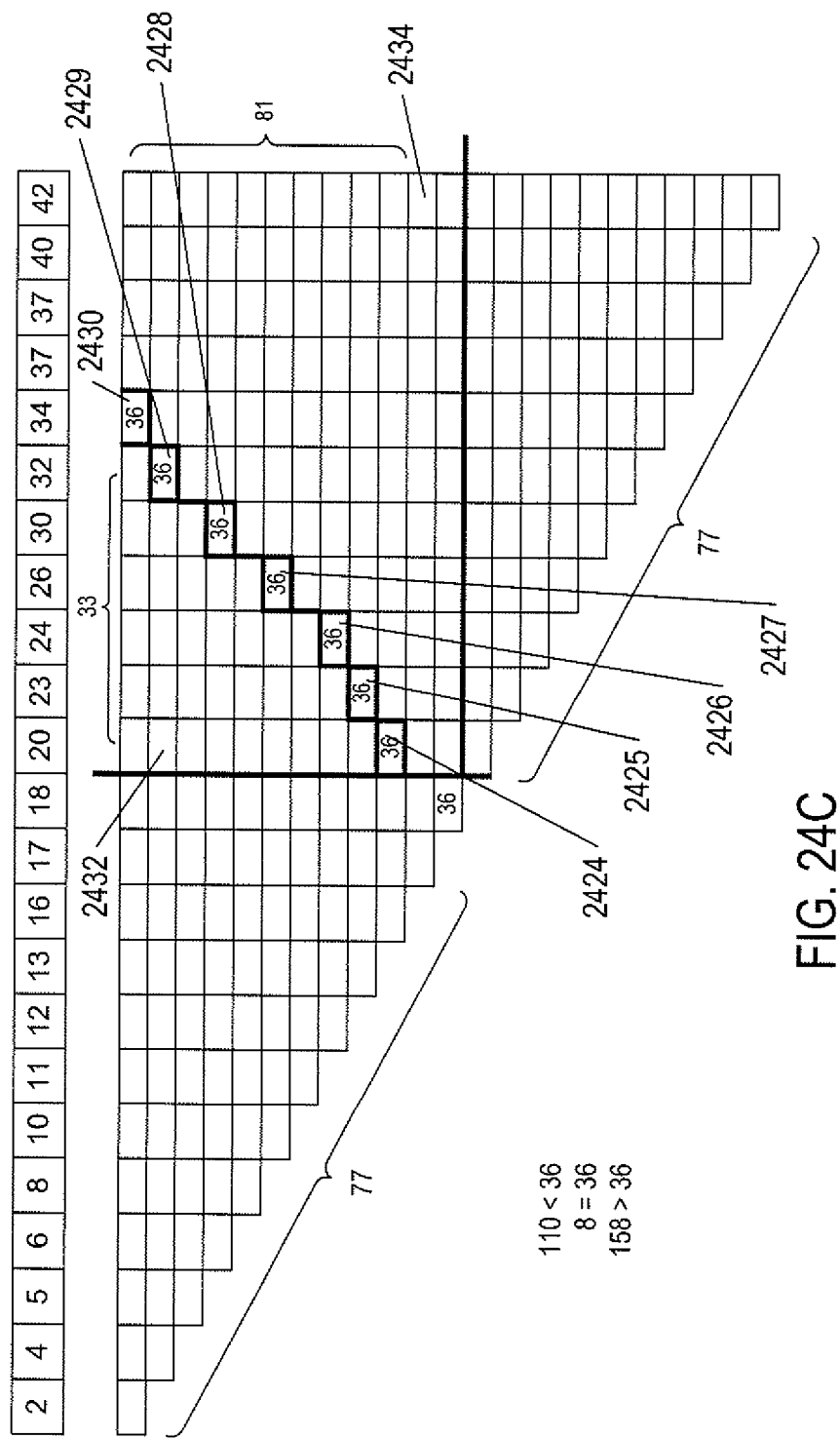
Figure 24D:
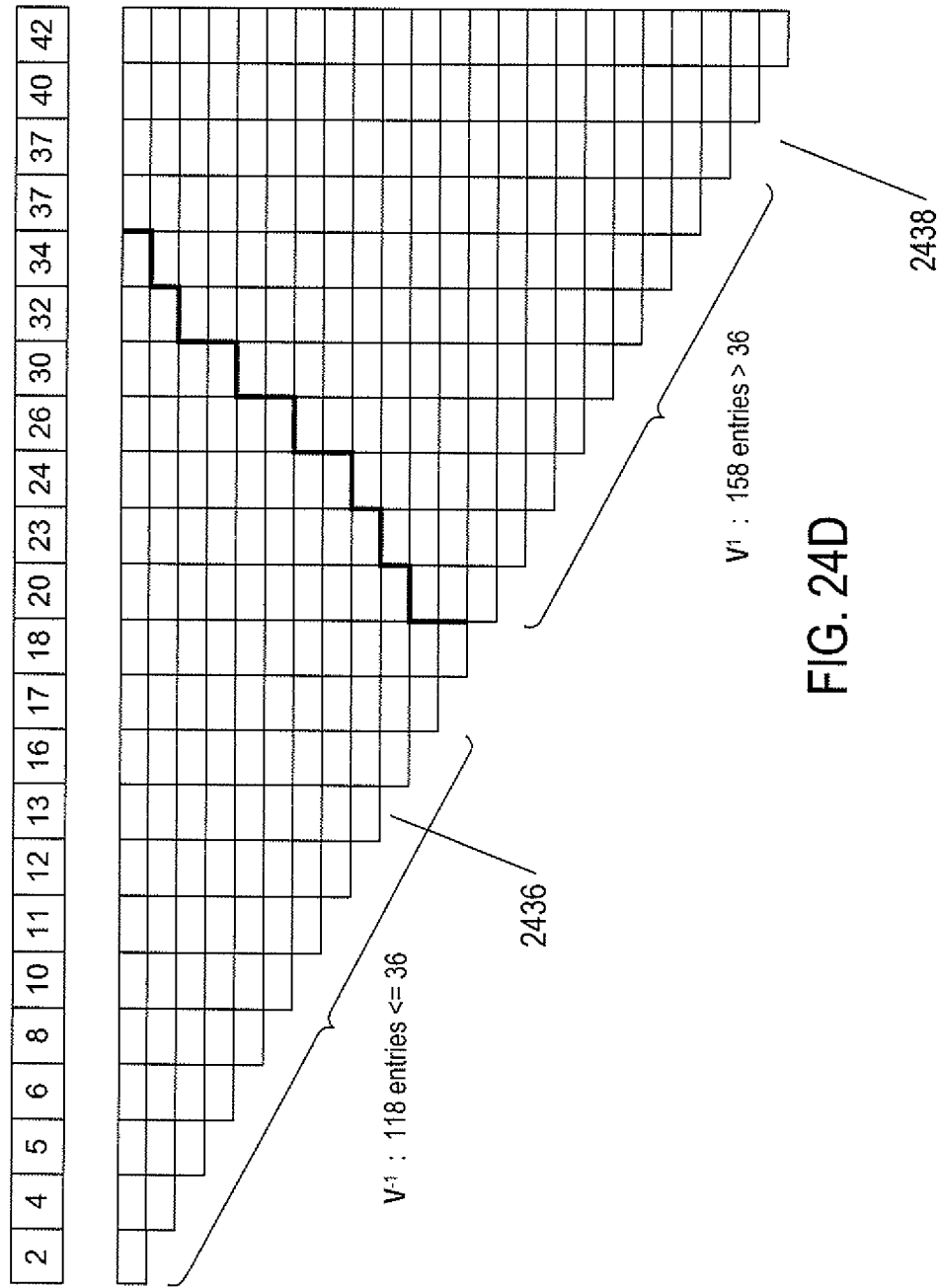

In a next step shown in FIG. 24C, the elements in the third partition (2422 in FIG. 24B) with the pivot value 36 are identified. It may be necessary to compute a few elements adjacent to these elements in the third partition in order to identify the elements containing the value 36. However, the positions of the elements containing the value 36 can be easily estimated from row vector Y because of the numerical properties of the virtual triangular data structure. The elements with value 36 (2424 in FIG. 24C) form a partition line that partitions the third partition from FIG. 24B (2422 in FIG. 24B) into a next triangular partition 2432 containing 33 values that are less than 36 and a second next partition 2434 that contains 81 values that are greater than 36. Thus, the third partition from FIG. 24B (2422 in FIG. 24B) is now partitioned into three partitions. Because the midpoint value is sought, the third of these partitions, 2434, must contain the midpoint value since the 81 elements in this partition are greater than the 33+7=40 elements in partition 2432 and the diagonal line of elements with value 36. Therefore, as shown in FIG. 24D, as a result of the steps shown in FIGS. 24A-C, the virtual triangular data structure V has been effectively partitioned into a first partition $V^{-1}$ 2436 with 118 entries that are known to be less than or equal to 36 and a second partition $V^{1}$ 2438 that includes 158 entries that are known to be greater than or equal to 36. Because the midpoint entry is sought, the midpoint entry must occur in the second partition $V^{1}$.

Figure 24E:
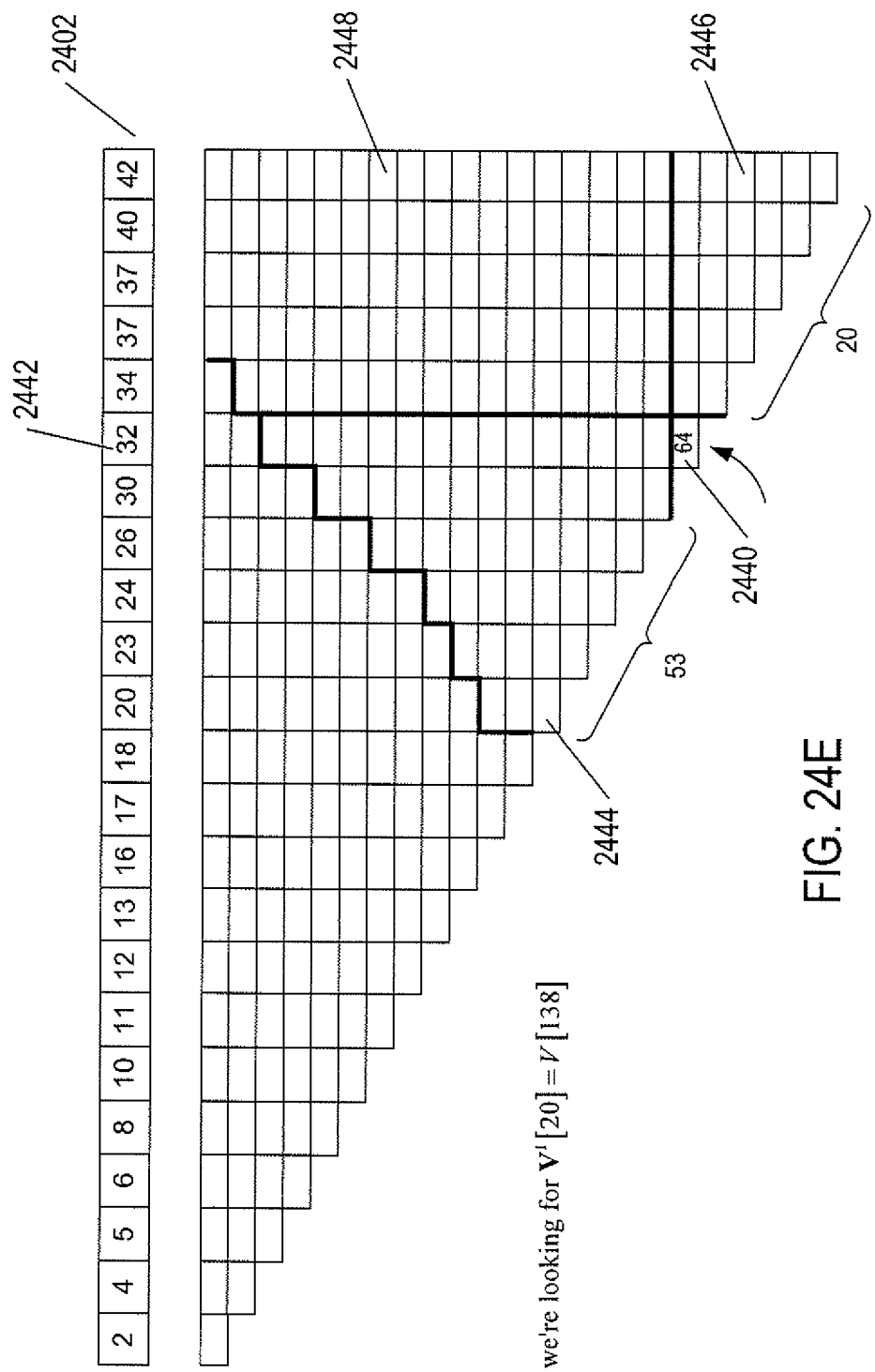
Figure 24F:
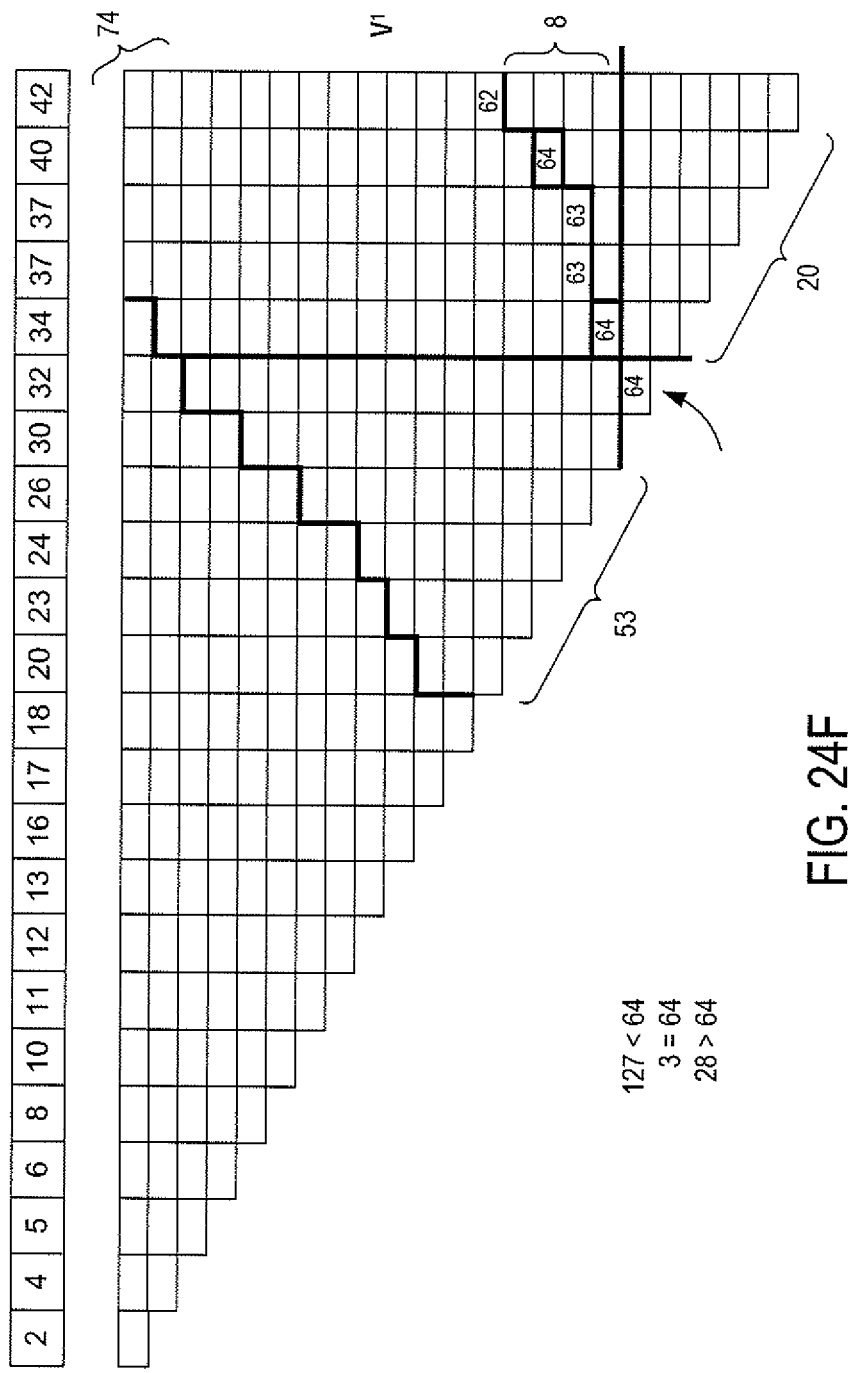
Figure 24G:
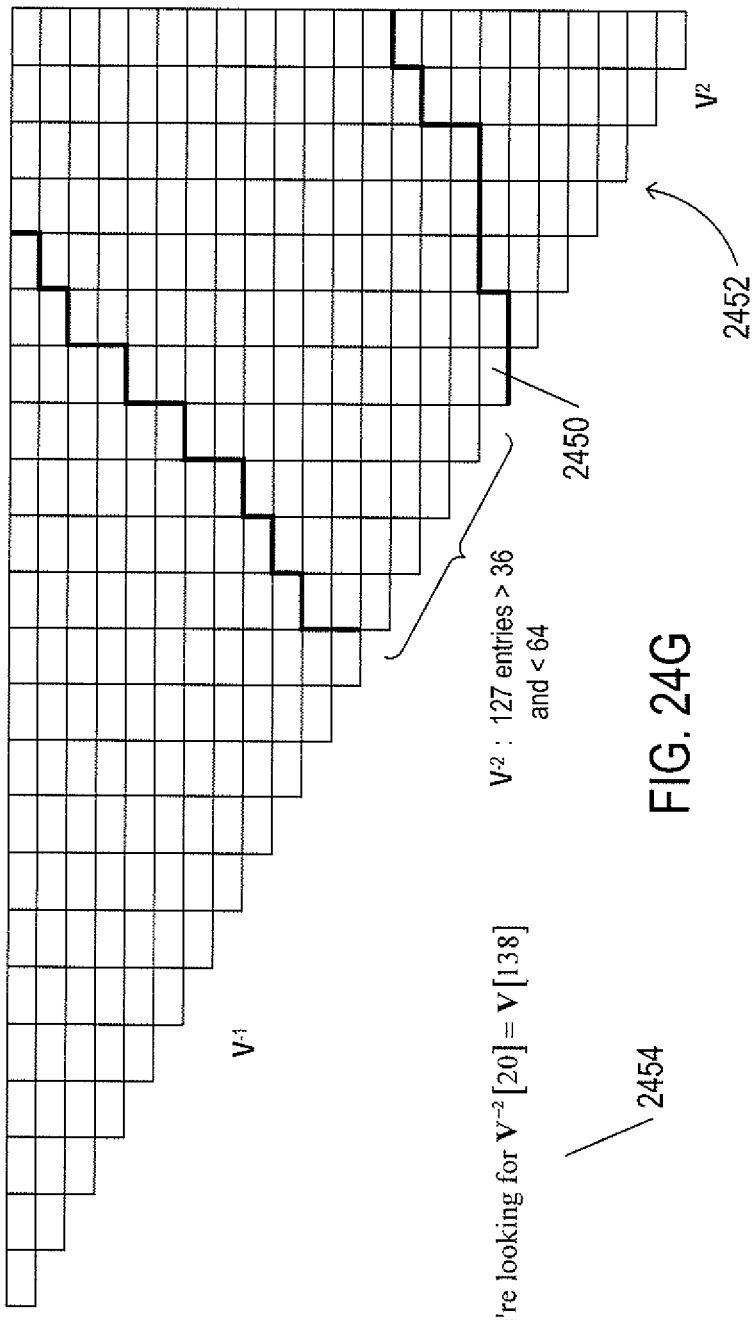

The method is recursive, and now continues by carrying out the same type of partitioning, carried out in the steps illustrated in FIGS. 24A-D, with respect to partition $V^{1}$ (2438 in FIG. 24D). As shown in FIG. 24E, a new pivot element 2440 is selected and the value contained in that element computed as twice the value contained in the associated element 2442 of the row vector 2402. This new pivot element defines three new partitions 2444, 2446, and 2448. The elements in the second partition 2448 equal to or less than and closest to 64 in each column are identified, as illustrated in FIG. 24F. This then partitions partition $V^{1}$ (2438 in FIG. 24D) into a first partition $V^{-2}$ 2450 and second partition $V^{2}$ 2452. Because the number of elements in $V^{-2}$ is greater than the number of elements in $V^{2}$, it can be concluded that the median element must be contained within partition $V^{-2}$. Note that, because partition $V^{-1}$ (2436 in FIG. 24D) contains 118 elements, the $20^{th}$ element, in sorted order, in $V^{-2}$ will be equal to the $138^{th}$, or midpoint element, of V 2454.

Figure 24H:
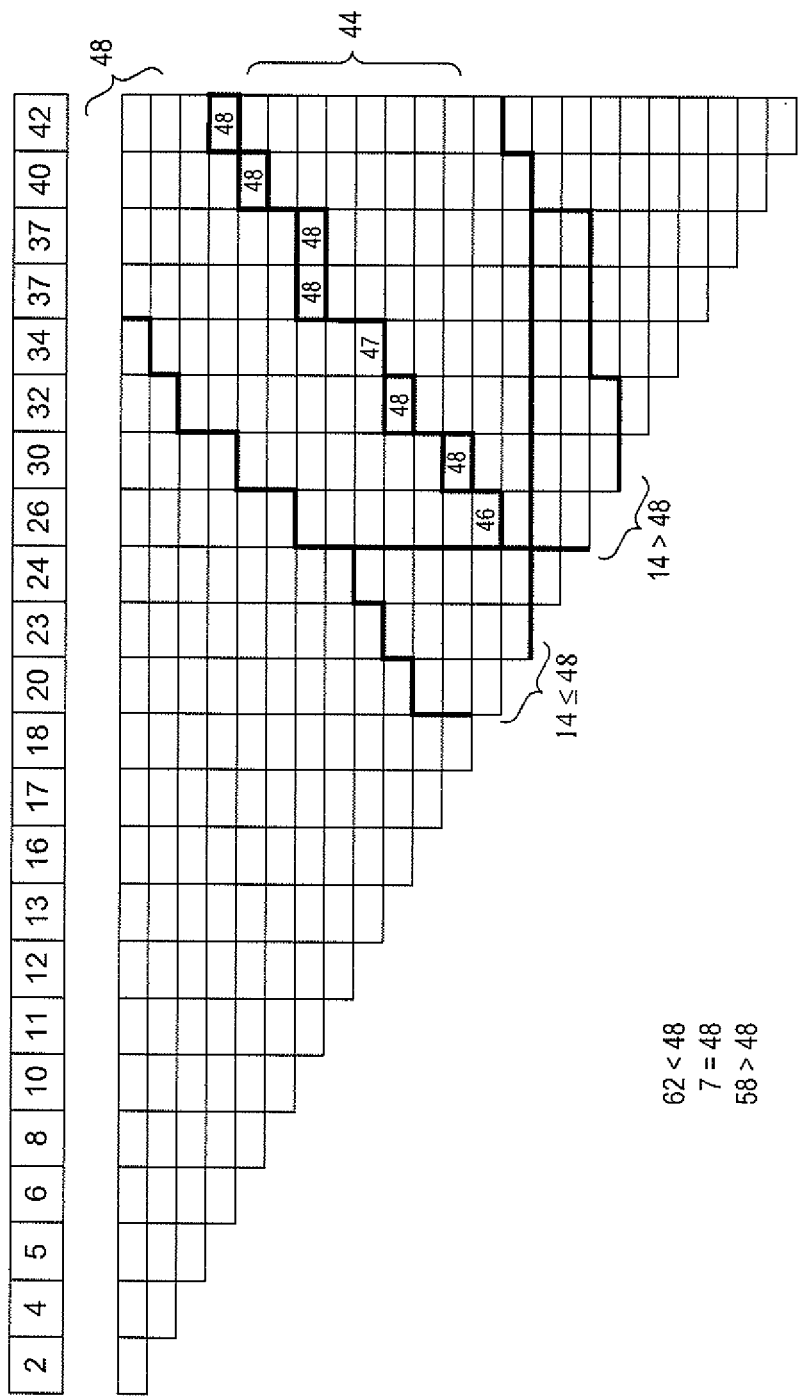
Figure 24I:
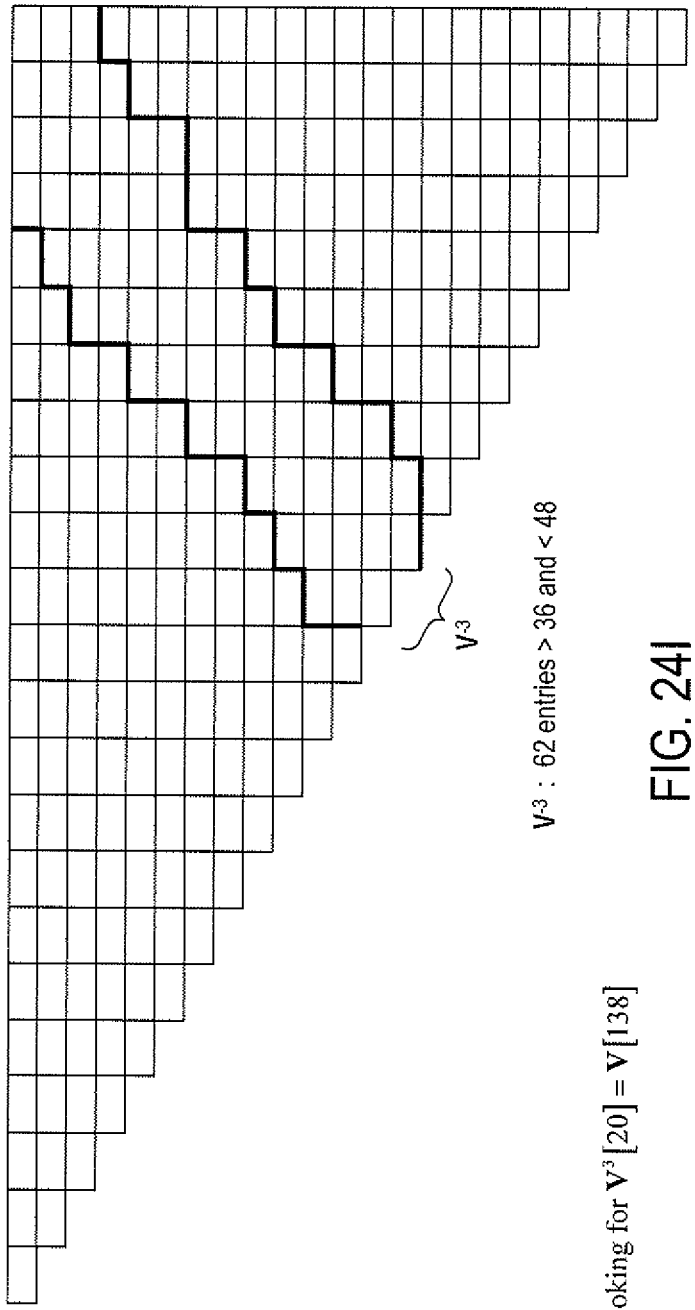
Figure 24J:
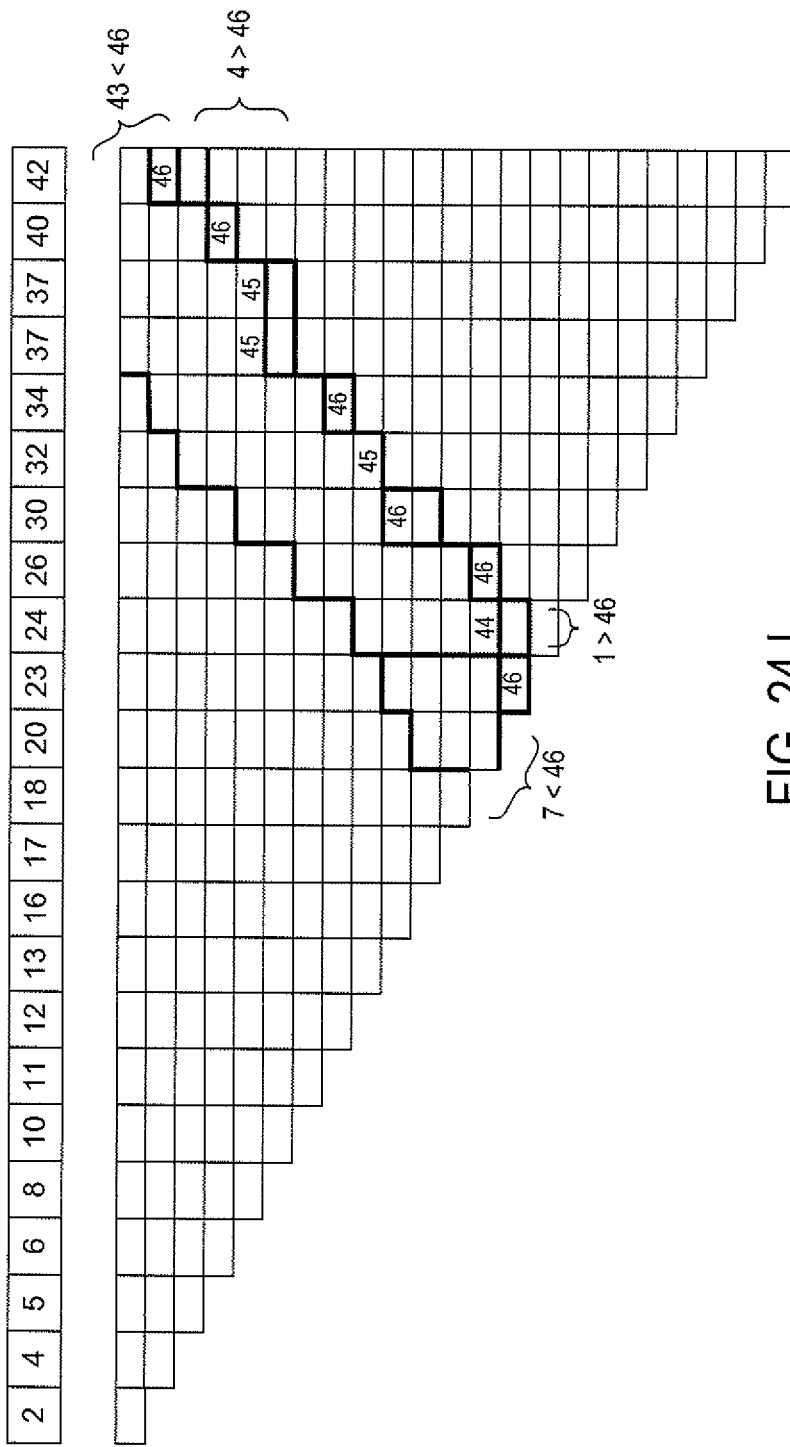
Figure 24L:
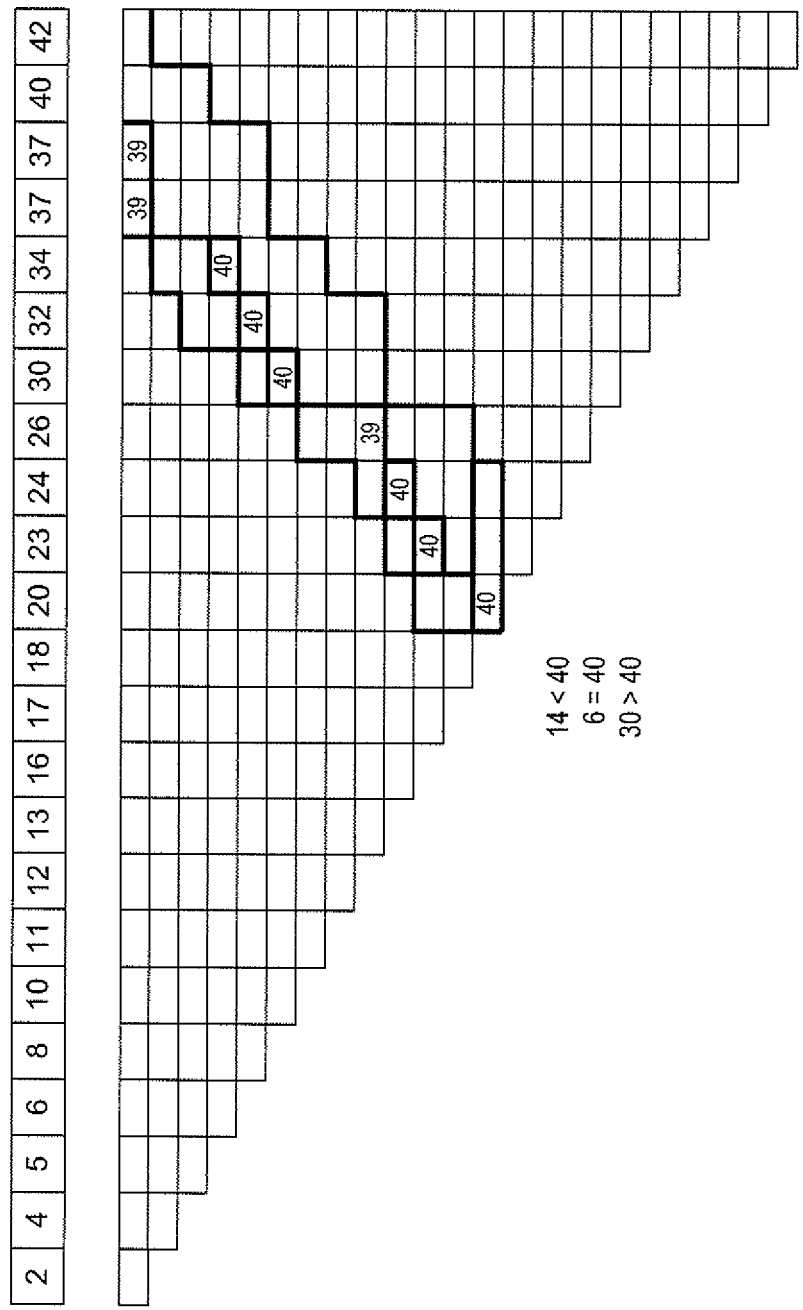

The same recursive partitioning procedure is next carried out with respect to partition $V^{-2}$ in FIG. 24H. In this case, the partitioning of partition $V^{-2}$ generates two partitions $V^{-3}$ and $V^{3}$, of which $V^{-3}$ is greater, in size, than $V^{3}$, and so, as shown in FIG. 24I, it is concluded that the median value must be contained within partition $V^{-3}$ and is, in fact, the $20^{th}$ element of that partition. Next, as shown in FIGS. 24J-K, partition $V^{-3}$, shown in FIG. 24I, is partitioned into two partitions $V^{-4}$ and $V^{4}$, of which $V^{-4}$ contains the greatest number of entries. Thus, as shown in FIG. 24K, partition $V^{-4}$ 2460 necessarily includes the median entry, and in fact, the median entry is the $20^{th}$ entry of this partition. As shown in FIGS. 24L-M, partition $V^{-4}$ (2460 in FIG. 24K) is again partitioned into two partitions, of which partition $V^{-6}$ 2464 has the greatest number of elements. Therefore, the median value is necessarily contained in partition $V^{-6}$. At this point, there is no obvious way to continue the recursive partitioning, and there is no particular need to do so, since $V^{-6}$ contains only 20 entries and it is known, in advance, that we need the $20^{th}$ entry in this partition. Thus, it is only necessary to find the largest value in partition $V^{-6}$, in this case 40, and return that value as the median value 2466.

Thus, through a series of six recursive partitionings of the logical virtual triangular data structure V, the efficient method has identified the median value 40 that would occur had the entire sorted vector V been constructed. In carrying out these partitionings, only a very small subset of the pair-wise sums in the virtual triangular data structure needed to be computed. Thus, the efficient method for identifying values at indexes within the logical sorted array V has identified the median value without initially computing a large set of pair-wise sums and without sorting this large set of pair-wise sums. This method relies principally on the numerical characteristics of the virtual triangular data structure V corresponding to a sorted vector of initial values Y. Use of this computationally efficient method can thus render the robust statistical method discussed above with reference to FIGS. 19A-20B computationally tractable for even large data sets and thus suitable for an automated web-testing service. The method illustrated in FIGS. 24A-M can be generalized to finding the value corresponding to any index i within sorted array V by appropriately choosing pivot points along the diagonal of the virtual triangular data structure to estimate an effective partitioning. However, even choosing the midpoint of the lower diagonal as the pivot point leads to a computationally efficient solution. The above described method has a computational complexity of O (n log(n)). In one test case, use of the efficient method, discussed above with reference to FIGS. 23 and 24A-M, allowed an automated analysis to be completed in a few minutes that would have otherwise taken over 50,000 years, had all the pair-wise sums been computed and sorted.

Figure 25A:
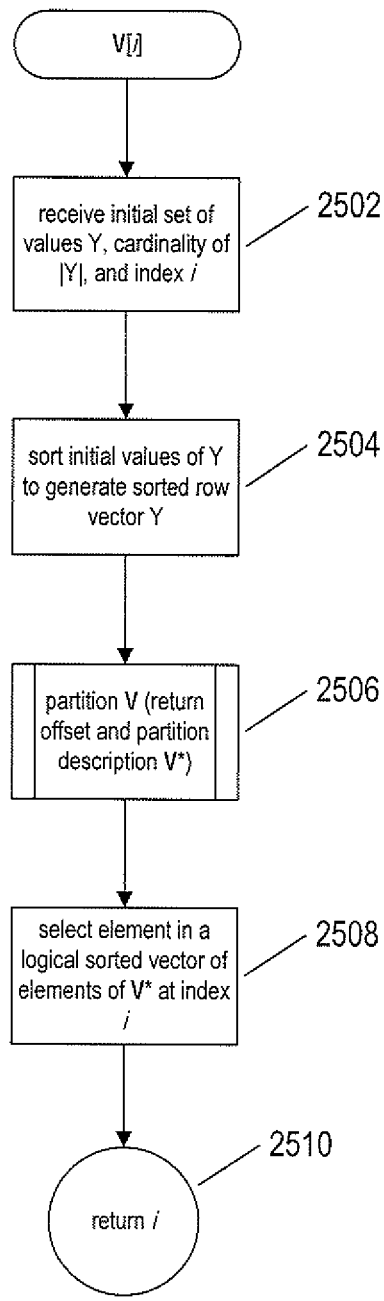

FIGS. 25A-F provide a control-flow-diagram description of the generalized method for finding the $i^{th}$ element of a sorted array, discussed above with reference to FIGS. 22-24M. FIG. 25A provides a control-flow diagram for the highest level of a routine V[i] which determines the value of the $i^{th}$ element of the V sorted array of values computationally produced from an initial set of values Y. In step 2502, the routine V[i] receives the set of initial values Y, the cardinality of the set Y, |Y|, and index i. Next, in step 2504, the initial values of set Y are sorted to generate a sorted row vector Y, as discussed above with reference to FIG. 23. Then, in step 2506, a subroutine "partition V" is called to carry out the process, discussed above, with reference to FIGS. 24A-M that produces a final partition and offset within that partition from which the desired value V[i] can be extracted. In step 2508, the desired value V[i] is selected from the final partition V* returned by the function "partition V," called in step 2506, and returned in step 2510.

Figure 25B:
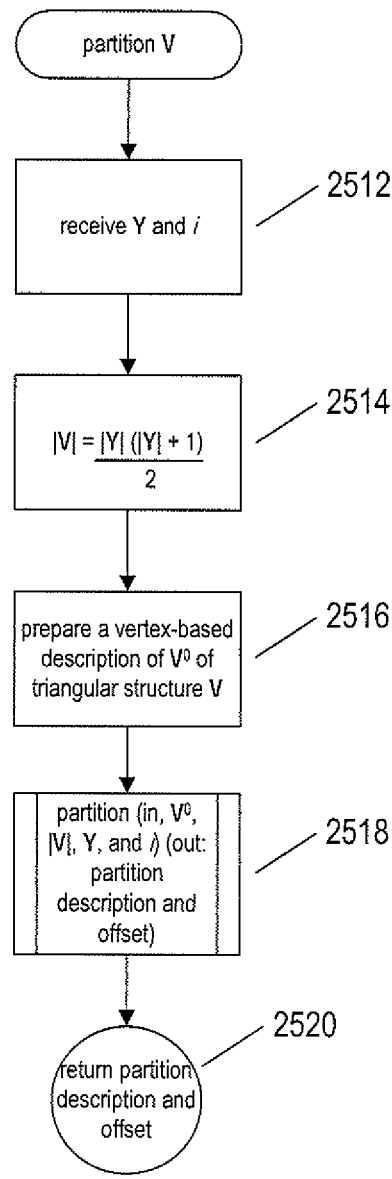

FIG. 25B provides a control-flow diagram for the routine "partition V," called in step 2506 of FIG. 25A. In step 2512, the routine "partition V" receives the row vector Y and the index i. In step 2514, the routine "partition V" computes the cardinality for the virtual triangular data structure V, discussed above with reference to FIG. 23. In step 2516, the routine "partition V" prepares a vertex-based description $V^0$ of the virtual triangular data structure V. Finally, in step 2518, the routine "partition V" calls a recursive routine "partition" to carry out a recursive partitioning of the virtual triangular data structure V discussed above with reference to FIGS. 24A-M. The final partition description and element offset is returned in step 2520.

FIG. 25C illustrates a vertex-based description of a partition. In FIG. 25C, the virtual triangular data structure V 2522, discussed above with reference to FIG. 23, is shown along with an internal partition 2524 using the same illustration conventions as used in FIGS. 24A-M. This partition 2524 can be described as a series of element coordinates or element descriptions corresponding to the vertices of the partition. In FIG. 25C, these vertex elements are marked with an internal filled circle, such as filled circle 2526 in element 2528. The list of elements or coordinates for elements is ordered, and starts with the left-most bottom elements, in this case element 2528. Using the numbering conventions shown in FIG. 23, this element would have coordinates (13, 13), being the element of the $13^{th}$ row within the $13^{th}$ column. Note that stretches of elements between two vertices that fall along vertical, horizontal, or diagonal lines need not be all included in the list, but only the end points of such segments. Thus, a vertex-based description of the initial virtual triangular data structure V would include only three sets of coordinates for three elements. Other types of representations of partitions can also be used, in alternative implementations.

Figure 25D:
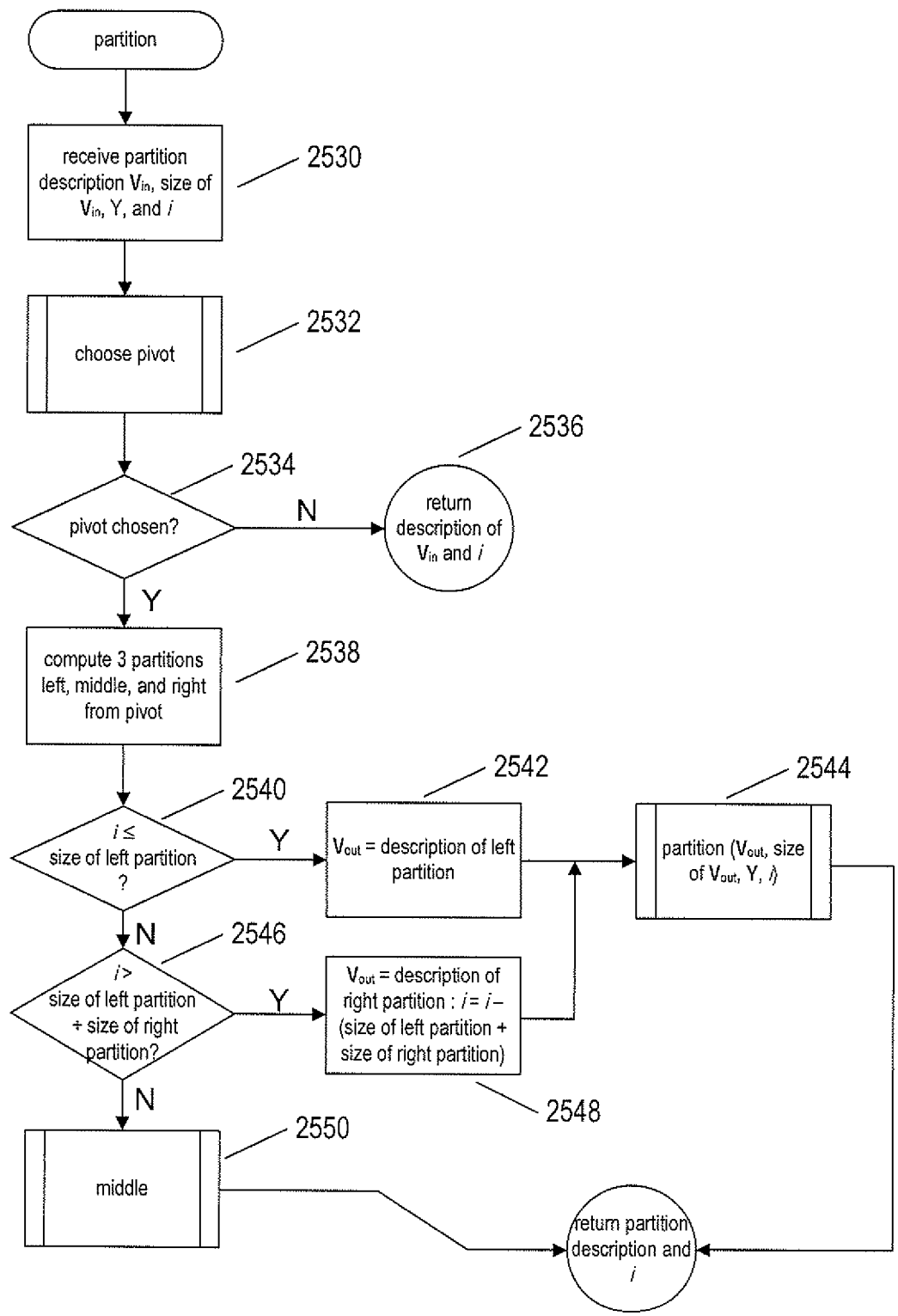

FIG. 25D provides a control-flow diagram for the routine "partition" called in step 2518 of FIG. 25B. In step 2530, the routine "partition" receives a partition description $V_{in}$, an indication of the size of $V_{in}$, the row vector Y, and i. Next, in step 2532, the routine "partition" calls a routine "choose pivot" to choose a pivot by which to partition the partition described by $V_{in}$, as discussed above with reference to FIG. 24B. If a pivot cannot be chosen, as determined in step 2534, then the routine "partition" returns a description of $V_{in}$ and i, in step 2536. Otherwise, in step 2538, the routine "partition" computes the three partitions, including a left partition, middle partition, and right partition, from the pivot, as discussed above with reference to FIG. 24B. When i is less than or equal to the size of the left partition, as determined in step 2540, then, in step 2542, the routine "partition" creates a description $V_{out}$ of the left partition created in step 2538 and recursively calls itself in step 2544. Otherwise, if i is greater than the sum of the sizes of the left partition and the middle partition, as determined in step 2546, then, in step 2548, the routine "partition" creates a description "partition $V_{out}$ of the right partition and decrements index i by the sum of the sizes of the left partition and middle partition before calling itself recursively in step 2544. Otherwise, in step 2550, the routine "partition" calls the routine "middle." In all cases, the routine "partition" returns a partition description and index i returned from the recursive call to itself or the call to the routine "middle."

Figure 25E:
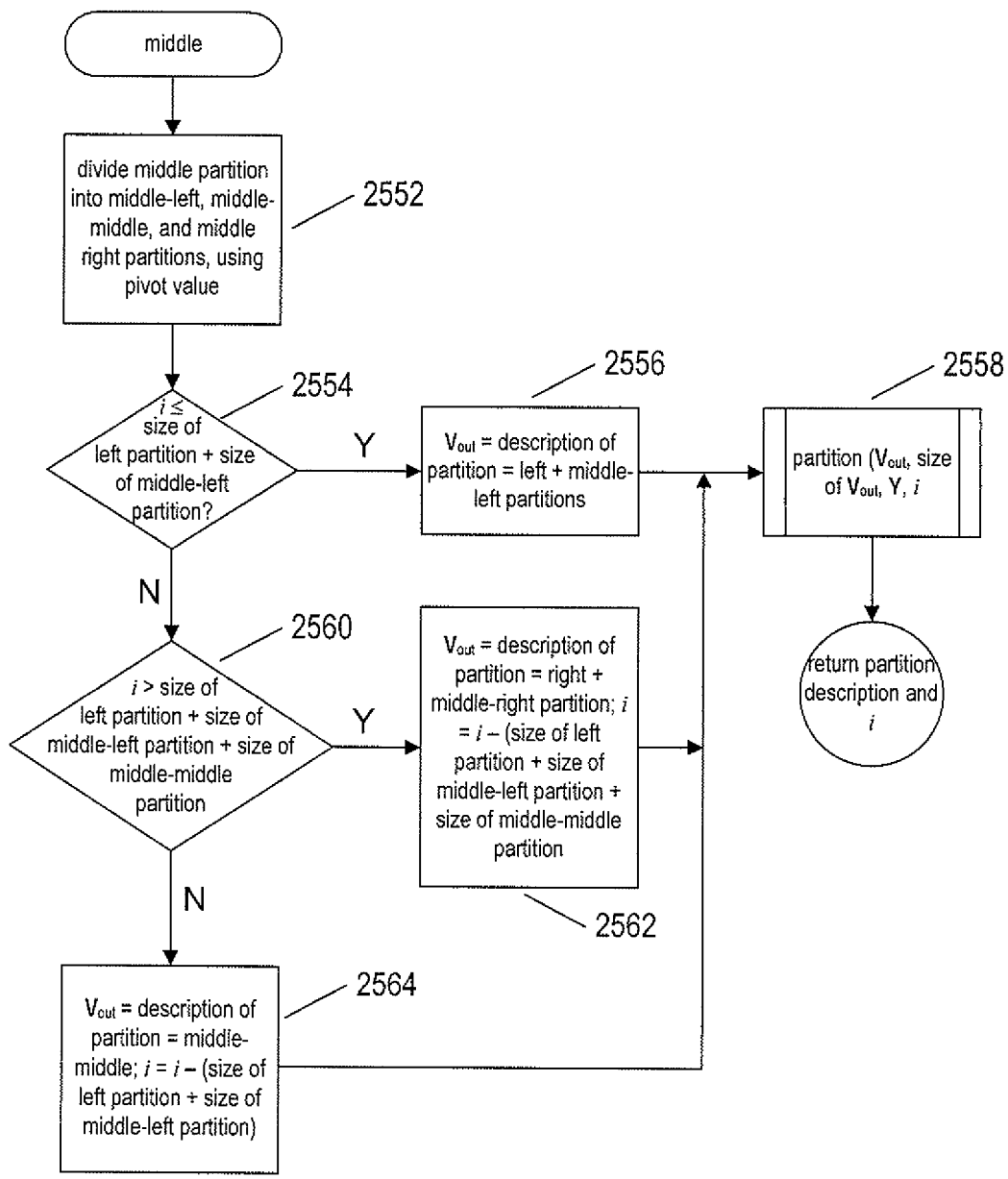

FIG. 25E provides a control-flow diagram for the routine "middle," called in step 2550 of FIG. 25D. In step 2552, the routine "middle" divides the middle partition, created in step 2538 of FIG. 25D, into middle-left, middle-middle, and middle-right partitions using the pivot value chosen in step 2532 of FIG. 25D. This process is discussed above with reference to FIG. 24C, with the middle-middle partition being those values within the middle partition equal to or less than but closest to the pivot value in certain columns of the middle partition. When i is less than or equal to the size of the left partition plus the size of the middle-left partition, as determined in step 2554, then the routine "middle" generates a description $V_{out}$ with the partition equal to the sum of the left and middle-left partitions, in step 2556, and then recursively calls the routine "partition" in step 2558. Otherwise, if i is greater than the size of the left partition plus the size of the middle-left partition and the size of the middle-middle partition, as determined in step 2560, then the routine "middle" creates a description $V_{out}$ of the partition representing the sum of the right and middle-right partitions and decrements i by the size of the left partition, middle-left partition, and middle-middle partition in step 2562 prior to recursively calling the routine "partition" in step 2558. Otherwise, in step 2564, the routine "middle" prepares a description of a partition $V_{out}$ corresponding to the middle-middle partition and decrements i by the sum of the sizes of the left partition and middle-left partition prior to recursively calling the routine "partition" in step 2558.

Figure 25F:
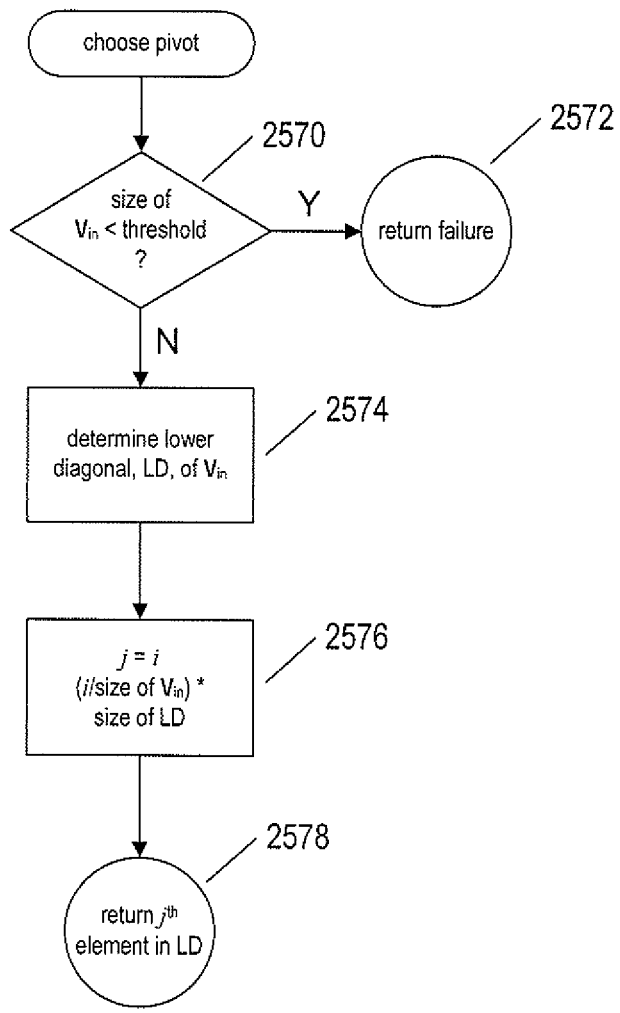

FIG. 25F shows one possible implementation of the routine "choose pivot" called in step 2532 of FIG. 25D. In step 2570, the routine "choose pivot" determines whether the size of the input partition description $V_{in}$ is less than a threshold size. If so, then the routine "choose pivot" returns a failure indication in step 2572. Otherwise, in step 2574, the routine "choose pivot" determines the lower diagonal portion LD, even if one element, of the partition described by $V_{in}$. Then, in step 2576, the routine "choose pivot" computes the index j as the ratio of i to the size of the partition described by $V_{in}$ times the size of LD and, in step 2578, returns the $j^{th}$ element in LD as the pivot element. In general, the routine "choose pivot" returns a pair of coordinates or some other indication of the $j^{th}$ element. However, there are many different alternative approaches to choosing a pivot element.

Figure 26:
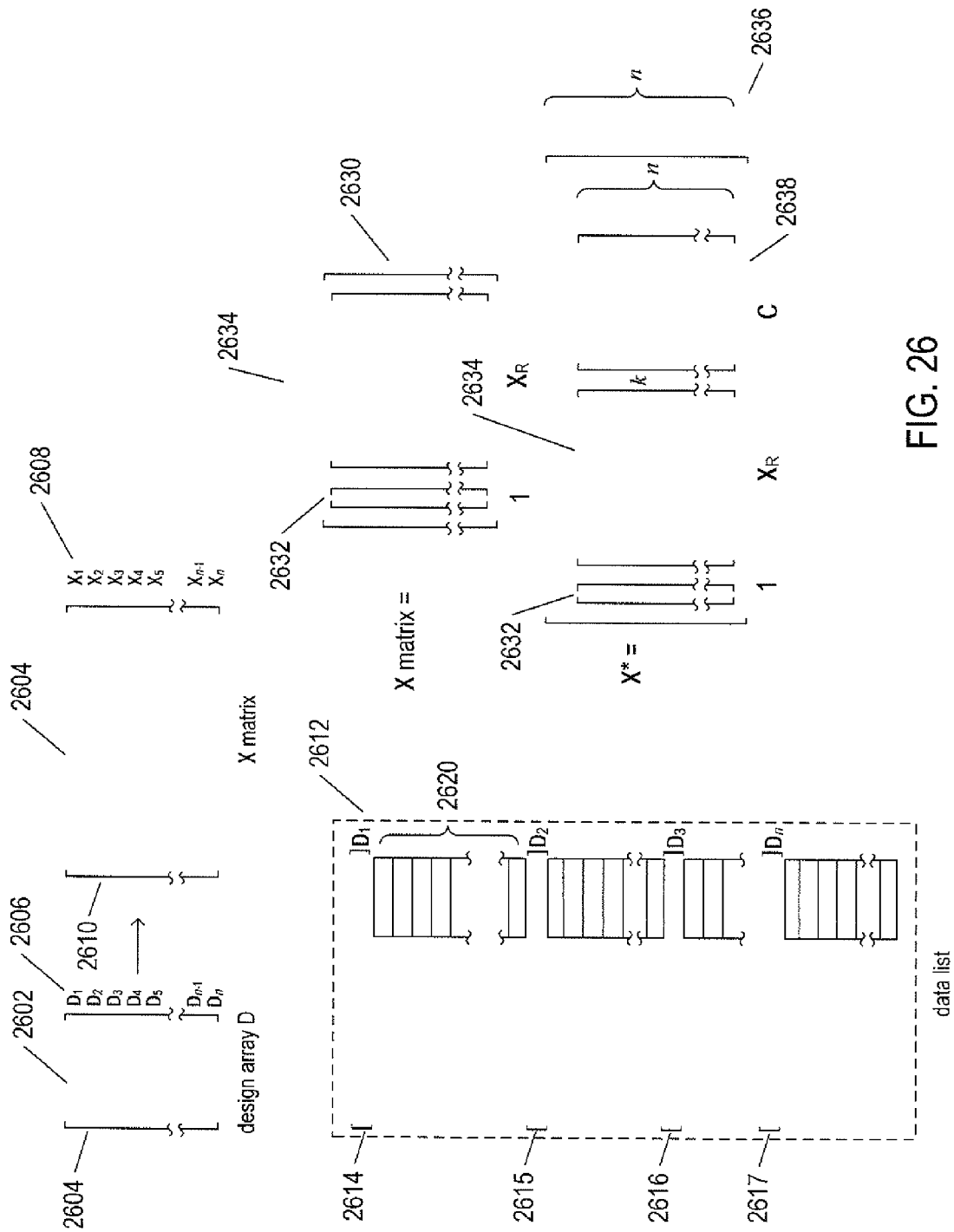
FIG. 26 illustrates initial steps in processing website-testing data for a multi-factor/multi-level analysis.

Robust and Computationally Efficient Processing of Multi-Factor/Multi-Level Non-Binomial Test Results in an Automated Web-Analytics System Next, in this final subsection, a robust method for processing multi-factor/multi-level website-testing data is provided. As discussed above with reference to FIG. 12, a multi-factor/multi-level test is concisely specified by a design array. As discussed above with reference to FIG. 14C, the design array is equivalent to the X matrix. FIG. 26 illustrates initial steps in processing website-testing data for a multi-factor/multi-level analysis. As shown in FIG. 26, and as mentioned above, the multi-factor/multi-level test is specified by a design array 2602 that is equivalent to an X matrix 2604. In FIG. 26, the matrices are represented by spaces enclosed by square brackets, with indications of the elements within the matrices admitted. However, as shown in FIG. 26, each row in the design array may be specified using a row index as a subscript. As shown in FIG. 26, the first row in the design array 2604 is represented as $D_1$ 2606. Similarly, the rows of the X matrix can be specified using row-index subscripts, such as $X_1$ 2608, which represents the first row 2610 of the X matrix.

As discussed above with reference to FIGS. 5A-C, website testing is carried out to produce a set of observed results, such as the table of results 720 in FIG. 7. In general, testing is continued long enough to collect a threshold number of observed results for each different experiment corresponding to a row of the design array. With the conclusion of testing, these results are organized into a data list 2612 that logically comprises a set of headings, such as headings 2614-2617 corresponding to the rows of the design array, and the accumulated results, or observables, for the experiment specified by the design-array rows, such as the table of results 2620 for the experiment, or web-page variant, specified by the first row $D_1$ 2614 of the design array D.

In the processing of the results obtained by a website test, various steps depend on using an X matrix in which all of the columns are independent. However, in general, the X matrices corresponding to design arrays include dependent columns. As a result, it is necessary to transform the X matrix by adding additional columns for those interaction effects to be analyzed as well as for dummy variables that are introduced, via constraints, in order that the transformed X matrix X* includes only independent columns. This process is illustrated in FIG. 26. First, the X matrix 2630 can be considered to be an initial column of all "1" elements, 1, 2632 and a set of k remaining columns, $X_R$ 2634. The transformed X matrix X* 2636 is obtained by including the first column of "1" elements 2632 and a matrix obtained as the product of $X_R$ 2634 and a matrix C 2638, referred to as a "contrast matrix." The contrast matrix essentially encodes one or more different types of constraints that have the effect of removing columns from $X_R$. This matrix is used, in subsequent processing, to obtain an estimate for a vector of corresponding coefficients, $\hat{\beta}^*$, that can be multiplied by the contrast matrix C in order to transform $\hat{\beta}^*$ to $\hat{\beta}_R$, or a vector of coefficients corresponding to the original $X_R$ matrix portion of the X matrix:

$$\hat{\beta}_R = C\hat{\beta}^*_R.$$

In the robust case, estimates of the coefficients, $\hat{\beta}$, are obtained by the following steps: First, the function $D(Y-X^*\beta^*)$ is defined as:

$$D(Y - X^*\beta^*) = \frac{\sqrt{12}}{n+1} \sum_{i=1}^{n} \left[ R_i(\beta^*) - \frac{n+1}{2} \right] (Y_i - X_i\beta^*)$$

where $R_i(\beta)$=rank of $Y_i - X_i\beta$.

This is a rank-based metric that uses the ranks of the residuals. Estimates of $\hat{\beta}^*$ are obtained by minimizing this function:

$$\hat{\beta}^* = \min_{\beta^*} D(Y - X^*\beta^*).$$

Then, as discussed above, the $\hat{\beta}^*_R$ portion of $\hat{\beta}^*$ are converted to $\hat{\beta}_R$ using the contrast matrix:

$$\hat{\beta}_R = C\hat{\beta}^*_R.$$

The value $\beta_0$ can then be prepended to $\hat{\beta}_R$ to generate the estimated coefficients $\hat{\beta}$:

$$\hat{\beta}_R \rightarrow \hat{\beta}.$$

Having $\hat{\beta}$, the observables can be estimated from the X matrix by:

$$\hat{Y} = X\hat{\beta}$$

and the estimated observables can be subtracted from the actual observables to produce the estimated residuals $\hat{\epsilon}$:

$$\hat{\epsilon} = Y - \hat{Y}.$$

At this point, processing has produced the derived results which, in the non-robust case, provide a basis for computing significance values according to the ANOVA method, as discussed above with reference to FIGS. 16A-17. However, because a robust method based on residual ranks is used, in the robust processing method, the estimated observables and residuals $\hat{Y}$ and $\hat{\epsilon}$ are not distributed in the same fashion as those values estimated using the above-described least-squares method. It is possible to generate pseudo-observables $\tilde{Y}$ from the robustly estimated observables $\hat{Y}$ in the following fashion. First, the function a( ) is defined as:

$$a(i) = \sqrt{12}\left(\frac{i}{n+1} - \frac{1}{2}\right).$$

The value $\zeta_\phi$ is computed using the a( ) by:

$$\zeta_\phi = \sqrt{\frac{n-k}{\sum_{i=1}^{n} a^2(i)}}.$$

The residuals $\hat{\epsilon}$ computed by the robust method form a column vector that can be transformed to a rank-based column vector $R(\hat{\epsilon})$, and this column vector can be additionally transformed by the vector version of the function a( ) a( ) to produce the transformed column vector $a(R(\hat{\epsilon}))$. FIG. 27A illustrates the transformation of $\hat{\epsilon}$ to $a(R(\hat{\epsilon}))$ using a small example column vector $\hat{\epsilon}$. The initial transformation 2702 replaces computed estimates of residuals with their ranks, with the value of the ranks ascending in parallel with increasing residual values, and the second transformation 2704 applies the function a( ) to each element of R($\hat{\epsilon}$). As can be seen by comparing the original $\hat{\epsilon}$ vector 2706 with a(R($\hat{\epsilon}$)), the two-part transformation shown in FIG. 27A ends up generating a set of values symmetric about the midpoint-value element in the original vector $\hat{\epsilon}$ 2706, with increasingly negative values assigned to correspond to increasingly smaller-magnitude values in $\hat{\epsilon}$ 2706 and increasingly positive values assigned to correspond to elements in $\hat{\epsilon}$ with increasingly positive magnitudes.

FIG. 27B shows a table of values of the function $a^2$( ) for the first six positive integers. In the column 2710 at the right of the plotted values 2712, the value of $$\sum_{i=1}^{n} a^2(i)$$

for the first six positive integers. As can be seen, these values, other than the first value for the case of n=1, are approximately equal to n−2. Thus, it can be seen that the computed value $\zeta_\phi$ generally increases with n, although it is dependent on the value of k, where n−k is proportional to the degrees of freedom. Multiplying the values in the column vector a(R($\hat{\epsilon}$)) generates a type of spreading or distribution of the residuals that is proportional to the measure of the variance $\zeta_\phi$.

The last element in the expression for $\tilde{Y}$ is $\hat{\tau}_\phi$. This value can be thought of as a measure of the standard deviation of the residual values. Thus, in the expression for the pseudo-observables $\tilde{Y}$, the estimated results $\hat{Y}$ are redistributed by adding to the column vector $\hat{Y}$ the column vector $\hat{\tau}_\phi \zeta_\phi$ a (R($\hat{\epsilon}$)) to the column vector $\hat{Y}$. The pseudo-observables $\tilde{Y}$, then have the distribution expected for $\hat{Y}$, generated by the least-squares method, and can be used in place of $\hat{Y}$, generated by the above-described robust-processing method, to produce an ANOVA table with significance values for each of the factors in the same fashion as discussed above with reference to FIGS. 16A-17. Thus, the only factor left to be obtained is $\hat{\tau}_\phi$.

In order to compute $\hat{\tau}_\phi$, the distribution of the absolute value of the differences between the set of ordered residuals $\tilde{H}$ is used:

$$\tilde{H}(y) = \frac{1}{N} \sum_{i=1}^{n} \sum_{j>1}^{n} I(|Z_{(i)} - Z_{(j)}| \le y).$$

Figure 27C:
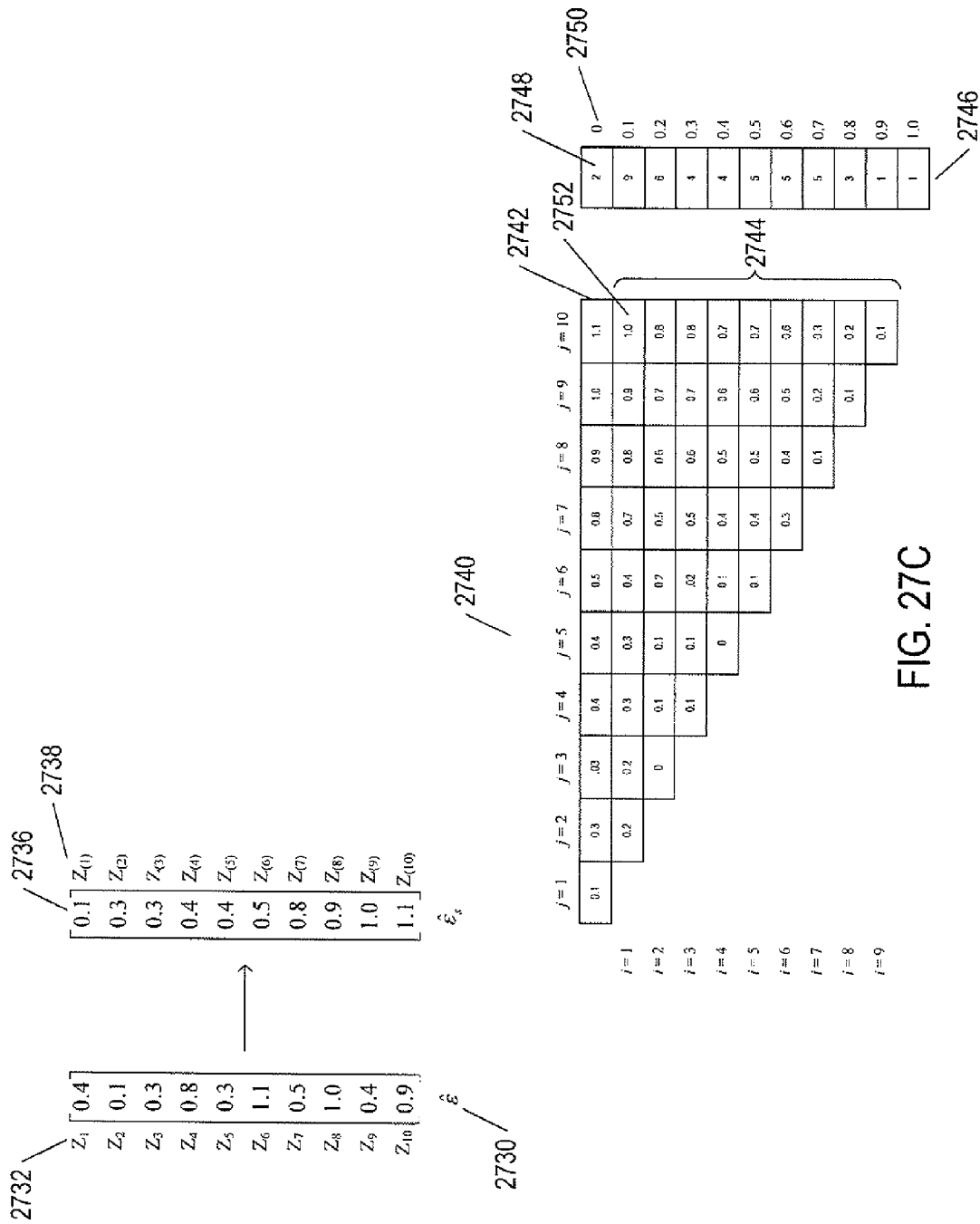
FIG. 27C illustrates the meaning of the terms $Z_{(i)}$ and $Z_{(j)}$ in the expression for the distribution $\tilde{H}(y)$.

In this expression, I( ) is an indicator function that returns "1" when the expression argument evaluates to true, and "0" otherwise. FIG. 27C illustrates the meaning of the terms $Z_{(i)}$ and $Z_{(j)}$ in the expression for the distribution $\tilde{H}(y)$. An example vector of residuals $\hat{\epsilon}$ 2730 is first shown, in FIG. 27C, with the elements identified by the names $Z_1$, $Z_2$, ..., $Z_n$, where n=10 (2732 In FIG. 27C). This column vector is transformed 2734 to the column vector $\hat{\epsilon}_s$ 2736 by sorting the residual-value elements of $\hat{\epsilon}$ by value. The elements of the column vector $\hat{\epsilon}_s$ are named $Z_{(1)}, Z_{(2)}, \ldots, Z_{(n)}$ 2738. The distribution of absolute values of the differences between the elements of $\hat{\epsilon}_s$ can be computed as shown in table 2740 in FIG. 27C. The first row of the table 2742 is simply the transpose of $\hat{\epsilon}_s$. Then, in similar fashion to the computation of sums, shown in FIG. 23, the absolute value of the differences $Z_{(i)} - Z_{(j)}$ are computed in the virtual triangular data structure 2744 below row 2742. In the final column 2746 shown in FIG. 27C, the number of entries in this virtual triangular data structure with each of the different values included in the virtual triangular data structure are shown. For example, there are two 2748 entries with value 0 (2750 in FIG. 27C). The virtual triangular data structure 2744 has certain properties similar to those discussed above with reference to FIG. 23. The greatest valued entry is the entry in the upper right-hand corner 2752. The values of the entries within a column are non-increasing from the top of the column downward, and the values of entries in a row are non-increasing from the right-hand side of the row to the left-hand side of the row.

In order to compute $\hat{\tau}_\phi$, the value $t_{n,\delta}$ is computed as the value in the element $\delta$ of a vector that contains the sorted elements of the virtual triangular data structure:

$$t_{n,\delta} = \tilde{H}^{-1}(\delta).$$

This is a problem similar to the problem discussed above with reference to FIGS. 23 and 24A-M. Then, the value $t_n$ can be computed as:

$$t_n = \frac{t_{n,\delta}}{\sqrt{n}}.$$

With this value, then $\hat{\tau}_\phi$, is computed as:

$$\hat{\tau}_\phi = \frac{2t_n}{(\phi(1) - \phi(0))\tilde{H}(t_n)} \sqrt{\frac{n}{n-k-1}}$$

where $$\phi(u) = \sqrt{12}\left(u - \frac{1}{2}\right).$$

Figure 28A:
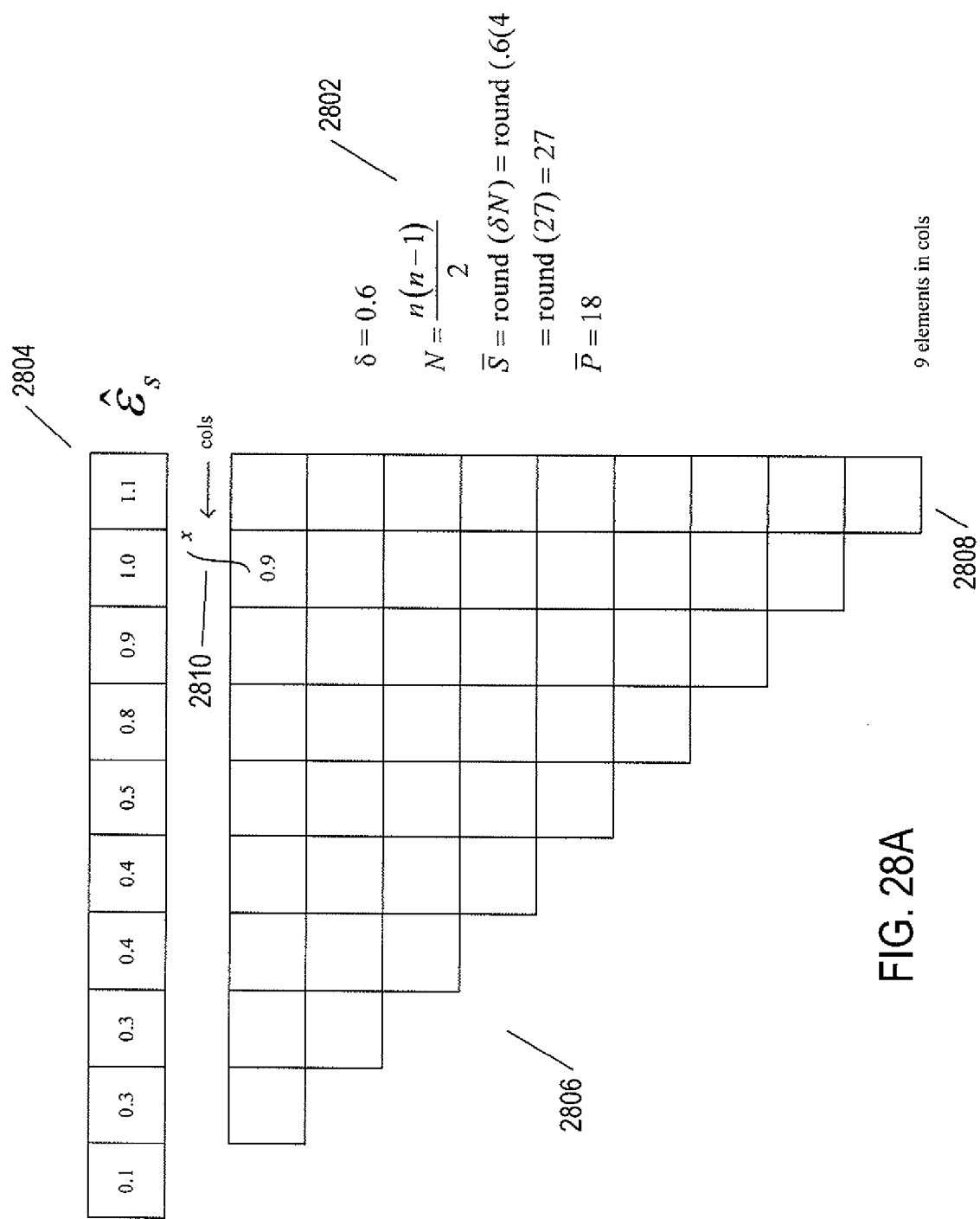
FIGS. 28A-H illustrate an efficient method for determining $t_{n,\delta}$.
Figure 28B:
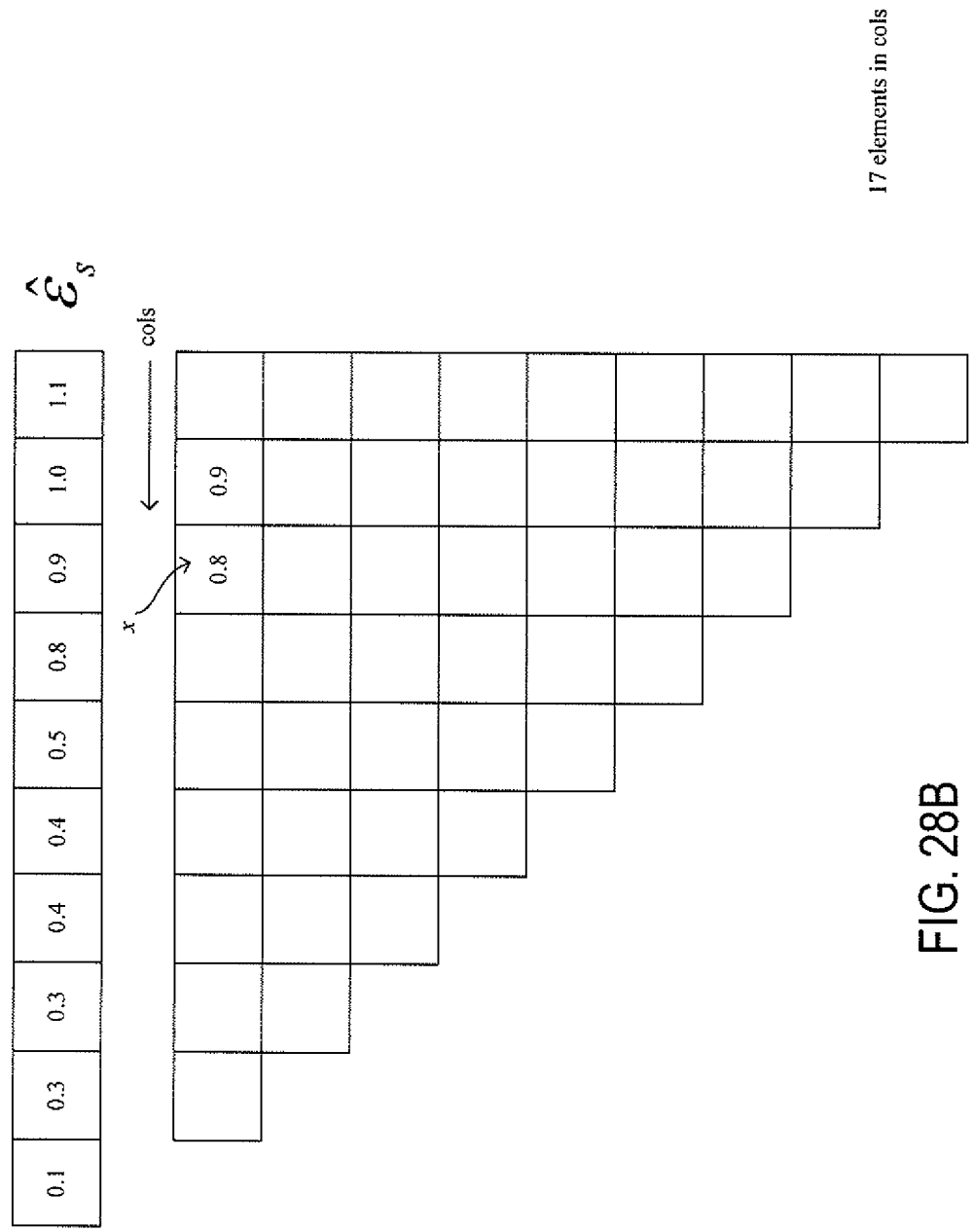
Figure 28C:
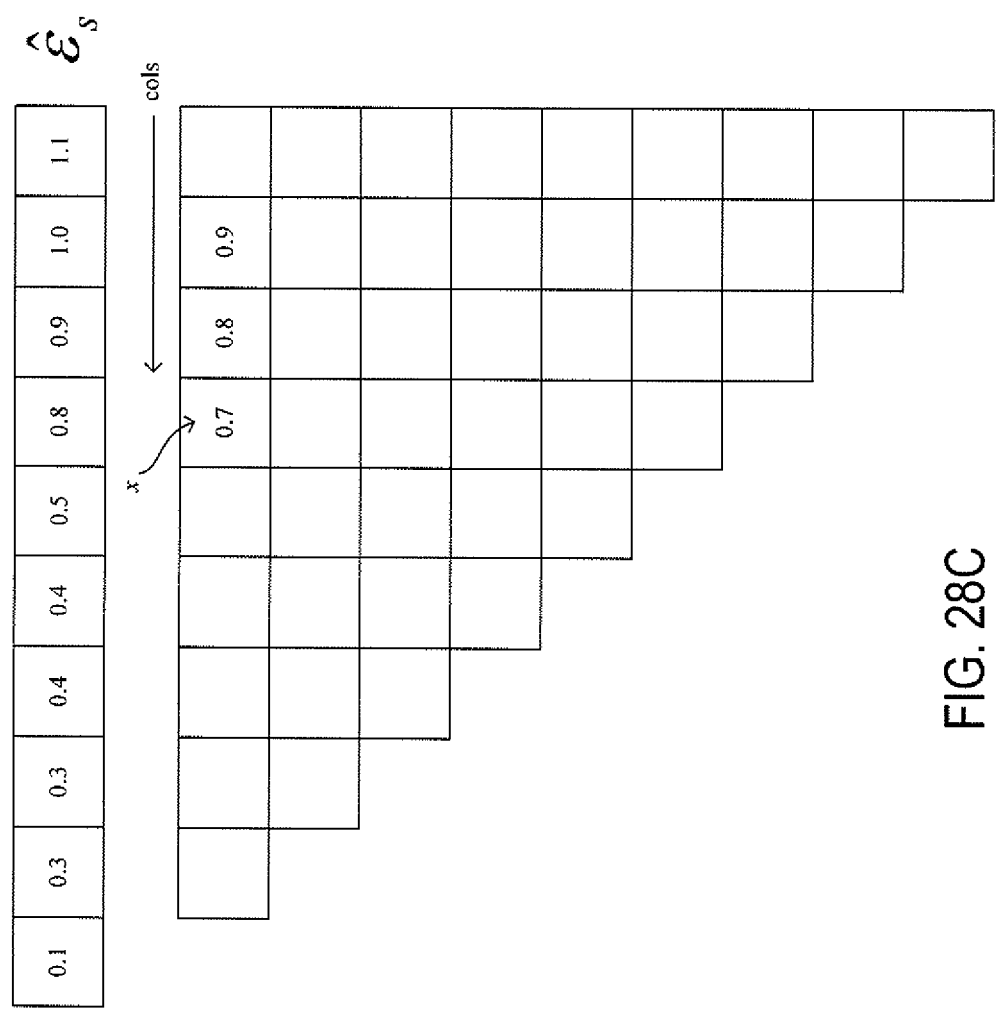

As with the above-discussed processing methods, with large data sets, the determination of $t_{n,\delta}$ would be computationally infeasible were all the absolute differences of residual values needed to be computed and sorted. However, just as with the method discussed above with reference to FIGS. 23 and 24A-M, the value $t_{n,\delta}$ can be obtained by a more efficient method. FIGS. 28A-H illustrate an efficient method for determining $t_{n,\delta}$. First, as shown in FIG. 28A, the values n, $\overline{S}$, and $\overline{P}$ are computed 2802. N is computed in the same fashion as in the method illustrated in FIGS. 23 and 24A-M. The value $\overline{S}$ represents the number of entries in the full sorted array of absolute differences up to and including the $\delta^{th}$ element and $\overline{P}$ is the number of entries to the right of the $\delta^{th}$ entry in a full sorted array of absolute differences. In FIG. 28A, the transpose of the vector $\hat{\epsilon}_s$ 2804 is shown above the virtual triangular data structure 2806 which represents all of the computed absolute differences $|Z_{(i)} - Z_{(j)}|$. In a first step, the first right-most column 2808 is selected as the single member of a set cols and a variable x is set to the value of the first element of the right-most column adjacent to the left-most member of the set cols 2810. Then, as shown in FIGS. 28B-C, additional members are added to the set cols, proceeding leftward through the virtual triangular data structure, with the variable x set to the value of the first element of the next-most leftward column, until the number of elements in all of the columns in the set cols is equal to or greater than $\overline{P}$. In FIG. 28C, the number of elements in the right-most three columns is 23, which is greater than $\overline{P}$=18.

Figure 28D:
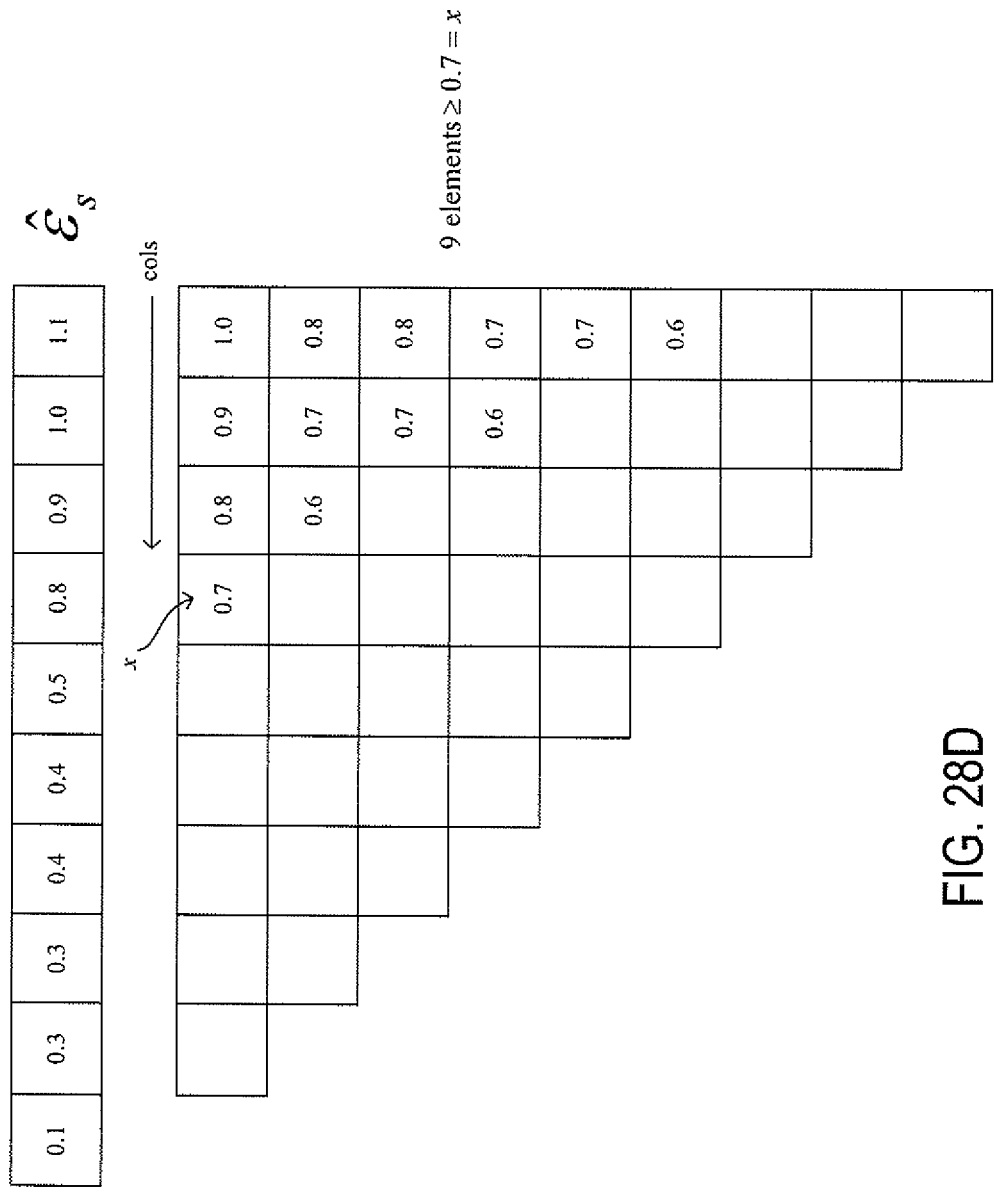
Figure 28E:
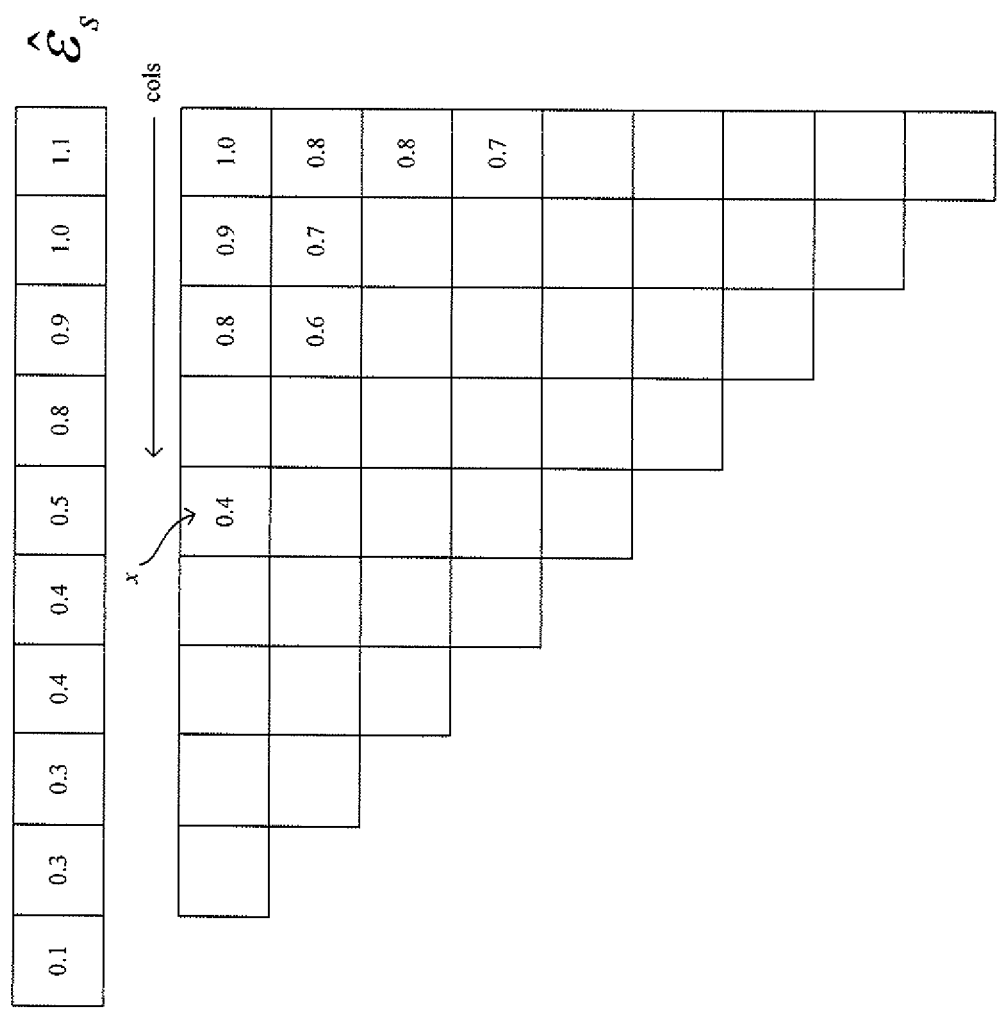
Figure 28F:
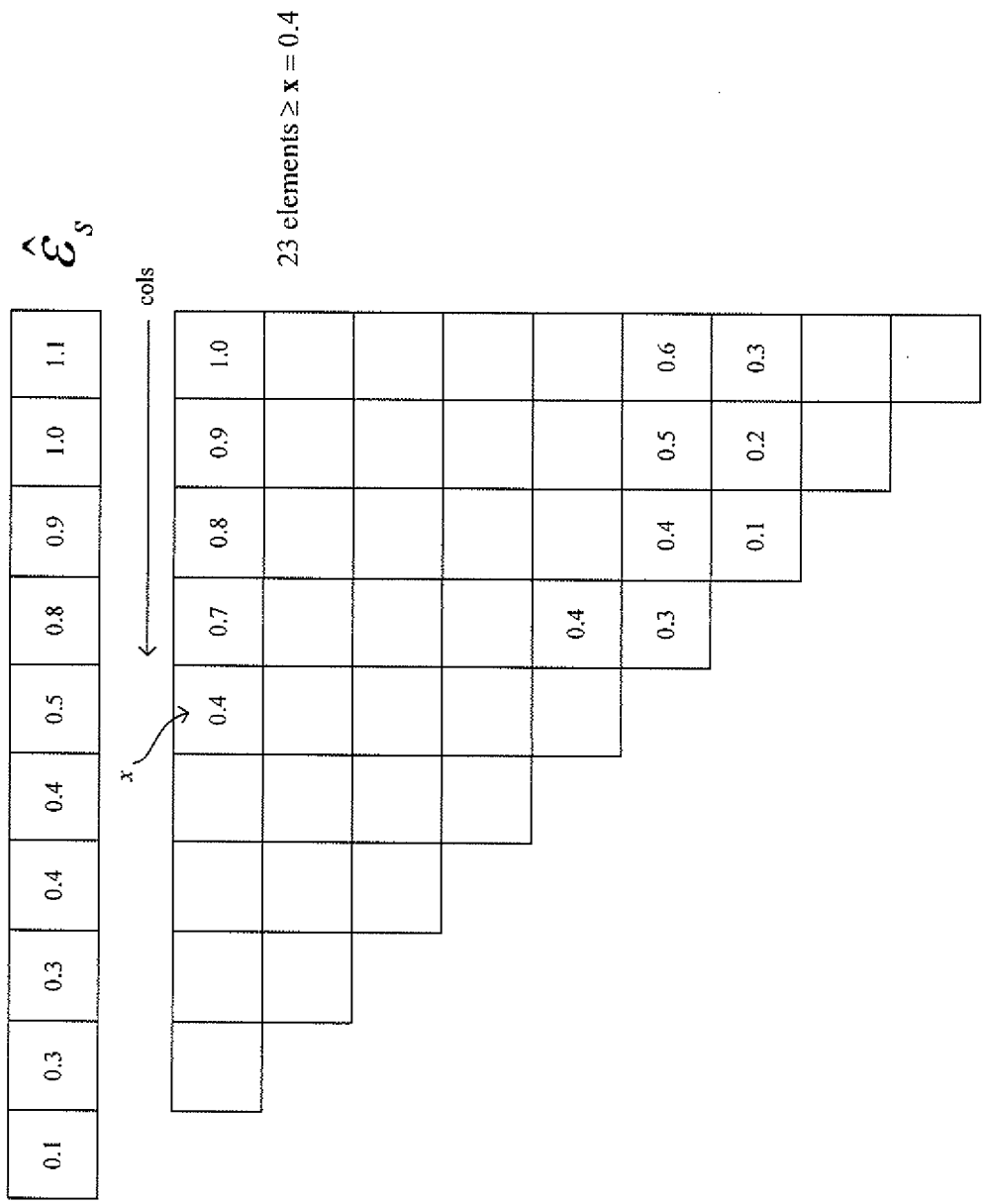
Figure 28G:
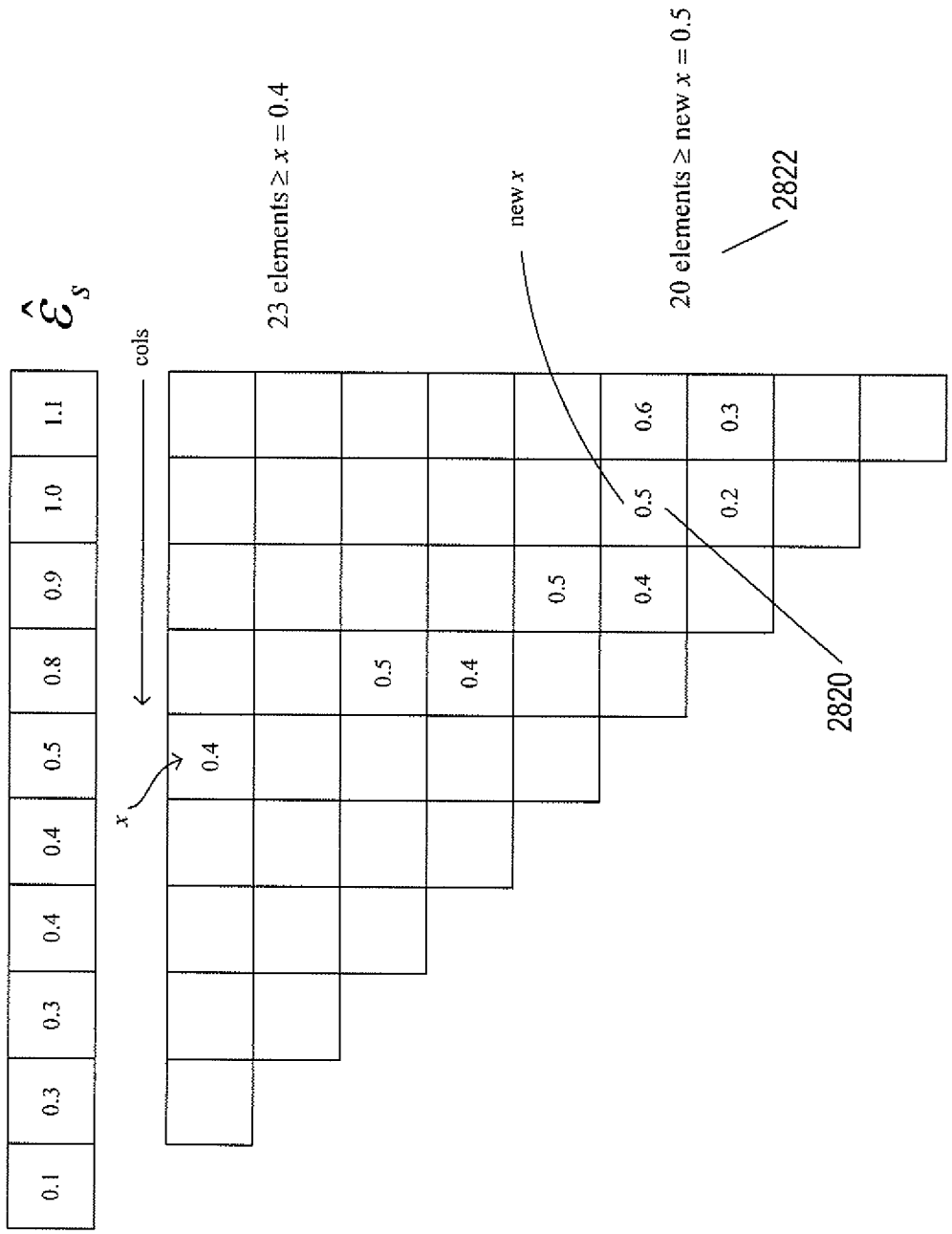
Figure 28H:
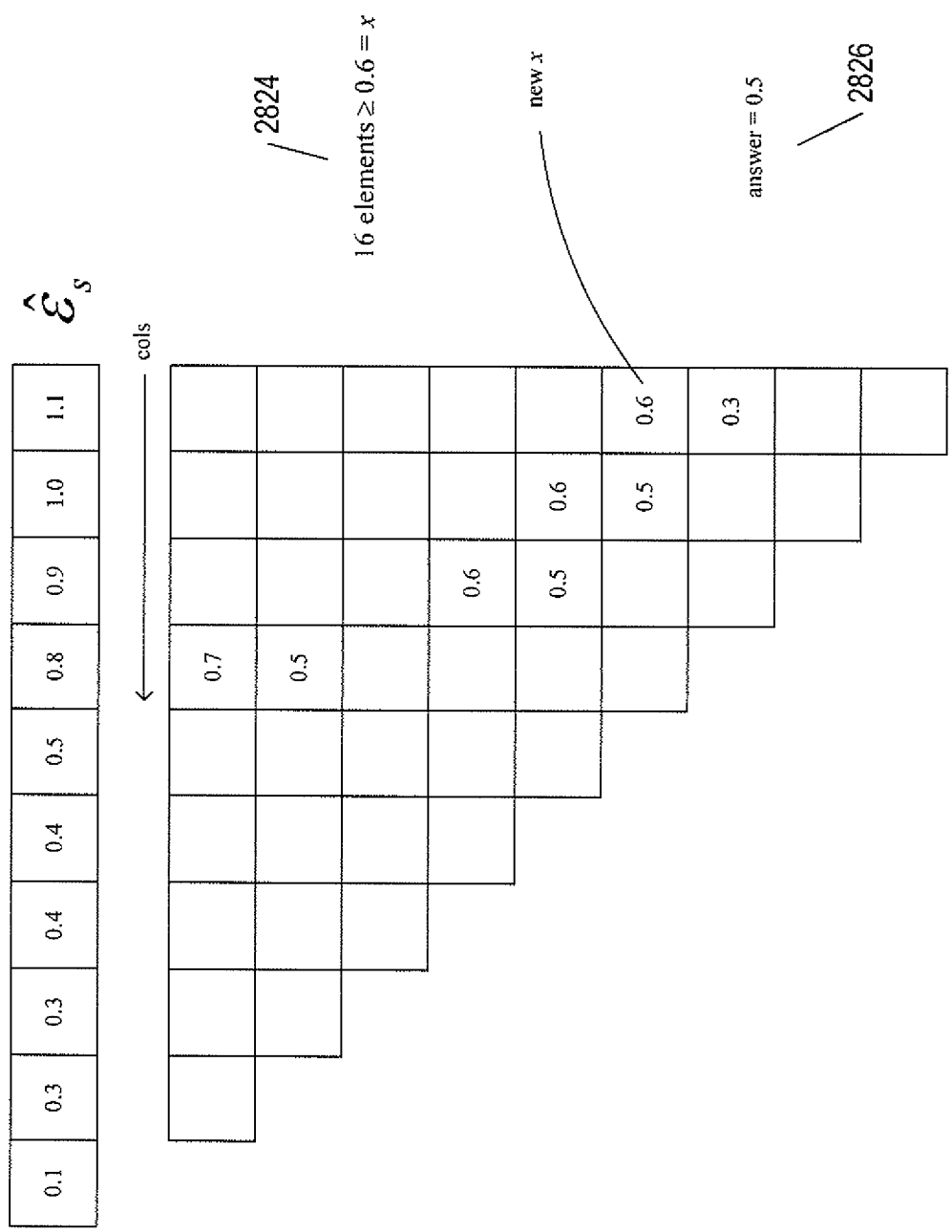

Then, as shown in FIG. 28D, the number of elements in the columns of the set cols with values greater than or equal to the value of variable x is computed. In the case shown in FIG. 28D, the number of elements greater than or equal to the value of x, 0.7, is 9. Next, as illustrated in FIGS. 28D-F, additional columns are added to the set of columns cols, and the value in the variable x is correspondingly set to next leftward element values, until the number of elements in the set cols with values greater than or equal to the value stored in the variable x is greater than or equal to $\overline{P}$. As can be seen in FIG. 28F, when the set cols includes the right-most four columns of the virtual triangular data structure, there are 23 elements in the columns of the set cols with values greater than or equal to 0.4, the current value of x. Note that only a few element values need to be determined, in each column, in order to find the point, in the column, separating values above and including the point greater than or equal to the value of x and values of elements below the point less than the value of x, since, as discussed above, the values of the elements in the columns are non-increasing from top to bottom. At the point reached in FIG. 28F, it is clear that the value of the $\delta^{th}$ element in the sorted list of all absolute values of differences must be at least 0.4. Then, as illustrated in FIGS. 28G-H, while the number of elements in the columns of the set cols with value greater than or equal to x is greater than $\overline{P}$, the value of x is increased to the next-highest value in any of the columns of the set cols. In this case, as shown in FIG. 28G, the new value in the variable x is 0.5 2820. Then, the number of elements with values greater than or equal to the new x in the set of cols is evaluated, in this case, the valuation reveals that 20 elements 2822 in the set of columns cols have values greater than or equal to 0.5. This process continues until a new x value is obtained such that the number of elements in the columns of the set cols with values greater than or equal to the new x value is less than or equal to $\overline{P}$. In FIG. 28H, the new x value is 0.6, for which 16 elements in the columns of the set of columns cols have values greater than or equal to 2824. When the number of elements is less than or equal to $\overline{P}$, then the previous value x is returned as the answer, in this case 0.5 2826. Returning to FIG. 27C, it is usually seen that elements of the sorted array of absolute differences would have the value 0.5 for elements with indexes of 26 through 31, a range which covers the $27^{th}$ element corresponding to the δ value of 0.6.

Figure 29A:
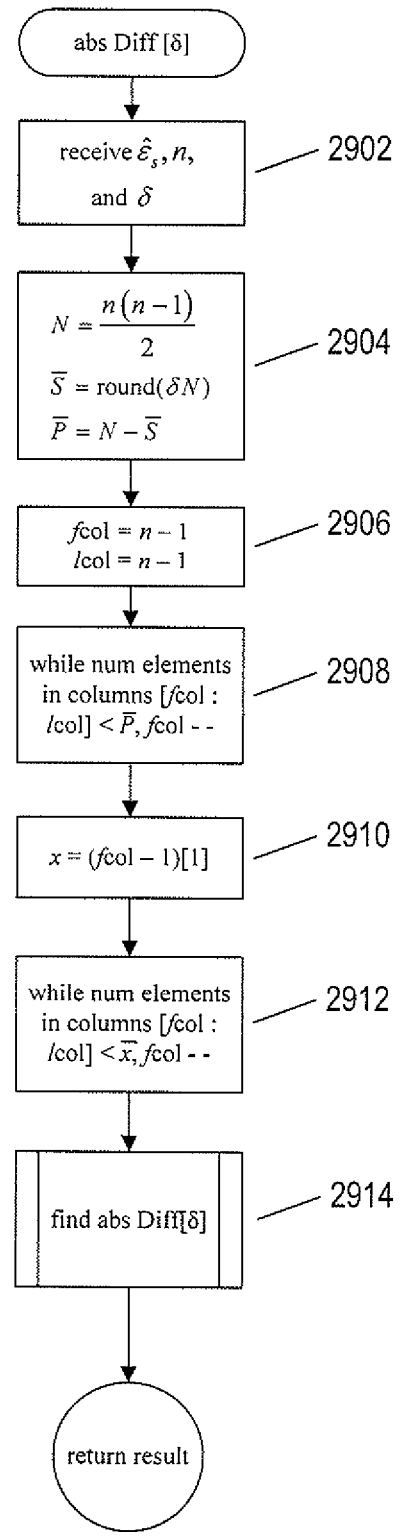
FIGS. 29A-B provide control-flow diagrams that illustrate a method for finding $\tilde{H}^{-1}(\delta)$.
Figure 29B:
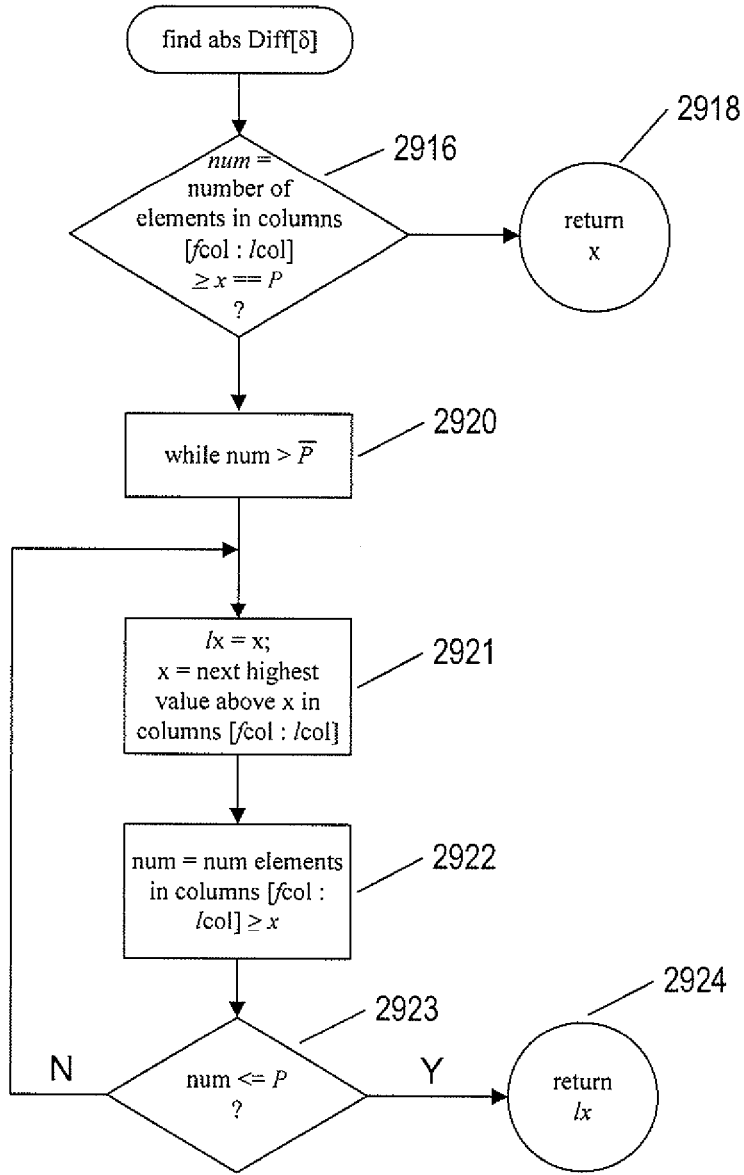

FIGS. 29A-B provide control-flow diagrams that illustrate a method for finding $\hat{H}^{-1}(\delta)$. In step 2902 of FIG. 29A, the method receives the sorted residual vector $\hat{\epsilon}$, n, the number of elements in $\hat{\epsilon}_s$, and the quantile δ for which the value in the array of sorted absolute differences is desired. Next, in step 2904, the values of N, $\overline{S}$, and $\overline{P}$ are computed, as discussed above with reference to FIG. 28A. In step 2906, the range of columns included in the set cols, discussed above with reference to FIGS. 28A-H, is set to include only the right-most column of the virtual triangular data structure, as defined by the two variables fcol and lcol. Then, while the number of elements in the columns of the set cols is less than $\overline{P}$, fcol is decremented, in step 2908, in the process discussed above with reference to FIGS. 28A-F. The value of variable x is set to the first element of the next left-most column in step 2910. Then, in step 2912, additional columns are added to the set of columns cols until the number of elements in the columns in the set of columns cols with values greater than or equal to x is greater than or equal to $\overline{P}$, as discussed above with reference to FIGS. 29E-F. Then, an additional routine is called in step 2914 that is shown in FIG. 29B to finish the process of finding $\hat{H}^{-1}(\delta)$. When the number of elements in the set of columns cols is equal to $\overline{P}$, as determined in step 2916, the value of x is returned as the answer in step 2918. Otherwise, in the for-loop of steps 2920-2923, while the local variable num is greater than $\overline{P}$, the variable lx is set to x and x is set to the next-highest value above x in the columns of the set of columns cols, in step 2921, and num is set to the number of elements in the columns of the set of columns cols with values greater than or equal to the new value x, in step 2922. When num is less than or equal to P, then the value lx is returned as the answer in step 2924.

As with the method discussed above with reference to FIGS. 23 and 24A-M, the method illustrated in FIGS. 28A-H and 29A-B has a computational complexity of O n log(n) and is far more efficient than attempting to generate all of the absolute values of differences and sort them in order to find the $\delta^{th}$ quantile of the $\hat{H}$ distribution. In the methods discussed above with reference to FIGS. 23 and 24A-M with respect to FIGS. 28A-H and 29A-B, less than 50% of the values in the logical array of sorted computed results are evaluated and no sorting of computed values is carried out. In certain cases, less than 10% of the values in the logical array of sorted computed results are evaluated. In many cases, less than 1% of the values in the logical array of sorted computed results are evaluated. In many cases, less than 0.1% of the values in the logical array of sorted computed results are evaluated.

Although the present invention has been described in terms of particular embodiments, it is not intended that the invention be limited to these embodiments. Modifications within the spirit of the invention will be apparent to those skilled in the art. For example, any of many different design and implementation parameters may be varied to produce a variety of alternative implementations of the robust methods for processing website-testing results, including modular design, programming language, operating system, control structures, data structures, and other such details. While the currently disclosed methods have been discussed in the context of website testing, the same methods can be used to analyze a variety of different types of data generated by a variety of different types of automated single-factor and multi-factor/multi-level testing.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:
1. An automated testing system comprising:
one or more processors;
one or more memories; and
computer instructions, stored on a physical data storage device within the automated testing system that control the automated testing system to
process stored test results using a robust method, which generates and uses ranks of test-result values, to identify one or more particular single-factor variants or multi-factor/multi-level variants that produce test-result distributions different from one or more other test-result distributions;

for one or more of the identified variants, process stored test results to determine expected results and one of confidence intervals and significance levels, the processing to determine one of confidence intervals and significance levels including determining, by computing only a fraction of the computed values in a virtual sorted array of values computed from possible pairs of a set of initial values, a computed value stored in a particular element of the virtual sorted array associated with a particular index by ordering the set of initial values into a sorted initial-value array, and logically processing a virtual data structure, aligned with the sorted initial-value array, that includes virtual elements that contain the computed values in the virtual sorted array, by, starting with a current logical partition equal to the virtual data structure, recursively selecting a pivot element of the current logical partition, which partitions the current logical partition into a first partition, the elements of which have values less than or equal to the value of the pivot element, a second partition, the elements of which have values greater than or equal to the value of the pivot element, and a third partition, and selecting one of the first, second, or third partitions as the next current logical partition, until the current logical partition contains less than a threshold number of elements, and selecting, as the computed value at the particular index of the virtual sorted array, an element from the current logical partition; and store an indication of one or more of the one or more identified particular variants and one or more of the one of determined confidence intervals and determined significance levels in a physical data-storage device.

2. The automated testing system of claim 1 wherein the fraction of the computed values in a virtual sorted array of values computed from possible pairs of a set of initial values is less than 50%.

3. The automated testing system of claim 1 wherein the fraction of the computed values in a virtual sorted array of values computed from possible pairs of a set of initial values is less than 10%.

4. The automated testing system of claim 1 wherein the fraction of the computed values in a virtual sorted array of values computed from possible pairs of a set of initial values is less than 1%.

5. The automated testing system of claim 1 wherein the fraction of the computed values in a virtual sorted array of values computed from possible pairs of a set of initial values is less than 0.1%.

6. The automated testing system of claim 1 wherein the virtual data structure is a virtual triangular data structure, with a top row aligned with the sorted initial-value array and with columns that each includes, as a first element, an element of the top row, the length of the columns decreasing from right to left.

7. The automated testing system of claim 6 wherein the values in the sorted initial-value array are non-decreasing, from left to right, wherein the values in the rows of the virtual triangular data structure are non-decreasing, from left to right, wherein each column of the virtual triangular data structure includes, as a first element, an element of the top row, the length of the columns decreasing from right to left the columns of the virtual triangular data structure, and wherein the values in each column of the virtual triangular data structure are non-decreasing, from top to bottom.

8. The automated testing system of claim 1 wherein selecting one of the first, second, or third partitions as the next current logical partition further comprises:

determining the number of elements in each of the first, second, and third partitions; and selecting as the next current logical partition that partition of the first, second, and third partitions that includes the element associated with the particular index of the virtual sorted array of values based on the number of elements in each of the first, second, and third partitions.

9. The automated testing system of claim 1 wherein the virtual data structure contains pair-wise averages of the initial values.

10. The automated testing system of claim 1 wherein the automated testing system processes stored test results using a robust testing method selected from among:

generating a Kruskal-Wallis test statistic K based on ranks of test results generated from single-factor tests; and generating coefficients, based on ranks of test results generated from multi-factor/multi-level tests, by optimization and computing ANOVA (analysis-of-variation) tables using pseudo observables.

11. An automated testing system comprising:

one or more processors;

one or more memories; and computer instructions, stored on a physical data storage device within the automated testing system that control the automated testing system to process stored test results using a robust method, which generates and uses ranks of test-result values, to identify one or more particular single-factor variants or multi-factor/multi-level variants that produce test-result distributions different from one or more other test-result distributions;

for one or more of the identified variants, process stored test results to determine expected results and one of confidence intervals and significance levels, the processing to determine one of confidence intervals and significance levels including determining, by computing only a fraction of the computed values in a virtual sorted array of values computed from possible pairs of a set of initial values, a computed value stored in a particular element of the virtual sorted array associated with a particular index by ordering the set of initial values into a sorted initial-value array; and logically processing a virtual data structure, aligned with the sorted initial-value array, that includes virtual elements that contain the computed values in the virtual sorted array, by computing a number of elements s prior to and including the element of the virtual sorted array at the particular index and a number of elements p following the element of the virtual sorted array at the particular index, starting with set of columns that contains a column of the virtual data structure with greatest valued elements, adding additional columns to the set of columns until the set of columns contain an initial logical partition containing a number of elements with values greater than or equal to a minimum value and with values greater than those the remaining elements of the virtual data structure not included in the initial partition, the number greater than or equal to p, starting with the initial partition as the current partition, while a new larger minimum value can be selected to generate a new partition from the current parturition with a number of elements with values greater than or equal to a minimum value, selecting the new larger minimum value and generating the new partition as the current logical partition, and selecting, as the computed value at the particular index of the virtual sorted array, an element from the current logical partition; and store an indication of one or more of the one or more identified particular variants and one or more of the one of determined confidence intervals and determined significance levels in a physical data-storage device.

12. The automated testing system of claim 11 wherein the virtual data structure is a virtual triangular data structure, with a top row aligned with the sorted initial-value array and with columns that each includes, as a first element, an element of the top row, the length of the columns decreasing from right to left.

13. The automated testing system of claim 12 wherein the values in the sorted initial-value array are non-decreasing, from left to right, wherein the values in the rows of the virtual triangular data structure are non-decreasing, from left to right, wherein each column of the virtual triangular data structure includes, as a first element, an element of the top row, the length of the columns decreasing from right to left the columns of the virtual triangular data structure, and wherein the values in each column of the virtual triangular data structure are non-increasing, from top to bottom.

14. The automated testing system of claim 12 wherein the virtual data structure contains absolute values of pair-wise differences of the initial values.

* * * * *